United States Patent
Cirik et al.

(10) Patent No.: US 11,419,156 B2
(45) Date of Patent: Aug. 16, 2022

(54) UPLINK RESOURCE MANAGEMENT IN TWO-STEP RANDOM-ACCESS PROCEDURES

(71) Applicant: Ofinno, LLC, Reston, VA (US)

(72) Inventors: Ali Cagatay Cirik, Herndon, VA (US); Esmael Hejazi Dinan, McLean, VA (US); Hua Zhou, Herndon, VA (US); Hyoungsuk Jeon, Centreville, VA (US); Alireza Babaei, Fairfax, VA (US); Kyungmin Park, Vienna, VA (US); Kai Xu, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 17/388,692

(22) Filed: Jul. 29, 2021

(65) Prior Publication Data

US 2021/0360706 A1    Nov. 18, 2021

Related U.S. Application Data

(63) Continuation of application No. 17/344,071, filed on Jun. 10, 2021, which is a continuation of application No. PCT/US2020/012177, filed on Jan. 3, 2020.
(Continued)

(51) Int. Cl.
*H04W 74/08* (2009.01)
*H04W 72/14* (2009.01)
(Continued)

(52) U.S. Cl.
CPC ... *H04W 74/0841* (2013.01); *H04W 72/1263* (2013.01); *H04W 72/14* (2013.01);
(Continued)

(58) Field of Classification Search
CPC ......... H04W 74/0841; H04W 72/1263; H04W 72/14; H04W 74/004; H04W 74/02
See application file for complete search history.

(56) References Cited

U.S. PATENT DOCUMENTS 10,932,207 B2 *  2/2021  Suzuki ................. H04W 52/36
2012/0243505 A1   9/2012  Lin
(Continued)

FOREIGN PATENT DOCUMENTS

CN         107872899 A       4/2018

OTHER PUBLICATIONS

"R2-1818258_Enhance RACH with Additional Transmission Opportunities; 3GPP TSG-RAN WG2 Meeting #104; Spokane, USA, Nov. 12-16, 2018Revision of R2-1814262;; Source:vivo; Title:Enhance RACH with Additional Transmission Opportunities; Agenda Item:11.2.1.1;".
(Continued)

*Primary Examiner* — Kashif Siddiqui
(74) *Attorney, Agent, or Firm* — Willis H. Chang; Kavon Nasabzadeh; Jacob L. Mangan

(57) ABSTRACT

In some embodiments, a wireless device receives one or more messages including one or more configuration parameters of a cell. The one or more configuration parameters indicate physical uplink shared channel (PUSCH) resources for transmission of a message A (MsgA) payload of a two-step random-access procedure of the cell. The wireless device transmits, via a first PUSCH resource of the PUSCH resources, the MsgA payload for the two-step random-access procedure. Based on completing the two-step random-access procedure, the wireless device releases the PUSCH resources.

19 Claims, 36 Drawing Sheets

Related U.S. Application Data

(60) Provisional application No. 62/788,612, filed on Jan. 4, 2019.

(51) Int. Cl.
  *H04W 74/00* (2009.01)
  *H04W 74/02* (2009.01)
  *H04W 72/12* (2009.01)

(52) U.S. Cl.
  CPC ......... *H04W 74/004* (2013.01); *H04W 74/02* (2013.01); *H04W 74/0816* (2013.01)

(56) References Cited

U.S. PATENT DOCUMENTS

| | | | |
|---|---|---|---|
| 2013/0114813 A1* | 5/2013 | Chai | H04L 9/0891 380/270 |
| 2013/0242730 A1 | 9/2013 | Pelletier et al. | |
| 2016/0143017 A1 | 5/2016 | Yang et al. | |
| 2016/0255593 A1 | 9/2016 | Blankenship et al. | |
| 2016/0255658 A1* | 9/2016 | Fujishiro | H04W 72/0453 370/329 |
| 2016/0262182 A1 | 9/2016 | Yang et al. | |
| 2017/0230962 A1 | 8/2017 | Park et al. | |
| 2018/0097672 A1 | 4/2018 | Jung et al. | |
| 2018/0279376 A1 | 9/2018 | Dinan et al. | |
| 2018/0324872 A1 | 11/2018 | Babaei et al. | |
| 2018/0352582 A1 | 12/2018 | Yi et al. | |
| 2019/0044782 A1 | 2/2019 | Zeng et al. | |
| 2020/0045650 A1* | 2/2020 | Suzuki | H04W 76/27 |

OTHER PUBLICATIONS

"R2-1818259_Counter for Preamble Transmission Attempt; 3GPP TSG-RAN WG2 Meeting #104; Spokane, USA, Nov. 12-16, 2018;; Source:vivo; Title:Counter for Preamble Transmission Attempt ; Agenda Item:11.2.1.1;".

"R2-1818260 RAN2 impacts of 2-step RACH; 3GPP TSG-RAN WG2 Meeting #104; Spokane, USA, Nov. 12-16, 2018 (Revision of R2-1814263); ; Source: vivo ; Title:RAN2 impacts of 2-step RACH; Agenda Item:11.2.1.1;".

"R2-1818356 Fast preamble transmission in NR-U; 3GPP TSG-RAM WG2 Meeting #104; Spokane, USA, Nov. 12-16, 2018resubmission of R2-1812666; ; Agenda Item: 11.2.1.1 (FS_NR_unlic); Source: LG Electronics Inc.; Title: Fast preamble transmission in NR-U;".

"R2-1818503_RACH_NRU; 3GPP TSG-RAN2#104; Spokane, WA, USA, Nov. 12-16, 2018; ; Agenda item:11.2.1.1; Source: Qualcomm Incorporated; Title: Further details on RACH for NR-U;".

"R2-1818504_TP_RACH_NRU; 3GPP TSG-RAN2#104; Spokane, WA, USA, Nov. 12-16, 2018; ; Agenda item:11.2.1.1; Source: Qualcomm Incorporated, Ericsson, Charter Communications, Interdigital, ZTE, Apple; Title: TP for 2-step RACH in NR-U;".

R1-164131; 3GPP TSG RAN WG1 Meeting #85; Nanjing, China, May 23-27, 2016; Agenda Item: 6.2.1.4 Source: Intel Corporation; Title: PRACH Transmission for eLAA.

R1-1612299; 3GPP TSG-RAN WG1 #87; Reno, USA Nov. 14-18, 2016; Agenda item: 7.1.2.5; Source: Nokia, Alcatel-Lucent Shanghai Bell; Title: Random access principles for new radio.

International Search Report for International Application No. PCT/US2020/012177, dated Mar. 23, 2020.

"3GPP TSG RAN WG1 Meeting #95 R1-1814380; Spokane, USA, Nov. 12-16, 2018; CR-Form-v11.2 Change Request".

"3GPP TSG RAN WG1 Meeting #95 R1-1814400; Spokane, USA, November 12-16, 2018; CR-Form-v11.2 Change Request".

"3GPP TS 38.213 V15.3.0 (Sep. 2018); Technical Specification; 3rd Generation Partnership Project; Technical Specification Group Radio Access Network; NR; Physical layer procedures for control (Release 15)".

"3GPP TS 38.214 V15.3.0 (Sep. 2018); Technical Specification; 3rd Generation Partnership Project; Technical Specification Group Radio Access Network; NR; Physical layer procedures for data (Release 15)".

"3GPP TSG-RAN1 Meeting #95 R1-1814395; Spokane, USA, Nov. 12-16, 2018; CR-Form-v11.2 Change Request".

3GPP TS 38.321 V15.3.0 (Sep. 2018); Technical Specification; 3rd Generation Partnership Project; Technical Specification Group Radio Access Network; NR; Medium Access Control (MAC) protocol specification; (Release 15).

3GPP TS 38.331 V15.3.0 (Sep. 2018); Technical Specification; 3rd Generation Partnership Project; Technical Specification Group Radio Access Network; NR; Radio Resource Control (RRC) protocol specification; (Release 15).

"3GPP TSG-RAN WG2 Meeting #104 R2-1818749; Spokane, WA, USA, Nov. 12-16, 2018; CR-Form-v11.2 Change Request".

"R2-1816261—Enhancements of 4-steps RACH in NR-U; 3GPP TSG-RAN WG2 Meeting #104 ; Spokane, USA, Nov. 12-16, 2018 resubmission of R2-1813586; Agenda Item:11.2.1.1; Source:OPPO; Title:Enhancements of 4-steps RACH in NR-U and the corresponding TP; Document for:Discussion, Decision".

"R2-1816262—3-steps RACH procedure; 3GPP TSG-RAN WG2 Meeting #104 ; Spokane, USA, Nov. 12-16, 2018; Agenda Item:11.2.1.1; Source:OPPO; Title:3-steps RACH procedure for NR-U; Document for:Discussion, Decision;".

"R2-1816263—2-steps RACH procedure for NR-U; 3GPP TSG-RAN WG2 Meeting #104; Spokane, USA, Nov. 12-16, 2018; Agenda Item:11.2.1.1; Source:OPPO; Title:2-steps RACH procedure for NR-U; Document for:Discussion, Decision".

"R2-1816312_Random Access Response Reception in NR-U; 3GPP TSG-RAN2 104; Spokane, USA, Nov. 12-16, 2018; Agenda item:11.2.1.1; Source:Samsung; Title:Random Access Response Reception in NR-U".

"R2-1816435; 3GPP TSG RAN WG2 Meeting 104; Spokane, US, Nov. 12-16, 2018Revision of R2-1814438; Agenda Item:11.2.1.1; Source:Motorola Mobility, Lenovo; Title:Modifications to RACH procedure due to LBT".

"R2-1816478_LBT for RACH in NR-U; 3GPP TSG-RAN2#104 meeting Tdoc; Spokane, USA, Nov. 12-16, 2018; Agenda Item:11.2.1.1 ; Souce:MediaTek Inc.; Title:LBT for Random Access in NR-U; Document for:Discussion and decision".

"R2-1816604 timers and counters for two-step RACH_revised; 3GPP TSG-RAN WG2 Meeting #104; Spokane, US, Nov. 12-16, 2018; Agenda Item: 11.2.1.1; Souce: Huawei, Hisicion; Title: Timers and counters for two-steps RACH".

"R2-1816605 consideration on 2-step RACH parameters and grant_ revised; 3GPP TSG-RAN WG2 Meeting #104R2-1816605; Spokane, US, Nov. 12-16, 2018; Agenda Item:11.2.1.1; Souce:Huawei, Hisicion; Title:consideration on 2-step RACH parameters and grant".

"R2-1816606 consideration on UE ID for 2-step RACH; 3GPP TSG-RAN WG2 Meeting #104; Spokane, US, Nov. 12-16, 2018; ; Agenda Item:11.2.1.1; Souce:Huawei, Hisicion; Title:Consideration on UE ID for 2-step RACH".

"R2-1816607 consideration on grant size for 2-step RACH; 3GPP TSG-RAN WG2 Meeting #104; Spokane, US, Nov. 12-16, 2018; Agenda Item:11.2.1.1; Souce: Huawei, Hisicion; Title: Consideration on grant size for 2-step RACH".

"R2-1816616 Four-step RACH procedure for NR-U; 3GPP TSG-RAN WG2 Meeting #104; Spokane, USA, Nov. 12-16, 2018; Agenda Item:11.2.1.1; Source: Huawei, HiSilicon; Title: Four-step RACH procedure for NR-U; Document for:Discussion and decision".

"R2-1816617 Two-step RACH procedure for NR-U; 3GPP TSG-RAN WG2 Meeting #104; Spokane, USA, Nov. 12-16, 2018; Agenda Item:11.2.1.1; Source: Huawei, HiSilicon; Title: Two-step RACH procedure for NR-U; Document for:Discussion and decision;".

"R2-1816618 Impact of LBT on counters and windows for 4-step RACH; 3GPP TSG-RAN WG2 Meeting #104; Spoken, USA, Nov. 12-16, 2018; Agenda Item:11.2.1.1; Source: Huawei, HiSilicon; Title: Impact of LBT on counters and windows for 4-step RACH; Document for:Discussion and decision;".

(56) References Cited

OTHER PUBLICATIONS

"R2-1816685 2-step RACH msgA and msgB contents; 3GPP TSG-RAN WG2 Meeting #104; Spokane, US, Nov. 12-16, 2018; Agenda Item:11.2.1.1; Souce:MediaTek Inc.; Title:2-step RACH msgA and msgB contents;".
"R2-1816687 2-step RACH msgB addressing and HARQ; 3GPP TSG-RAN WG2 Meeting #104; Spokane, US, Nov. 12-16, 2018; Agenda Item:11.2.1.1; Souce:MediaTek Inc.; Title:2-step RACH msgB addressing and HARQ;".
"R2-1816688 Random access backoff and timers in NR-U; 3GPP TSG-RAN WG2 Meeting #104; Spokane, US, Nov. 12-16, 2018Revision of R2-1813964; ; Agenda Item:11.2.1.1; Souce:MediaTek Inc.; Title:Random access backoff and timers in NR-U".
"R2-1816696—RACHupdate-NRu_v00; 3GPP TSG-RAN WG2 meeting #104; Spokane, USA, Nov. 12-16, 2018; Agenda Item:11.2.1.1; Source: Intel Corporation; Title: Random access procedure for NR-u;".
"R2-1816697—2StepRA-NRu_v00; 3GPP TSG-RAN WG2 meeting #104; Spokane, USA, Nov. 12-16, 2018; Agenda Item:11.2.1.1; Source: Intel Corporation; Title: Further consideration of 2-step CBRA".
"R2-1816769 (LBT Impact on Preamble Transmission); 3GPP TSG-RAN WG2 Meeting #104; Spokane, Washington Nov. 12-16, 2018; Agenda item:11.2.1.1; Source:Convida Wireless;".
"R2-1816776 (R16 NRU SI AI 11211 RA in NRU); 3GPP TSG-RAN WG2 Meeting #104; Spokane, U.S.A, Nov. 12-16, 2018Revision of R2-1814007; Agenda Item:11.2.1.1; Source: InterDigital; Title: Random access in NR-Unlicensed; Document for:Discussion, Decision;".
"R2-1816829 considerations on 4-step RACH procedure for NR-U; 3GPP TSG RAN WG2 NR #104 Meeting; Spokane, US, Nov. 12-16, 2018; Agenda Item:11.2.1.1; Source: ZTE; Title: Considerations on 4-step RACH procedure for NR-U; Document for: Discussion and Decision;".
"R2-1816831 LBT outcome indication; 3GPP TSG RAN WG2 NR #104 Meeting; Spokane, US, Nov. 12-16, 2018; Agenda Item:11.2.1.1; Source: ZTE; Title: LBT outcome indication; Document for: Discussion and Decision;".
"R2-1816832 considerations on RAR window size for NR-U; 3GPP TSG RAN WG2 NR #104 Meeting; Spokane, US, Nov. 12-16, 2018; Agenda Item:11.2.1.1; Source: ZTE; Title: Considerations on RAR window size for NR-U; Document for: Discussion and Decision;".
"R2-1817064_R2-1814034 Msg2 payload contents for 2-step RACH; 3GPP TSG-RAN WG2 Meeting#104; Spokane, USA, Nov. 12-16, 2018 Revision of R2-1814034; Source: ZTE Corporation, Sanechips; Title: Msg2 payload contents for 2-step RACH; Agenda item:11.2.1.1;".
"R2-1817075_Considerations on Initial Access for NR_U_1.0; 3GPP TSG-RAN WG2 Meeting #103R2-181817075 Spokane, USA, Nov. 12-16, 2018(revision of R2-1814736); Agenda Item:11.2.1.1; Source:Sony ; Title: Considerations on initial access procedures for NR unlicensed operations;".
"R2-1817192 Draft 2stepRACH and resources; 3GPP TSG-RAN WG2 Meeting #104; Spokane, USA, Nov. 12-16, 2018; Agenda item:11.2.1.1; Source:Nokia, Nokia Shanghai Bell;".
"R2-1817195 NW_control_RACH_configurations_2_step; 3GPP TSG-RAN WG2 Meeting #104; Spokane, USA, Nov. 12-16, 2018; Agenda item:11.2.1.1; Source:Nokia, Nokia Shanghai Bell;".
"R2-1817276 On CFRA in NR-U; 3GPP TSG-RAN WG2 Meeting #104; Spokane, USA, Oct. 12-16, 2018 (Revision of R2-1815447); Agenda Item:11.2.1.3 (Other); Source: Fujitsu; Title: On CFRA in NR-U; Document for: Decision;".

"R2-1817319 Random Access Procedure in NR-U; 3GPP TSG-RAN WG2 Meeting #104; Spokane, USA, Nov. 12-16, 2018 reversion of R2-1813874; Agenda item: 11.2.1.1; Source: Spreadtrum Communications;".
"R2-1817473_NR-U RACH enhancement; 3GPP TSG-RAN WG2 Meeting #104; Spokane, USA, Nov. 12-16, 2018; Agenda Item:11.2.1.1; Source: Apple Inc.; Title: RACH Enhancements in NR-U;".
"R2-1817756_TP_RACH_NRU; 3GPP TSG-RAN2#104; Spokane, WA, USA, Nov. 12-16, 2018; Agenda Item:11.2.1.1; Source: Qualcomm Incorporated, Ericsson, Charter Communications, Interdigital, ZTE, Apple; Title: TP for 2-step RACH in NR-U;".
"R2-1817758_RACH_NRU; 3GPP TSG-RAN2#104; Spokane, WA, USA, Nov. 12-16, 2018; Agenda Item:11.2.1.1; Source: Qualcomm Incorporated; Title: Further details on RACH for NR-U;".
"R2-1817777 Diversity in RACH transmissions; Resubmission of R2-1814836; 3GPP TSG RAN WG2 Meeting 104 R2-1817777; Spokane, USA, Nov. 12-16, 2018; Agenda Item: 11.2.1.1; Source:Motorola Mobility, Lenovo;".
"R2-1817966—Discussions on RACH enhancement for NR-U; 3GPP TSG-RAN WG2 #104 TDoc ; Spokane, WA, USA, Nov. 12-16, 2018 Revision of R2-1815026; Agenda Item:11.2.1.1; Source: Ericsson; Title: Discussions an RACH enhancements for NR-U;".
"R2-1817968—Handling of RA counters and timers in NR-U; 3GPP TSG-RAN WG2 #104 TDoc; Spokane, WA, USA, Nov. 12-16, 2018Revision of R2-1815028; Agenda Item:11.2.1.1; Source:Ericsson; Title: Handling of RA counters and timers in NR-U".
"R2-1818098 2-step RACH procedure for NR-U; 3GPP TSG-RAN WG2 #103bis; Spokane, USA, Nov. 12-16, 2018 (Revision of R2-1815157); Agenda Item: 11.2.1.1(FS_NR_unlic); Source: LG Electronics Inc.".
"R2-1818100 Enhanced RACH procedure for NR-U; 3GPP TSG-RAN WG2 #104; Spokane, USA, Nov. 12-16, 2018 (Revision of R2-1815153); Agenda Item: 11.2.1.1 (FS_NR_unlic); Source: LG Electronics Inc.;".
"R2-1818128—Discussion on UE ID for msgA; 3GPP TSG-RAN WG2 Meeting #104; Spokane, USA, Nov. 12-16, 2018; Agenda item: 11.2.1.1; Source: CMCC; Title: Discussion on UE ID for msgA; Document for: Discussion, Decision;".
"R2-1818138; 3GPP TSG-RAN WG2 Meeting #104; Spokane, USA, Nov. 12-16, 2018; Agenda Item:11.2.1.1; Source: CMCC; Title: The content of the two messages of 2-step RACH for NR-U; Document for: Discussion and decision".
"R2-1818141; 3GPP TSG-RAN WG2 Meeting #104 Revision of R2-1815257; Spokane, USA, Nov. 12-16, 2018; Agenda item:11.2.1.1; Source:CMCC; Title:Consideration of RACH procedure in NR-U system;".
"R2-1818162_Considerations on Common 2-Step RACH; 3GPP TSG-RAN WG2 Meeting #104; Spokane, USA, Nov. 12-16, 2018; Agenda item:11.2.1.1; Source:Institute for Information Industry (III); Title:Considerations on Common 2-Step RACH;".
"R2-1818187 Analysis of RA issues; 3GPP TSG-RAN WG2#104; Spokane, U.S.A, Nov. 12-16, 2018; Agenda Item:11.2.1.1; Source:Potevio; Title:Analysis of RA issues related with LBT;".
Notice of Allowance, dated Oct. 19, 2021, in U.S. Appl. No. 17/344,071.
Office Action, dated Nov. 12, 2021, in U.S. Appl. No. 17/471,626.
Office Action, dated May 27, 2022, in CN Patent Application No. 2020800079638.
R1-1711363; 3GPP TSG RAN WG1 NR Ad-hoc#2; Qingdao, P.R. China, Jun. 27-30, 2017; Agenda Item 5.1.3.3.1.1; Source: ASUSTeK; Title: Two-step resource allocation for data channel in NR; Document for: Discussion and Decision.
Office Action, dated Jun. 24, 2022, in JP Patent Application No. 2021-535031.

* cited by examiner

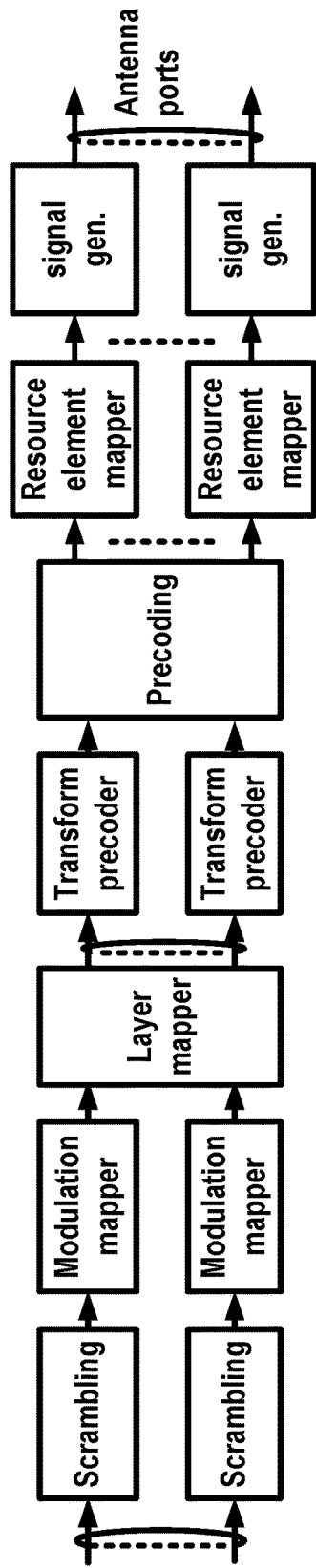
FIG. 4A
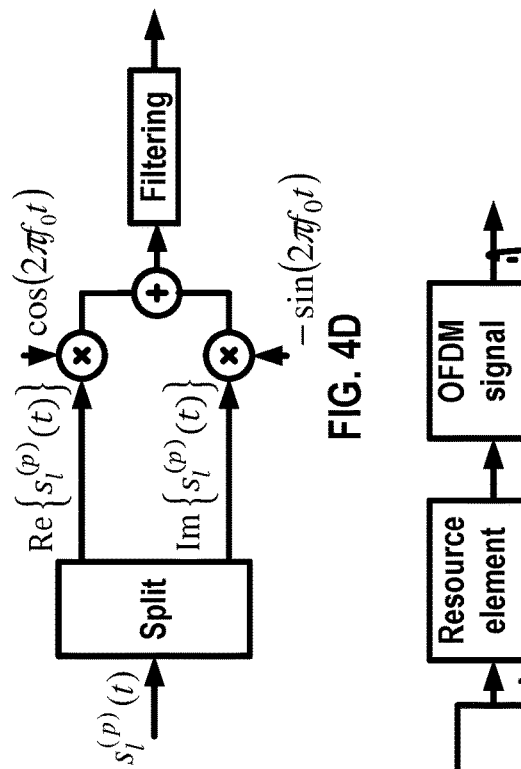
FIG. 4B
FIG. 4D
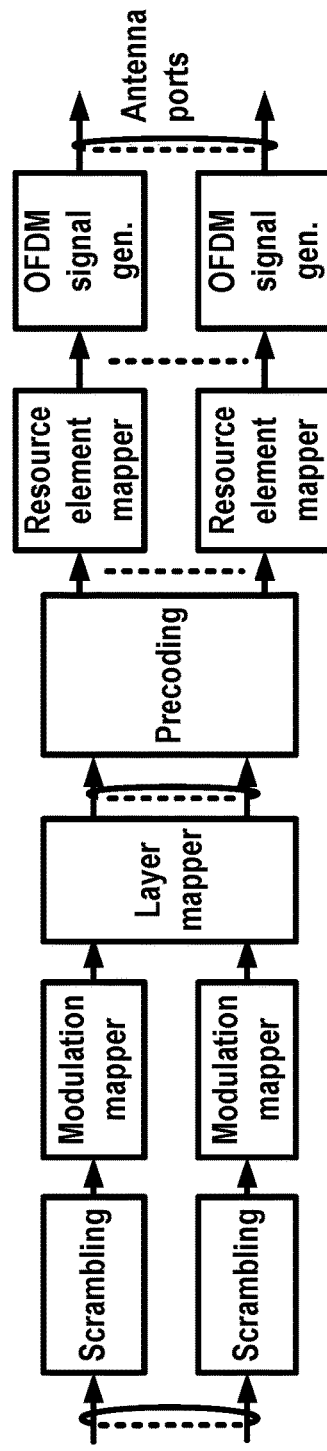
FIG. 4C

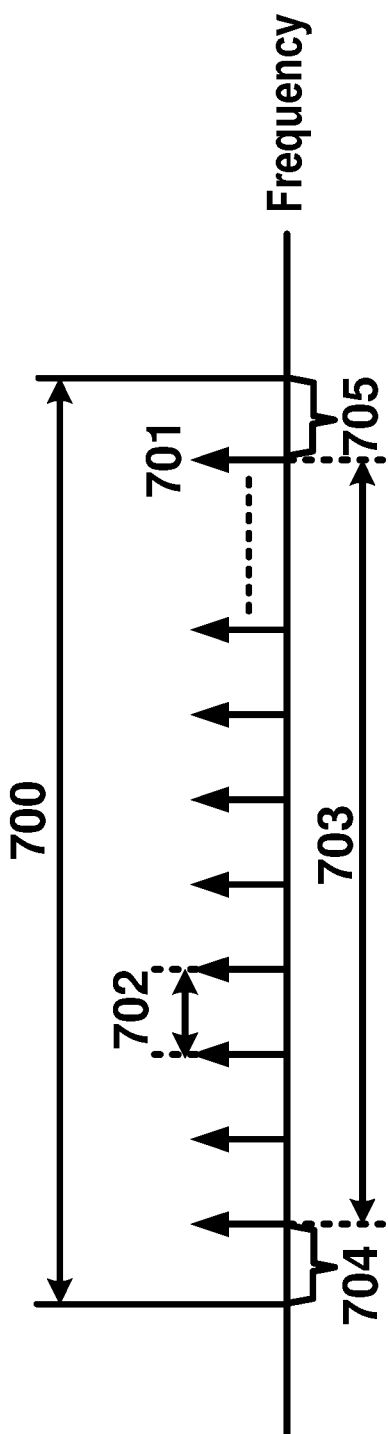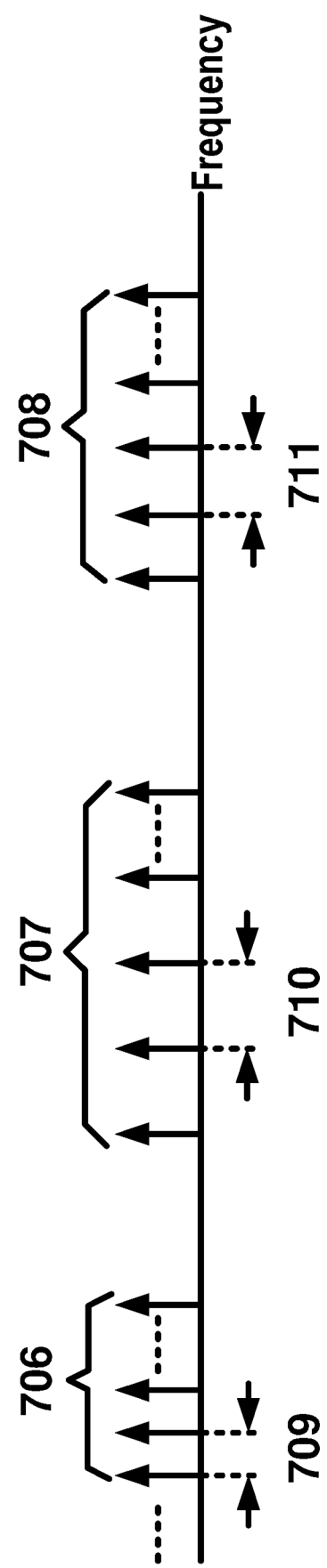
FIG. 7A
FIG. 7B

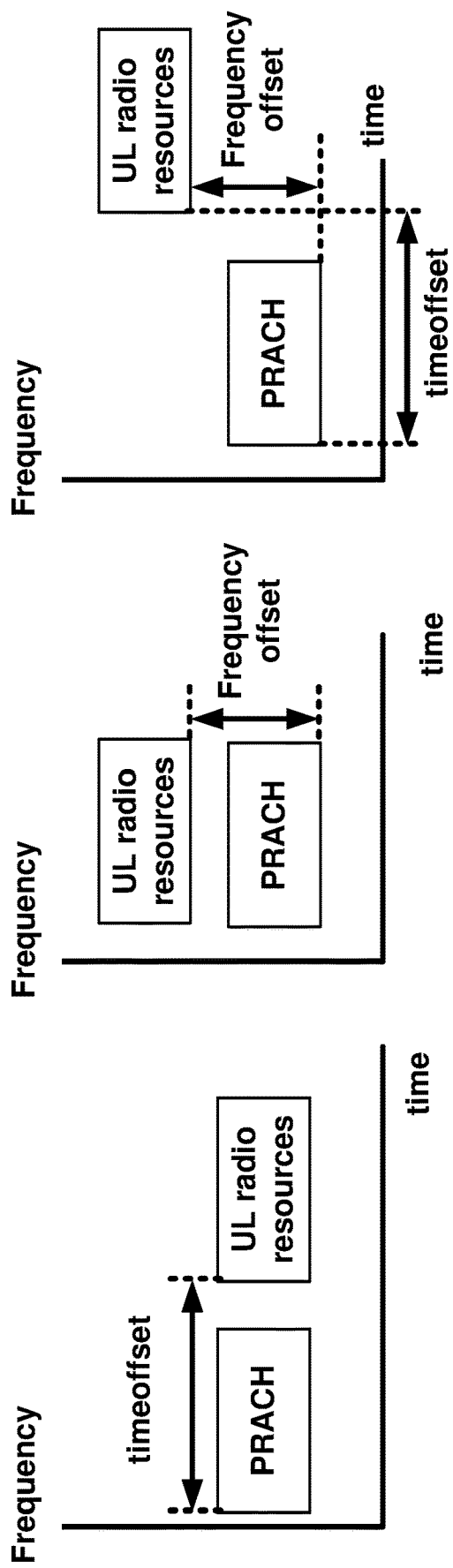

UPLINK RESOURCE MANAGEMENT IN TWO-STEP RANDOM-ACCESS PROCEDURES

CROSS-REFERENCE TO RELATED APPLICATIONS

This application is a continuation application of U.S. patent application Ser. No. 17/344,071, filed Jun. 10, 2021, which is a continuation application of International Application No. PCT/US2020/012177, filed Jan. 3, 2020, which claims the benefit of U. S. Provisional Application No. 62/788,612, filed Jan. 4, 2019, the contents of each of which are hereby incorporated by reference in their entireties.

BRIEF DESCRIPTION OF THE SEVERAL VIEWS OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

FIG. 7A and FIG. 7B are diagrams depicting example sets of OFDM subcarriers as per an aspect of an embodiment of the present disclosure.

FIG. 17A, FIG. 17B, and FIG. 17C are examples of radio resource allocations of a PRACH resource and one or more associated UL radio resources as per an aspect of an embodiment of the present disclosure.

DETAILED DESCRIPTION OF EMBODIMENTS

Figure 1:
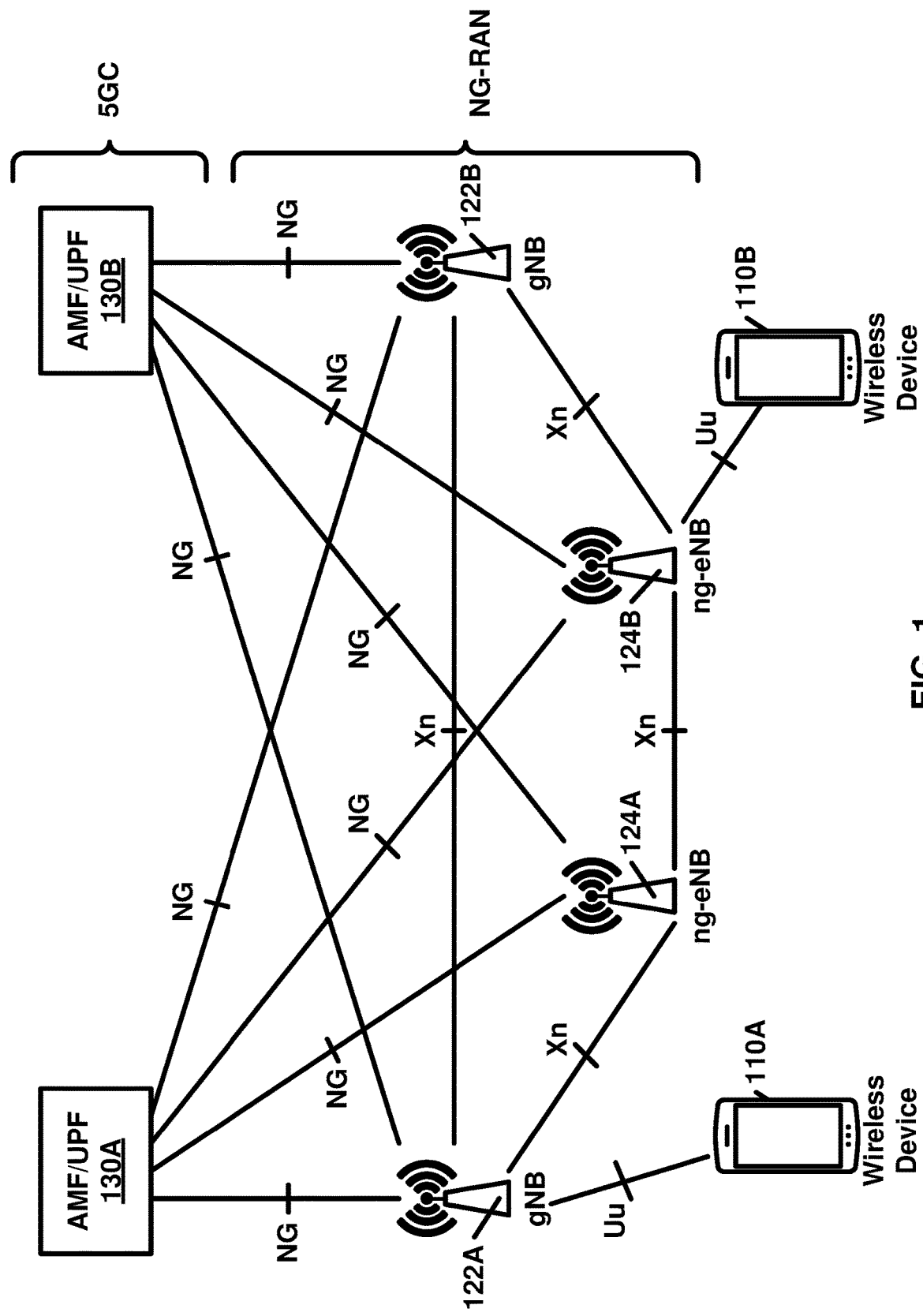
FIG. 1 is a diagram of an example RAN architecture as per an aspect of an embodiment of the present disclosure.

Example embodiments of the present disclosure enable operation of random-access procedure. Embodiments of the technology disclosed herein may be employed in the technical field of multicarrier communication systems. More particularly, the embodiments of the technology disclosed herein may relate to random-access procedure in a multi-carrier communication system.

The following Acronyms are used throughout the present disclosure:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel Identifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, 1024-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 120C, 120D), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface.

A gNB or an ng-eNB may host functions such as radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide functions such as NG interface management, UE context management, UE mobility management, transport of NAS messages, paging, PDU session management, configuration transfer or warning message transmission.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
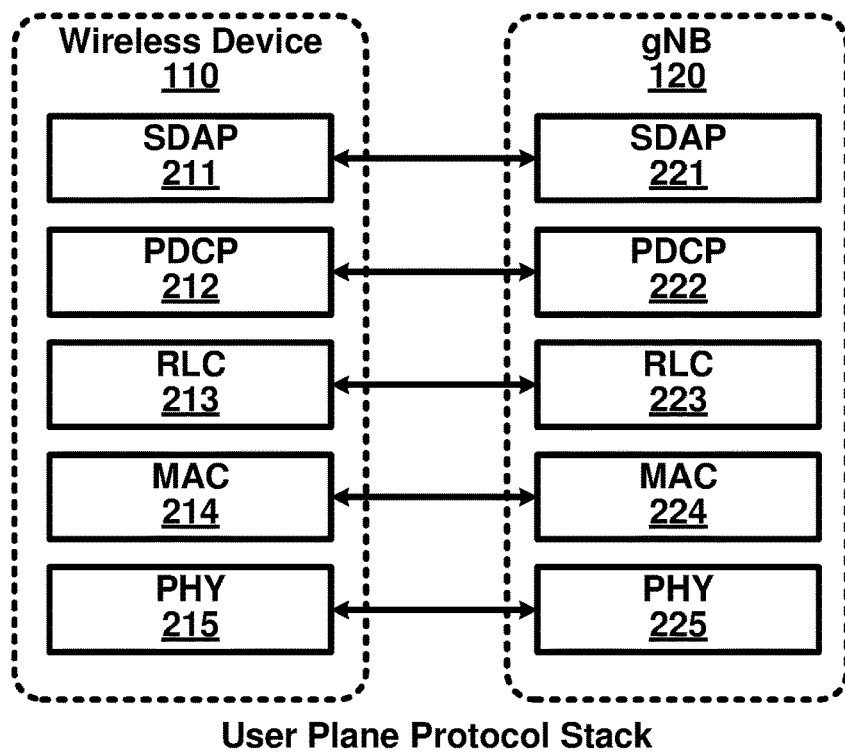
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
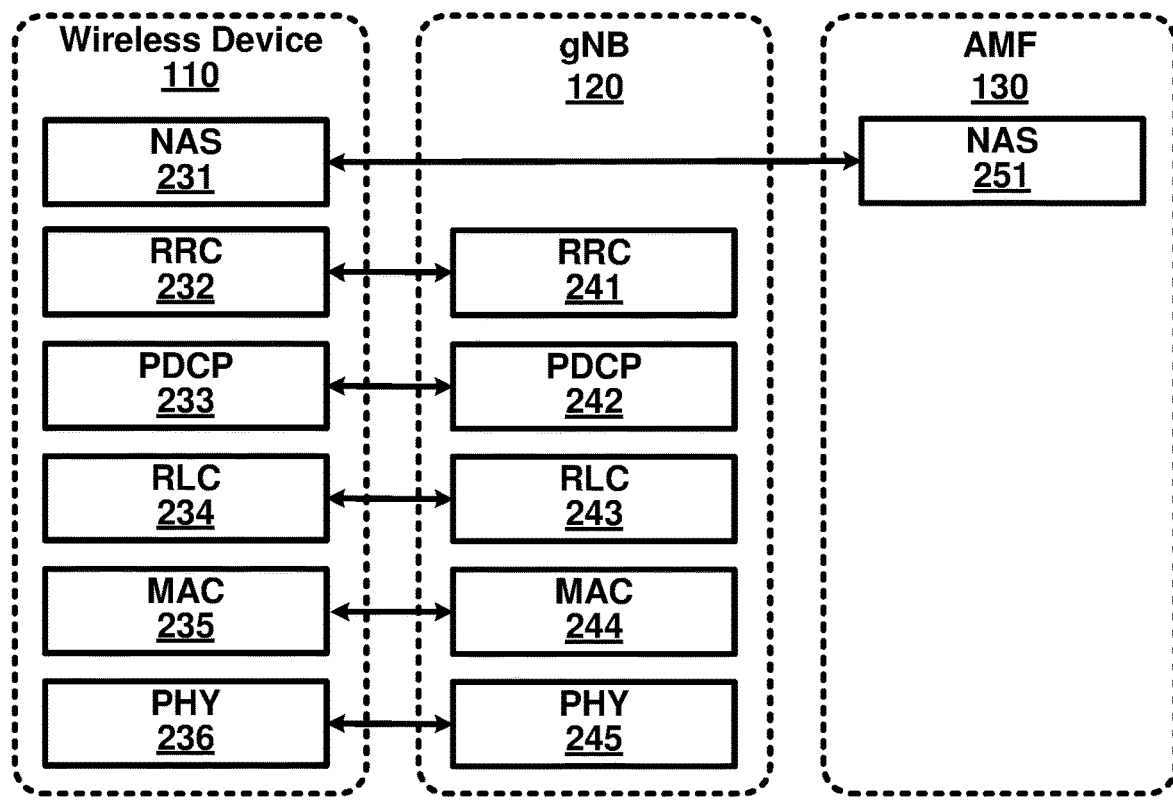
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
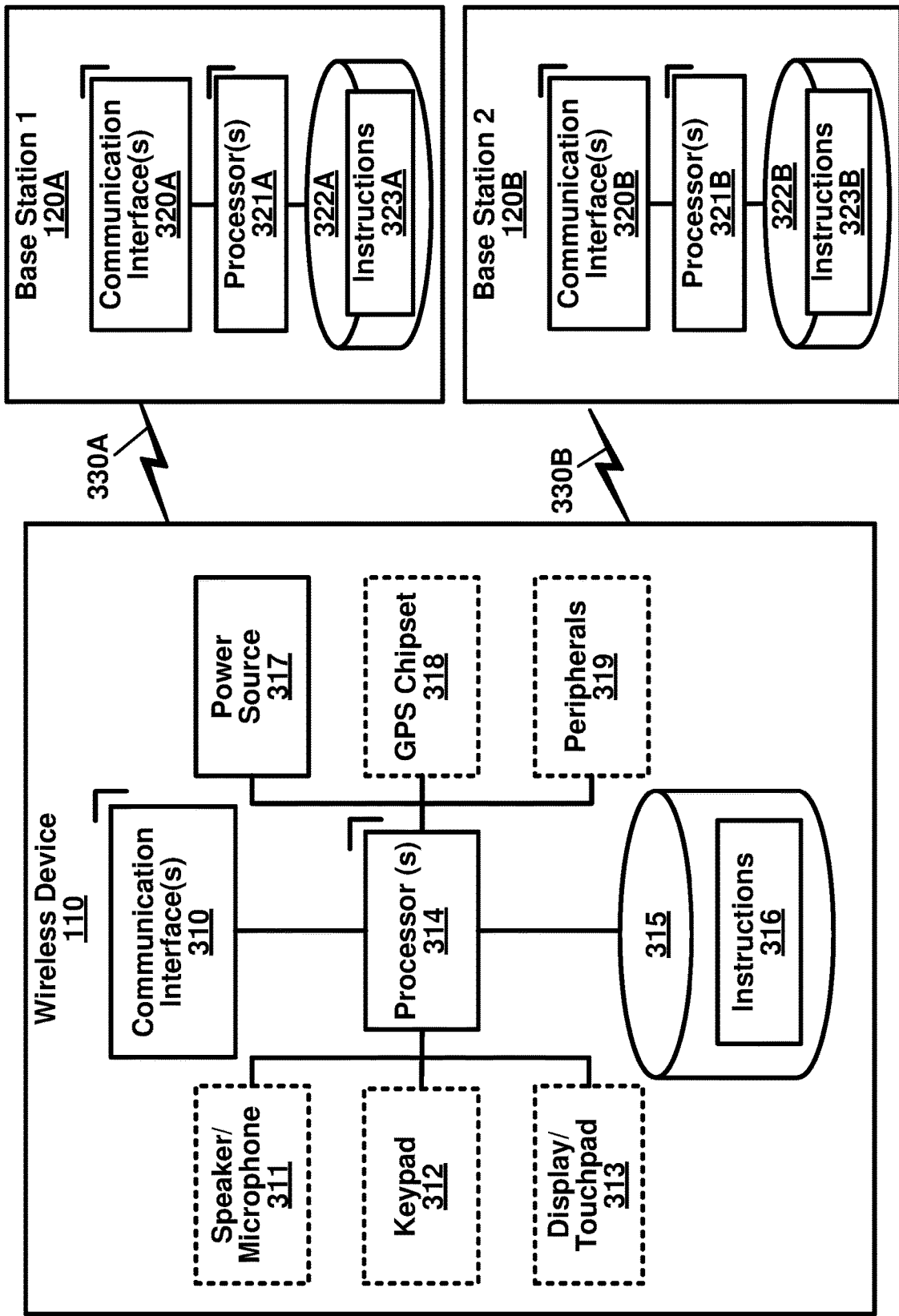
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). An other SI may be transmitted via SystemInformationBlockType2. For a wireless device in an RRC_Connected state, dedicated RRC signalling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signalling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
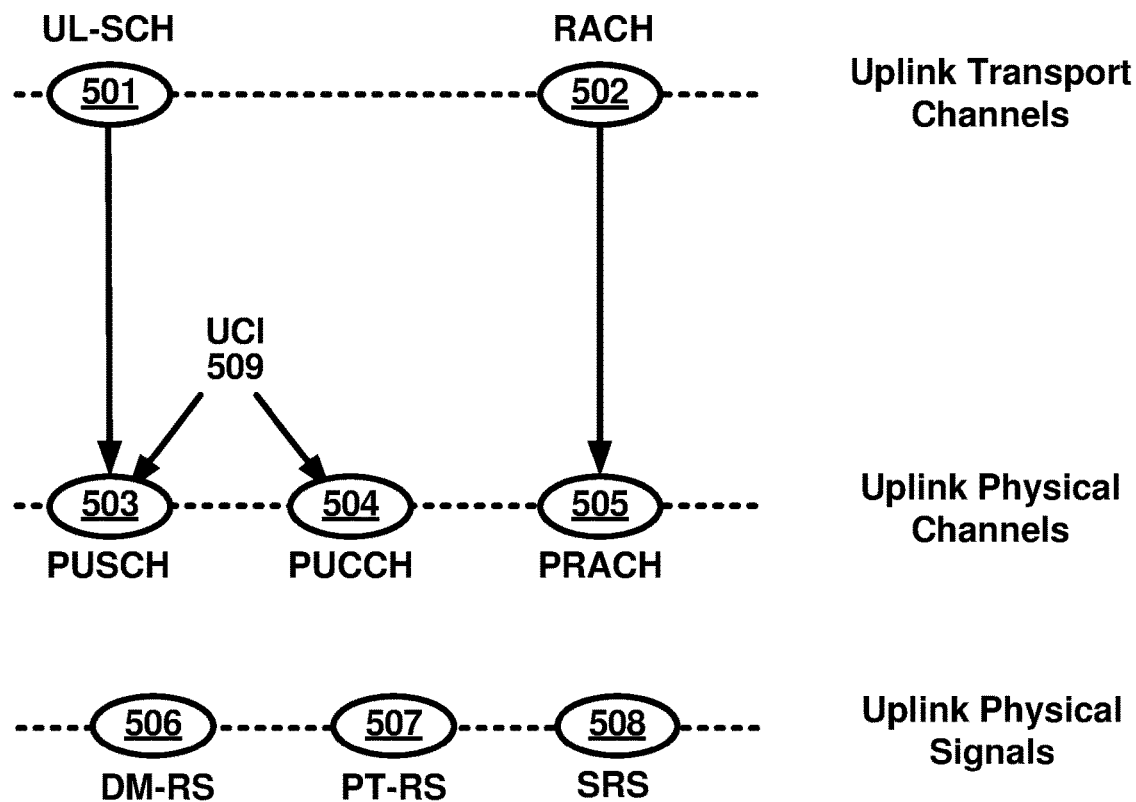
FIG. 5A is a diagram of an example uplink channel mapping and example uplink physical signals as per an aspect of an embodiment of the present disclosure.
Figure 5B:
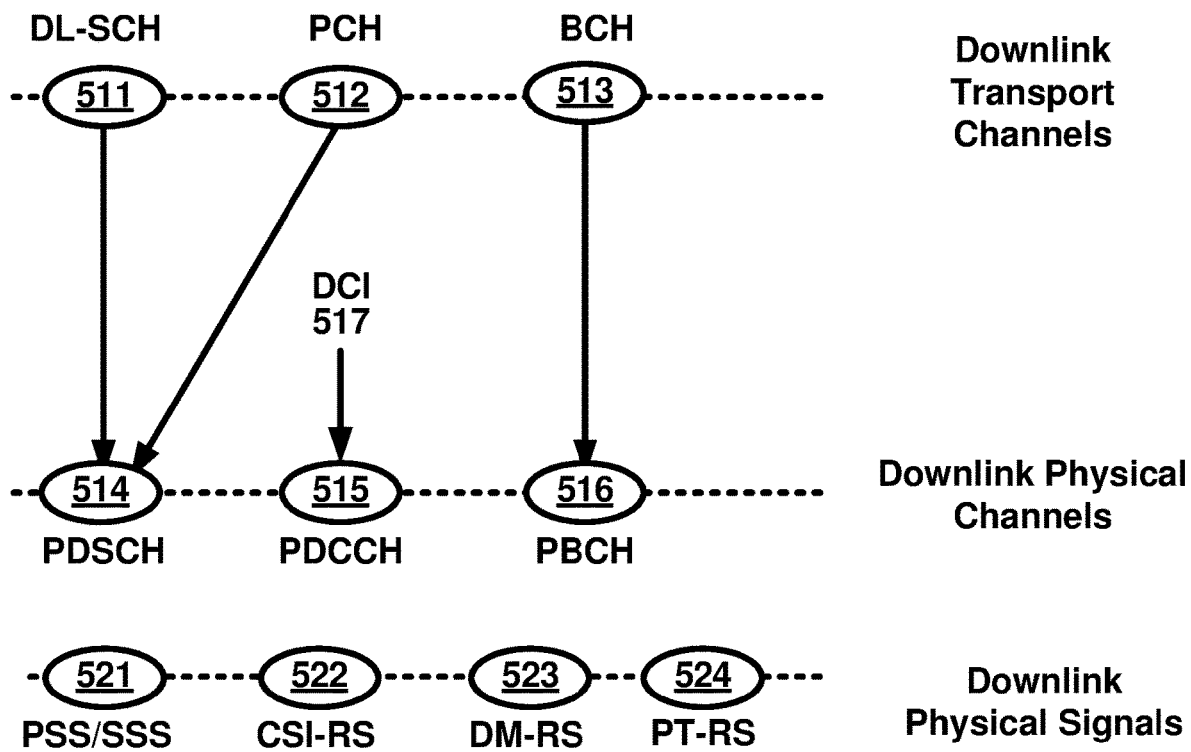
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ a same OFDM symbols for downlink CSI-RS 522 and SS/PBCH blocks when the downlink CSI-RS 522 and SS/PBCH blocks are spatially quasi co-located and resource elements associated with the downlink CSI-RS 522 are the outside of PRBs configured for SS/PBCH blocks.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
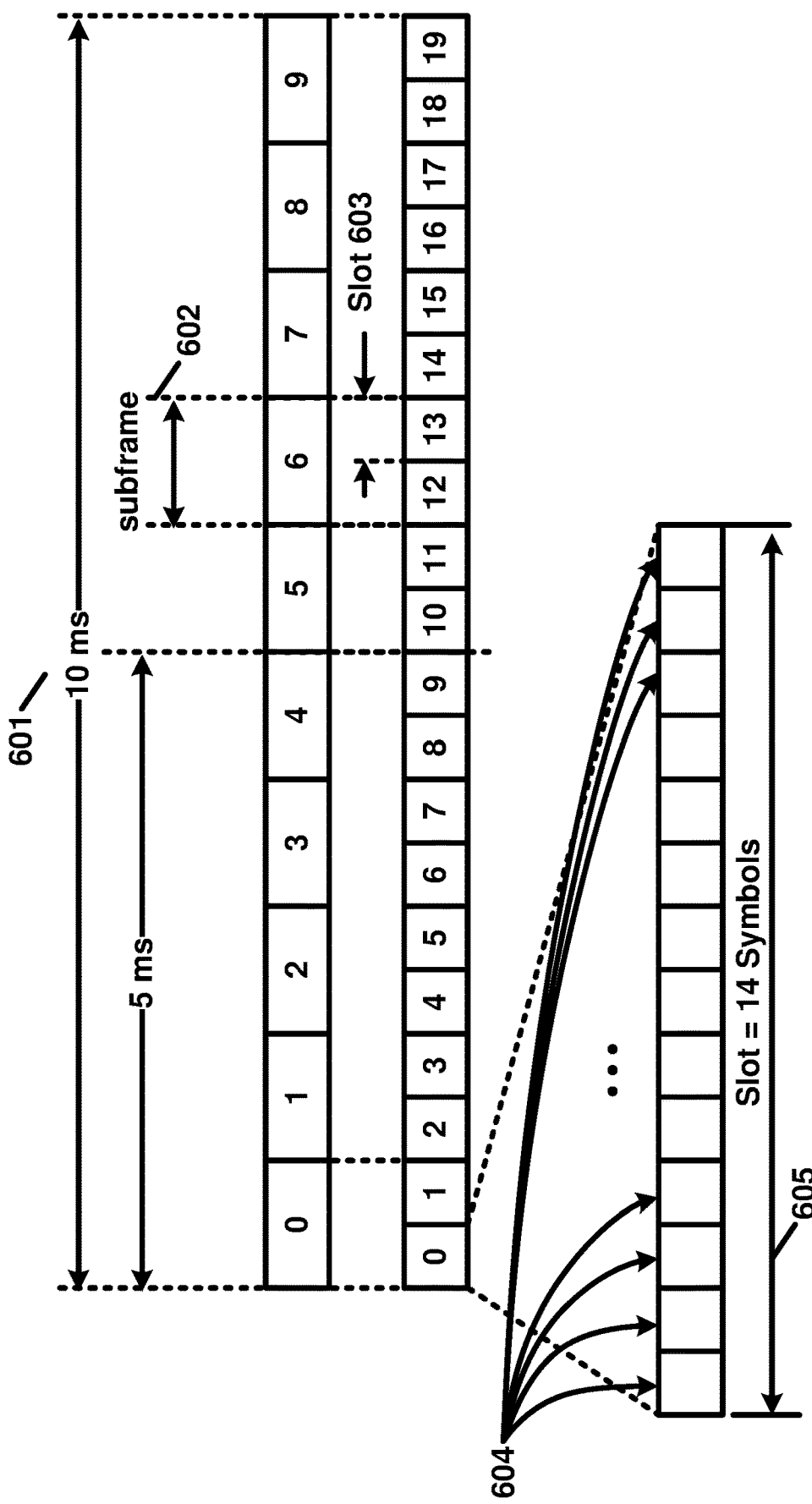
FIG. 6 is a diagram depicting an example transmission time or reception time for a carrier as per an aspect of an embodiment of the present disclosure.

FIG. 6 is a diagram depicting an example transmission time and reception time for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame timing. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
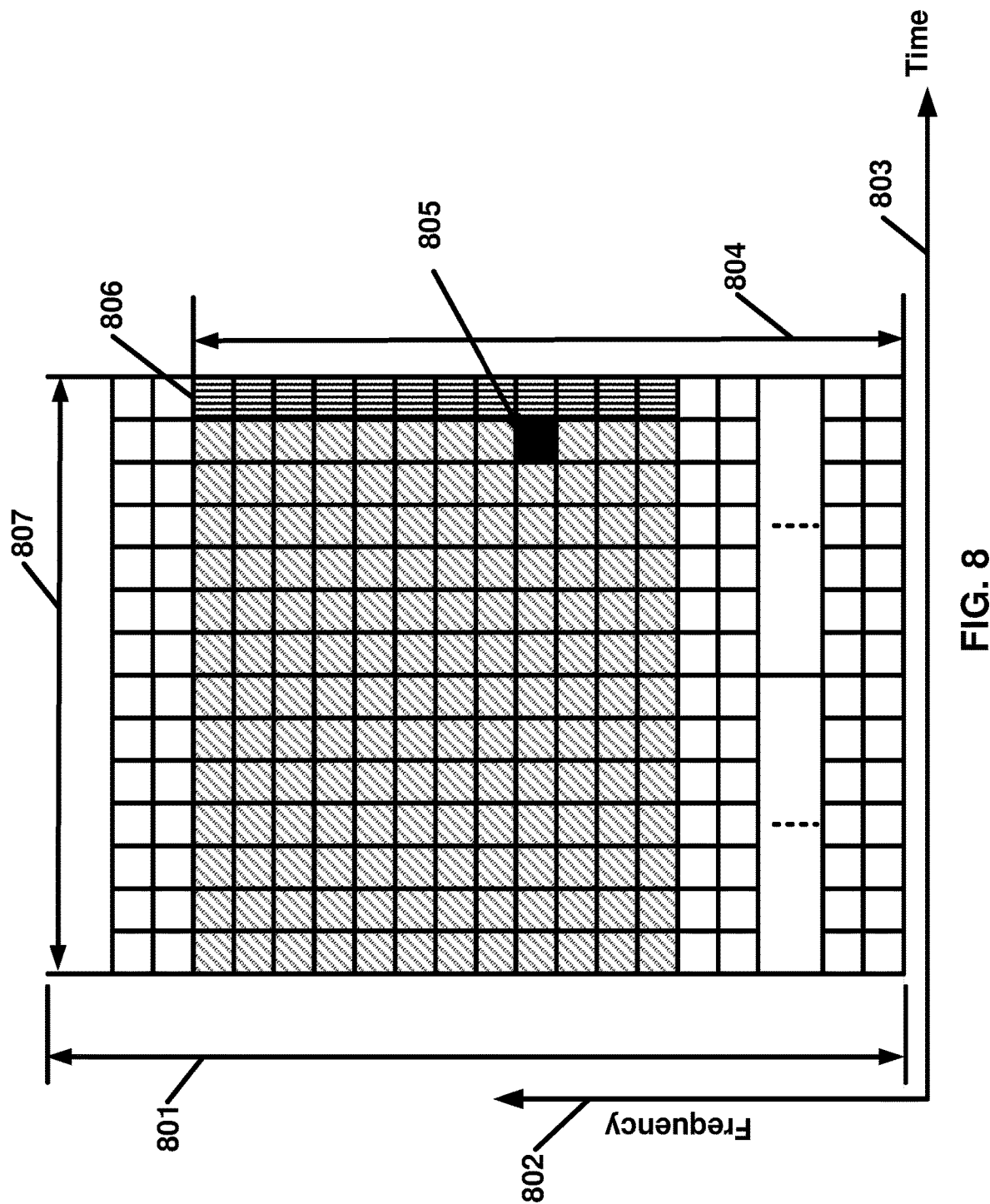
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS- RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCLed with the DM-RS antenna port(s). Different set of DM-RS antenna port(s) for a DL data channel may be indicated as QCL with different set of the RS antenna port(s).

Figure 9A:
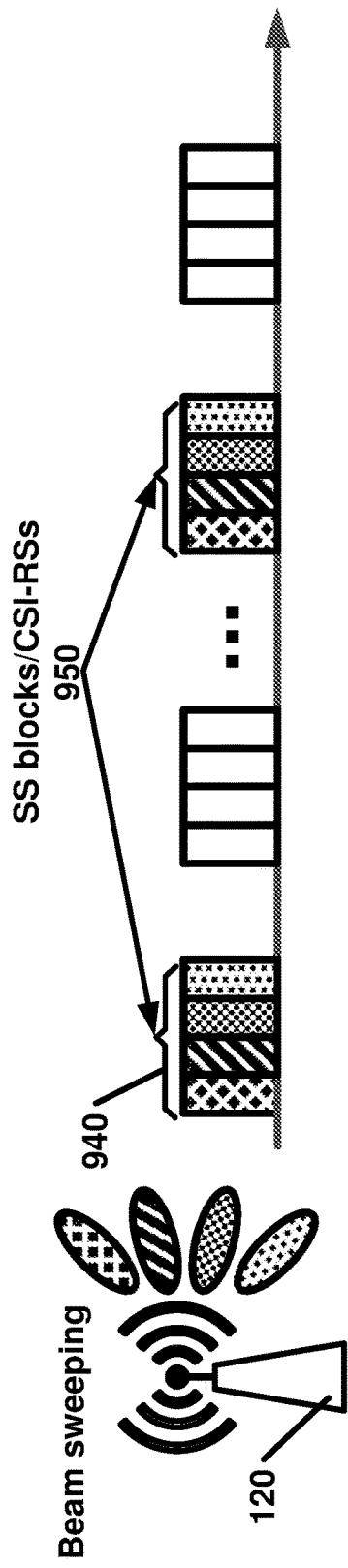
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
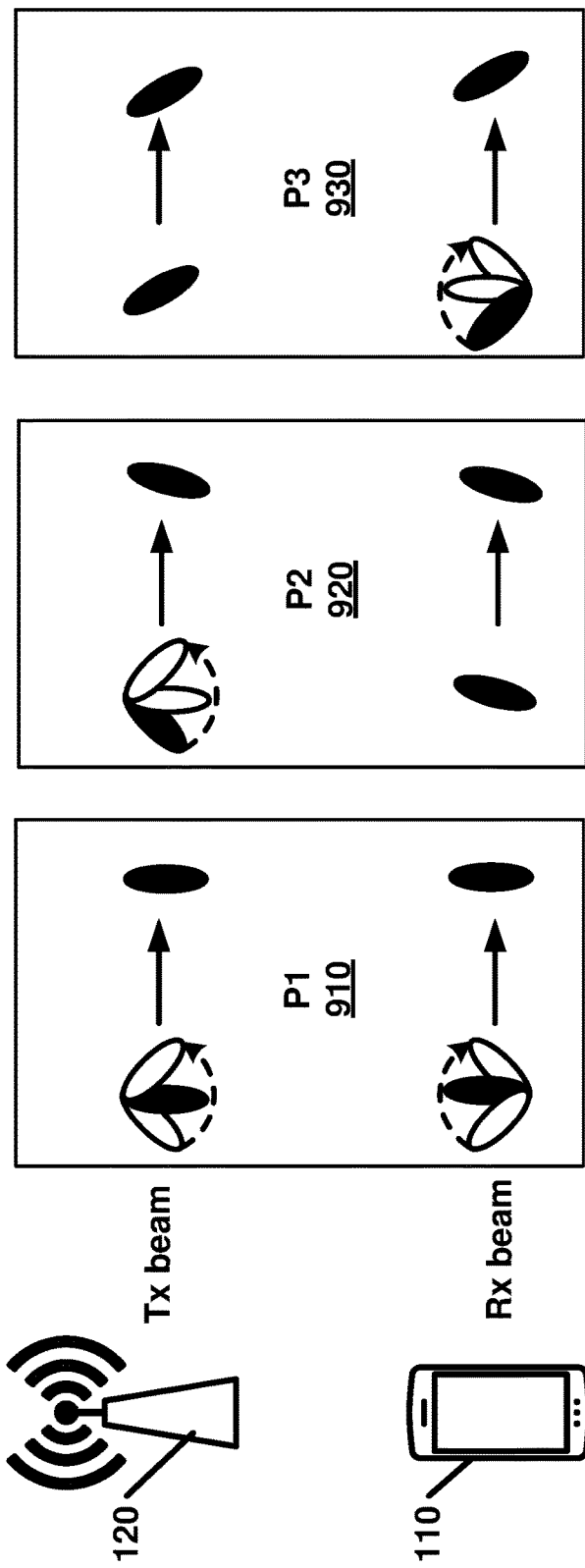
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
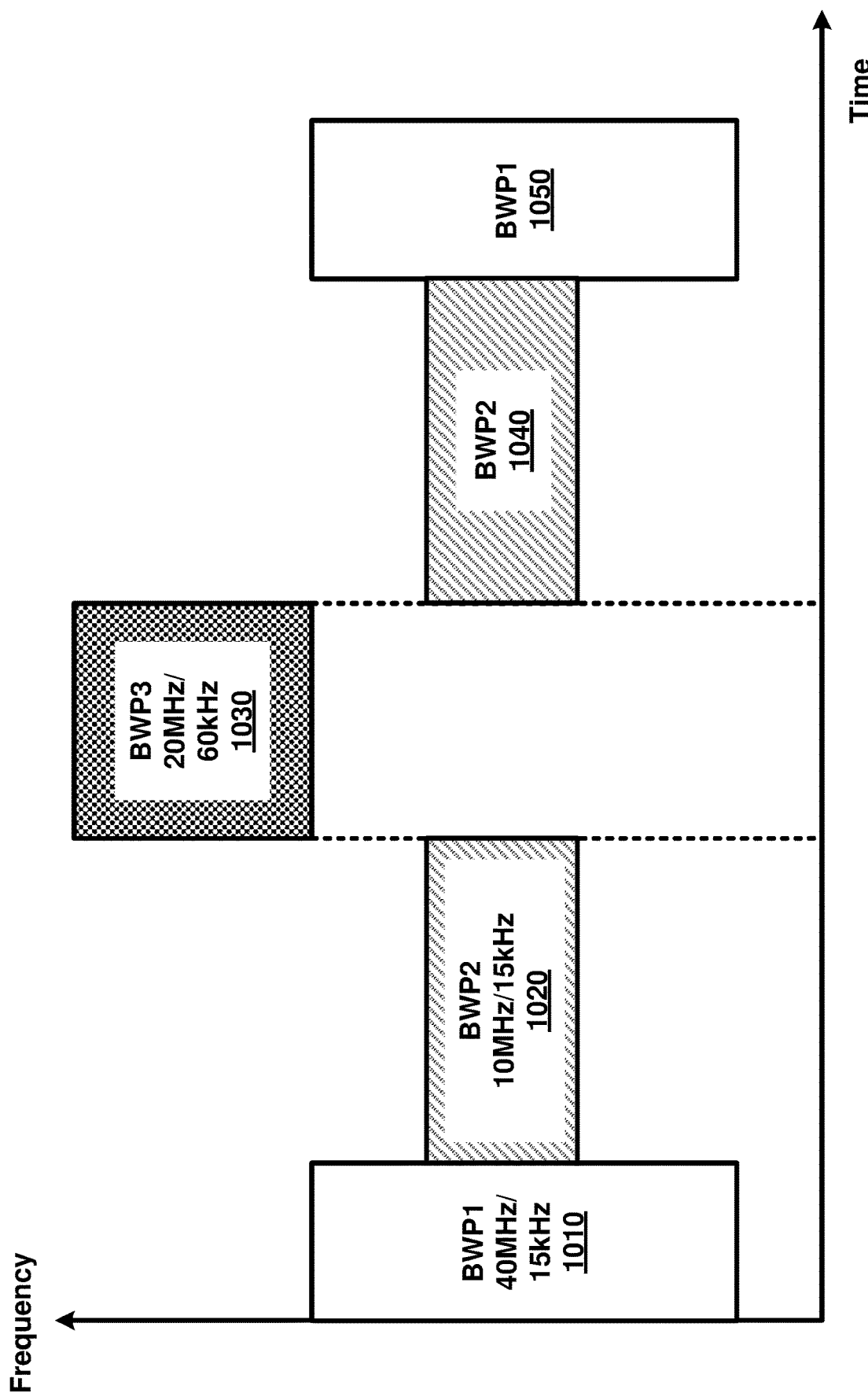
FIG. 10 is an example diagram of configured bandwidth parts (BWPs) as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base station may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
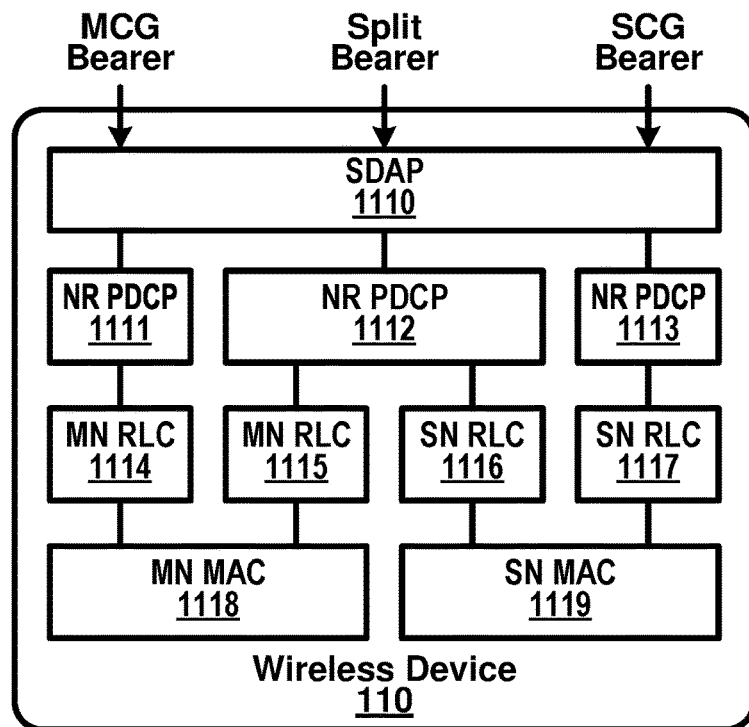
FIG. 11A and FIG. 11B are diagrams of an example multi connectivity as per an aspect of an embodiment of the present disclosure.
Figure 11B:
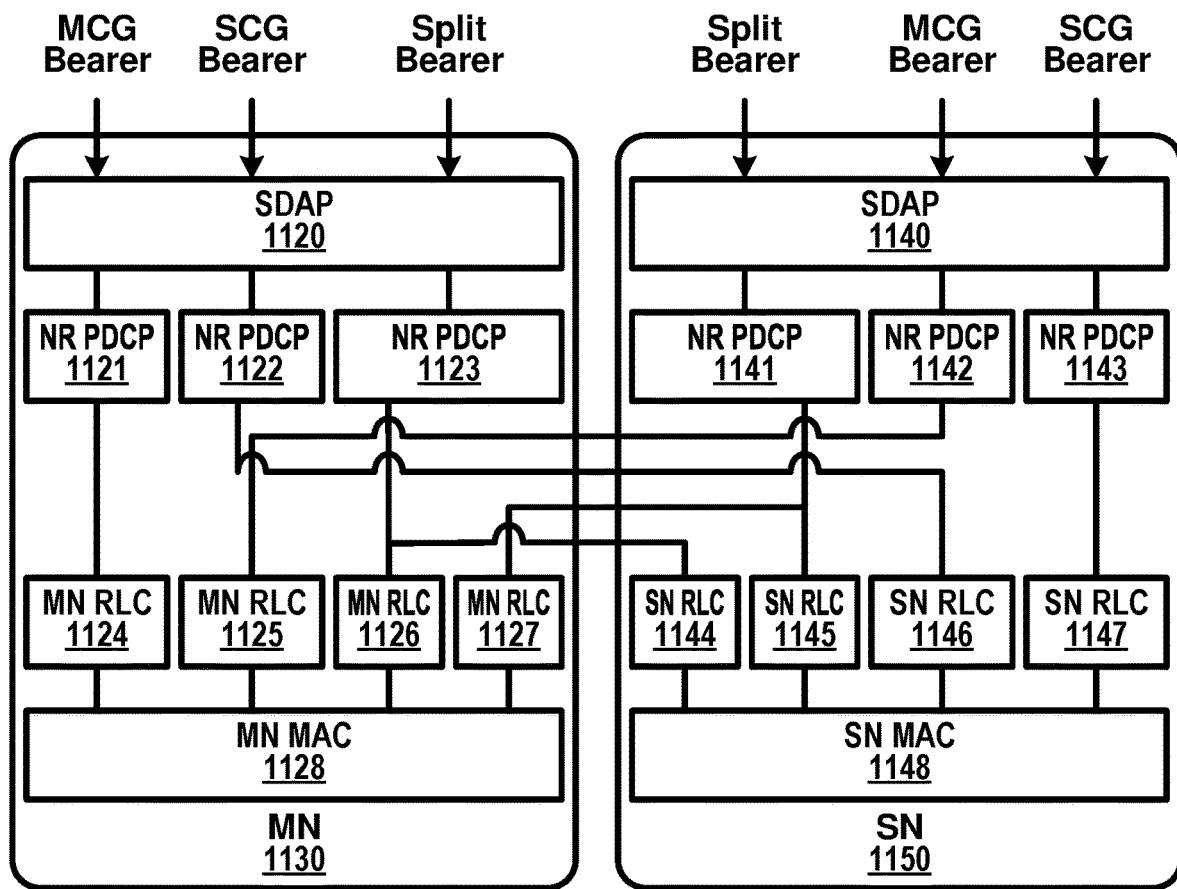

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 12:
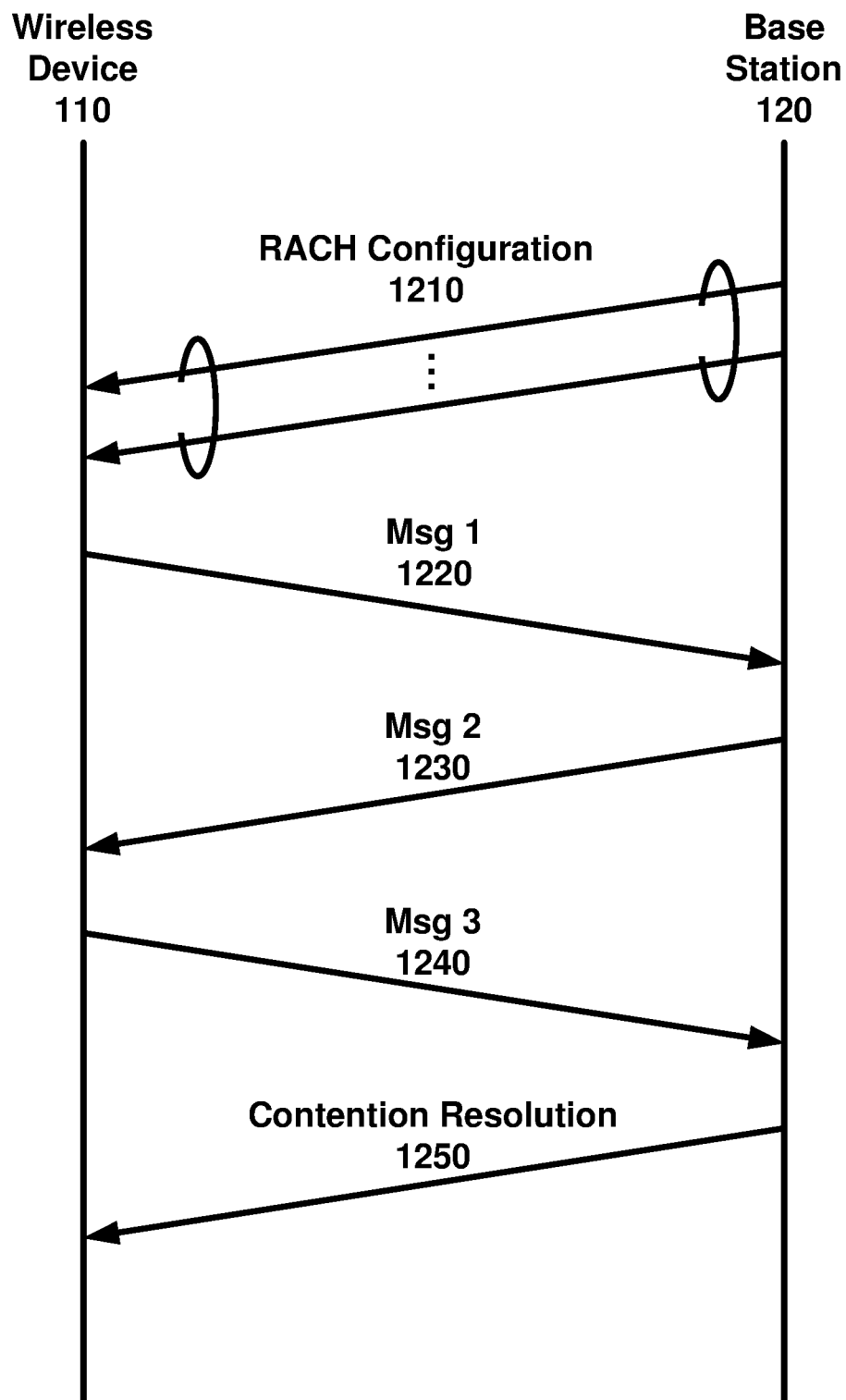
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronised, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-ResponseWindow) to monitor a random access response. For beam failure recovery request, a base station may configure a UE with a different time window (e.g., bfr-ResponseWindow) to monitor response on beam failure recovery request. For example, a UE may start a time window (e.g., ra-ResponseWindow or bfr-ResponseWindow) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
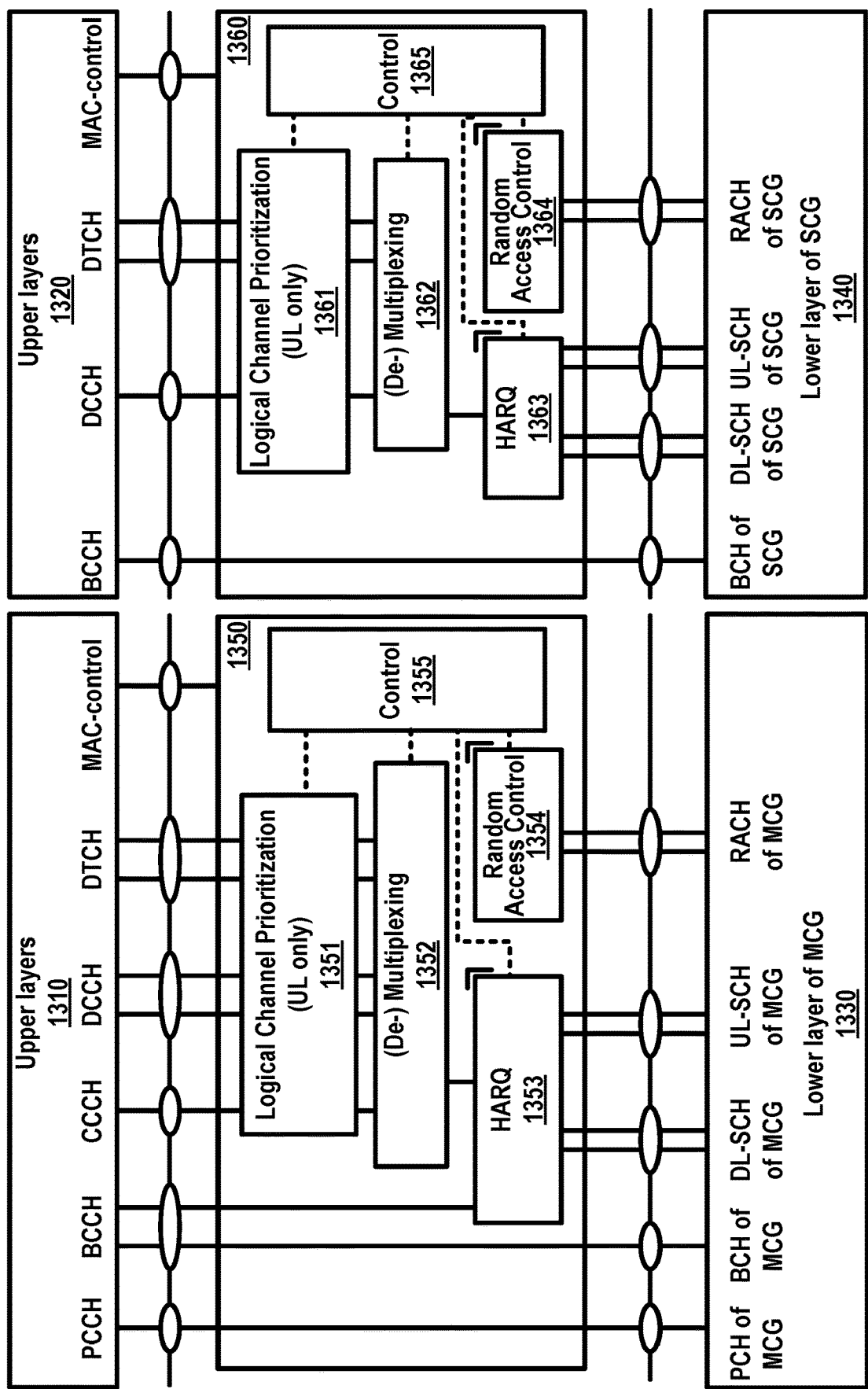
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
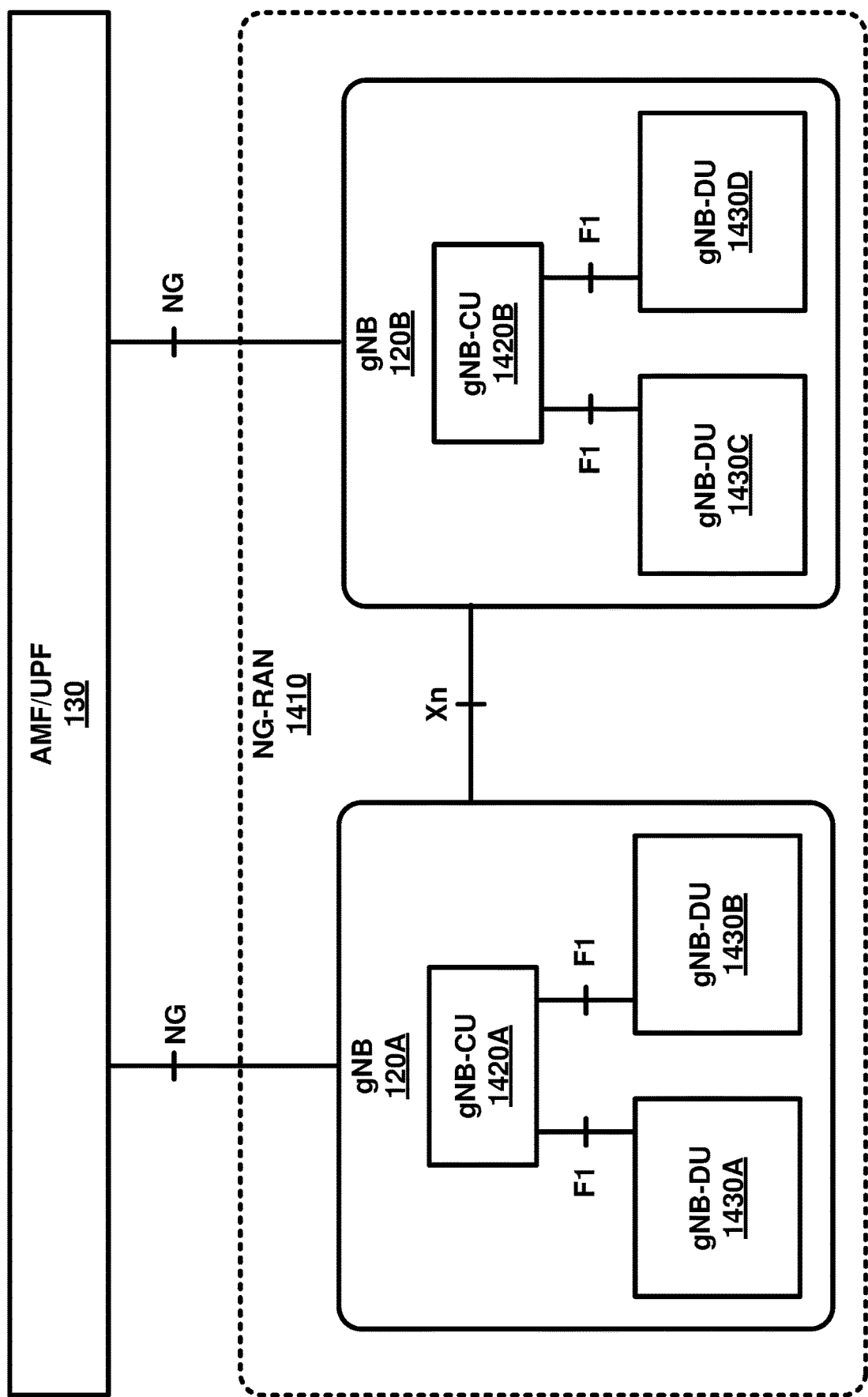
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. gNB 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
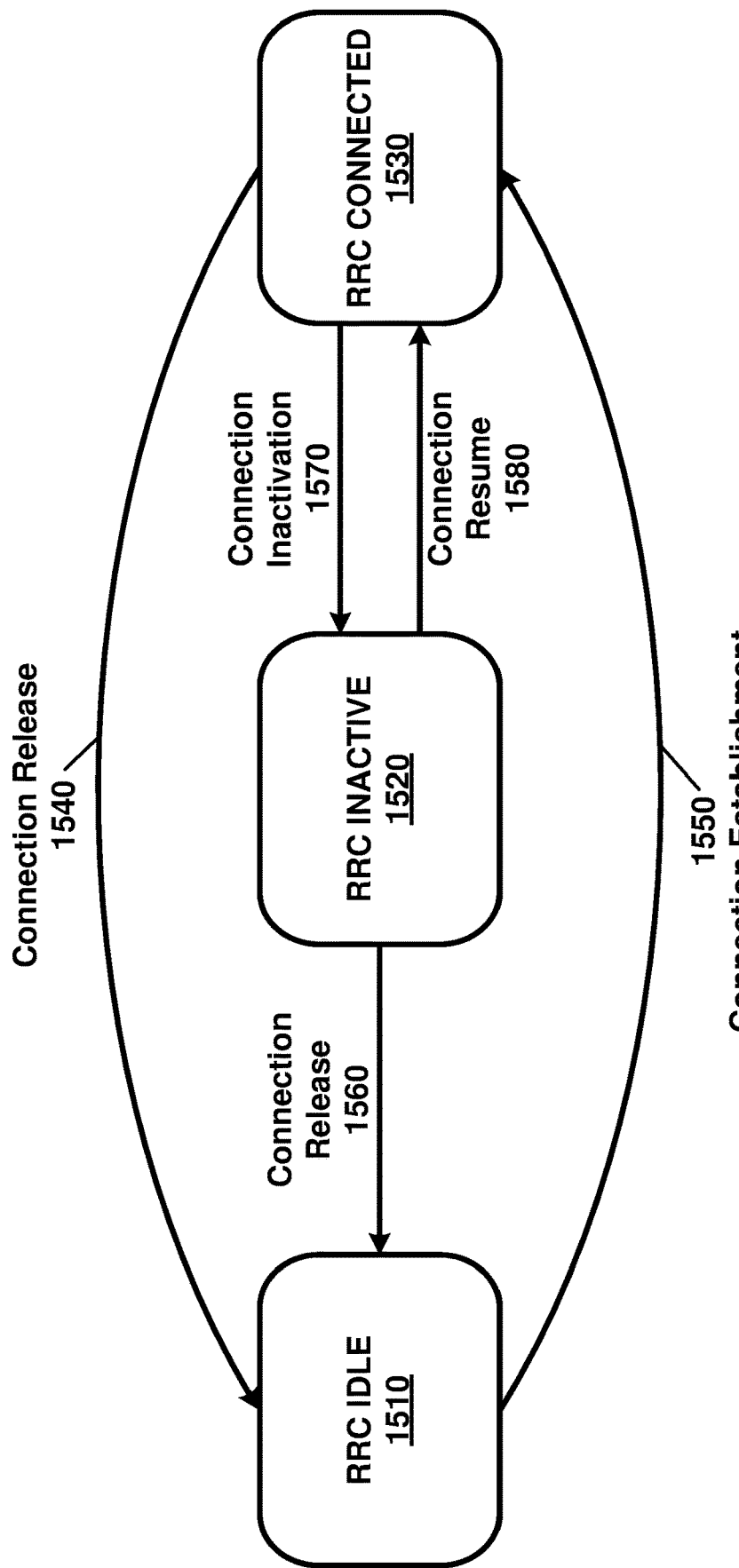
FIG. 15 is a diagram of example RRC states as per an aspect of an embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A gNB may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer. Example embodiments of enhancing the one or more radio technologies may improve performance of a wireless network. Example embodiments may increase the system throughput, or data rate of transmission. Example embodiments may reduce battery consumption of a wireless device. Example embodiments may improve latency of data transmission between a gNB and a wireless device. Example embodiments may improve network coverage of a wireless network. Example embodiments may improve transmission efficiency of a wireless network.

Example Downlink Control Information (DCI)

In an example, a gNB may transmit a DCI via a PDCCH for at least one of: scheduling assignment/grant; slot format notification; pre-emption indication; and/or power-control commends. More specifically, the DCI may comprise at least one of: identifier of a DCI format; downlink scheduling assignment(s); uplink scheduling grant(s); slot format indicator; pre-emption indication; power-control for PUCCH/PUSCH; and/or power-control for SRS.

In an example, a downlink scheduling assignment DCI may comprise parameters indicating at least one of: identifier of a DCI format; PDSCH resource indication; transport format; HARQ information; control information related to multiple antenna schemes; and/or a command for power control of the PUCCH.

In an example, an uplink scheduling grant DCI may comprise parameters indicating at least one of: identifier of a DCI format; PUSCH resource indication; transport format; HARQ related information; and/or a power control command of the PUSCH.

In an example, a wireless device may monitor one or more PDCCH for detecting one or more DCI with one or more DCI format, in common search space or wireless device-specific search space. In an example, a wireless device may monitor PDCCH with a limited set of DCI format, to save power consumption. The more DCI format to be detected, the more power be consumed at the wireless device.

In an example, the information in the DCI formats for downlink scheduling may comprise at least one of: identifier of a DCI format; carrier indicator; frequency domain resource assignment; time domain resource assignment; bandwidth part indicator; HARQ process number; one or more MCS; one or more NDI; one or more RV; MIMO related information; Downlink assignment index (DAI); PUCCH resource indicator; PDSCH-to-HARQ_feedback timing indicator; TPC for PUCCH; SRS request; and padding if necessary. In an example, the MIMO related information may comprise at least one of: PMI; precoding information; transport block swap flag; power offset between PDSCH and reference signal; reference-signal scrambling sequence; number of layers; and/or antenna ports for the transmission; and/or Transmission Configuration Indication (TCI).

In an example, the information in the DCI formats used for uplink scheduling may comprise at least one of: an identifier of a DCI format; carrier indicator; bandwidth part indication; resource allocation type; frequency domain resource assignment; time domain resource assignment; MCS; NDI; Phase rotation of the uplink DMRS; precoding information; CSI request; SRS request; Uplink index/DAI; TPC for PUSCH; and/or padding if necessary.

In an example, a gNB may perform CRC scrambling for a DCI, before transmitting the DCI via a PDCCH. The gNB may perform CRC scrambling by binary addition of multiple bits of at least one wireless device identifier (e.g., C-RNTI, CS-RNTI, TPC-CS-RNTI, TPC-PUCCH-RNTI, TPC-PUSCH-RNTI, SP CSI C-RNTI, or TPC-SRS-RNTI) and the CRC bits of the DCI. The wireless device may check the CRC bits of the DCI, when detecting the DCI. The wireless device may receive the DCI when the CRC is scrambled by a sequence of bits that is the same as the at least one wireless device identifier.

In an example, in order to support wide bandwidth operation, a gNB may transmit one or more PDCCH in different control resource sets (coresets). A gNB may transmit one or more RRC message comprising configuration parameters of one or more coresets. A coreset may comprise at least one of: a first OFDM symbol; a number of consecutive OFDM symbols; a set of resource blocks; a CCE-to-REG mapping. In an example, a gNB may transmit a PDCCH in a dedicated coreset for particular purpose, for example, for beam failure recovery confirmation.

Example of 2-Step RACH Procedure

Random access (RA) procedures may be used to establish communications between a wireless device and a base station in a cell. A four-step RA procedure in FIG. 12 may have an associated latency, e.g., which may be a minimum of fourteen transmission time intervals (TTI). Reducing the number of steps in an RA procedure may reduce latency. By using parallel transmissions, a four-step RA procedure may be reduced to a two-step RA procedure. A two-step RA procedure may have an associated latency, e.g., which may be a minimum of four TTIs and which may be less than an associated latency for a four-step RA procedure.

Figure 16:
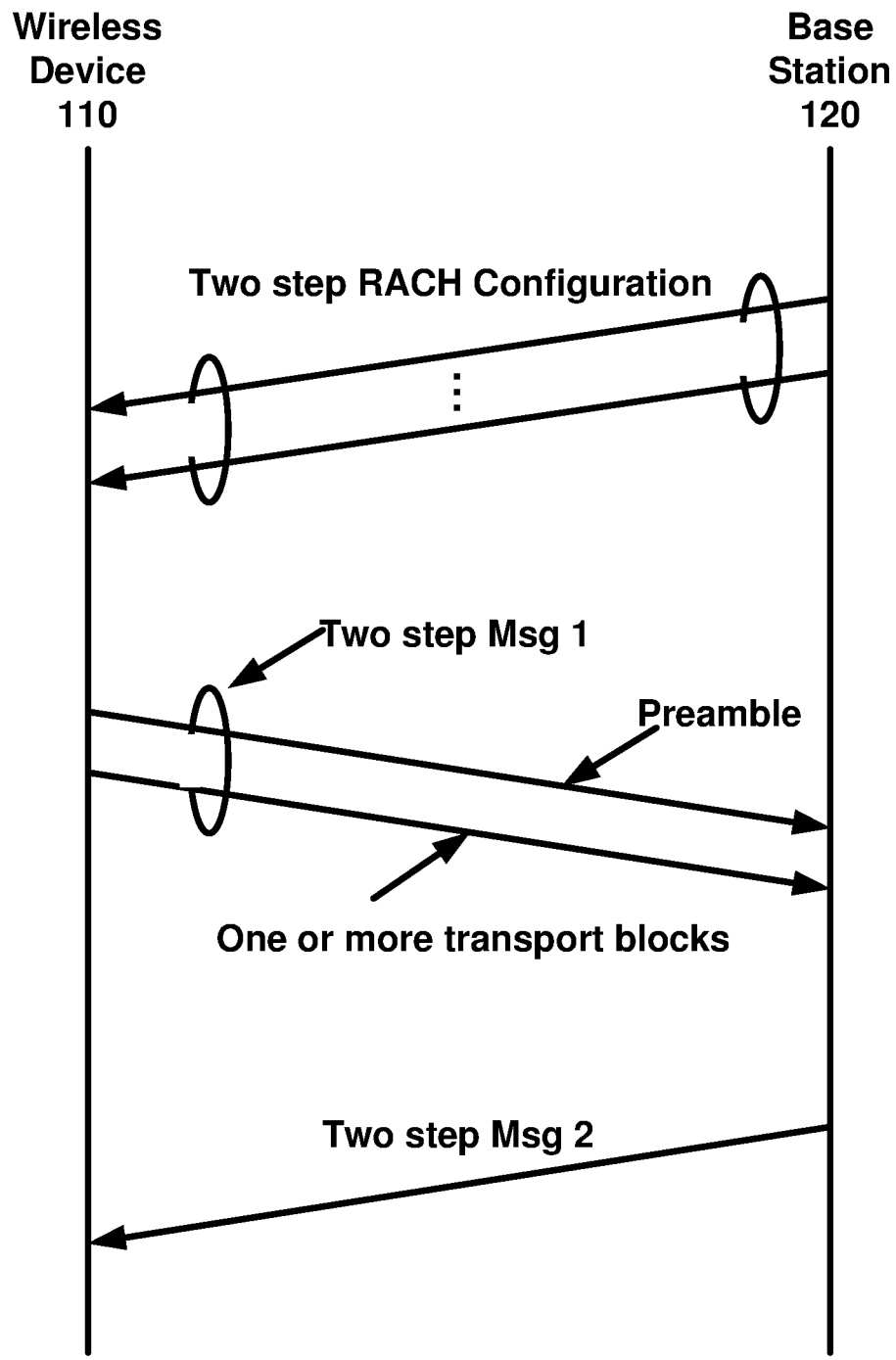
FIG. 16 is an example of a two-step RA procedure as per an aspect of an embodiment of the present disclosure.

FIG. 16 is an example of a two-step RA procedure that may comprise an uplink (UL) transmission of a two-step Msg1 that may comprise a random access preamble (RAP) transmission and one or more transport blocks transmission, followed by a downlink (DL) transmission of a two-step Msg2 that may comprise a response, e.g., random access response (RAR), corresponding to the uplink transmission. The response may comprise contention resolution information. For example, the two-step Msg1 may be also referred to as a message A (MsgA). For example, the two-step Msg2 may be also referred to as a message B (MsgB).

A base station may transmit one or more RRC messages to configure a wireless device with one or more parameters of two step RACH configuration. The one or more RRC messages may broadcast or multicast to one or more wireless devices. The one or more RRC messages may be wireless device-specific messages, e.g., a dedicated RRC message transmitted to a wireless device with RRC INACTIVE 1520 or RRC CONNECTED 1530. The one or more RRC messages may comprise parameters required for transmitting a two-step Msg1 in FIG. 16. For example, the parameter may indicate at least one of following: PRACH resource allocation, preamble format, SSB information (e.g., total number of SSBs, downlink resource allocation of SSB transmission, transmission power of SSB transmission, and/or other information), and uplink radio resources for one or more transport block transmissions.

In the UL transmission of a two-step RA procedure, a wireless device may transmit, via a cell and to a base station, a RAP for UL time alignment and/or one or more transport blocks (e.g., delay-sensitive data, wireless device ID, security information, device information such as IMSI, and/or other information). In the DL transmission of the two-step RA procedure, a base station may transmit a two-step Msg2 (e.g., an RAR) that may comprise at least one of following: a timing advance command indicating the TA value, a power control command, an UL grant (or RAR UL grant), a wireless device ID for contention resolution, an RNTI (e.g., C-RNTI or TC-RNTI), and/or other information. The two-step Msg2 (e.g., an RAR) may comprise a preamble identifier corresponding to the preamble, a positive or negative acknowledgement of a reception of the one or more transport blocks, and/or an indication of a successful decoding of the one or more transport blocks. A two-step RA procedure may reduce RA latency compared with a four-step RA procedure, e.g., by integrating a random access preamble transmission (e.g., a process to obtain a timing advance value) with one or more transport block transmissions.

In the UL transmission of a two-step RA procedure, a wireless device may transmit, via a cell and to a base station, a RAP in parallel with one or more TBs. The wireless device may acquire one or more configuration parameters for the UL transmission before the wireless device starts a two-step RA procedure. For example, the one or more configuration parameters may indicate at least one of following: PRACH resource allocation, preamble format, SSB information (e.g., a number of transmitting SSBs, downlink resource allocation of SSB transmissions, transmission power of SSB transmission, and/or other information), uplink radio resources (in terms of time, frequency, code/sequence/signature) for one or more transport block transmissions, and power control parameters of one or more TB transmissions (e.g., cell and/or UE specific power adjustments used for calculating received target power, inter-cell interference control parameter that may be used as a scaling factor of pathloss measurement, reference signal power to calculate for pathloss measurement, and/or one or more margins).

In a two-step RA procedure, a wireless device may transmit the RAP via a RACH resource indicated by a two-step RACH configuration. The wireless device may transmit one or more TBs via an UL radio resource indicated by a two-step RACH configuration. The transmission of the RAP may be overlapped in time (partially or entirely) with the transmission of the one or more TBs. The two-step RACH configuration may indicate a portion of overlapping of radio resources between the RAP and one or more TB transmissions. The two-step RACH configuration may indicate one or more UL radio resources associated with one or more RAPs (or RAP groups) and/or the RACH resource. For example, based on a selection of an RAP, an RAP group, and/or an RACH resource, a wireless device may determine at least one UL radio resource where the wireless device transmits one or more TBs as a part of a two-step RACH procedure. The one or more UL radio resources may be indicated based on a frame structure in FIG. 6, and/or OFDM radio structure in FIG. 8, e.g., with respect to an SFN (SNR=0), slot number, and/or OFDM symbol number for a time domain radio resource, and/or with respect to a sub-carrier number, a number of resource elements, a number of resource blocks, RBG number, and/or frequency index for a frequency domain radio resource. For example, the one or more UL radio resources may be indicated based on a time offset and/or a frequency offset with respect to one or more RACH resources of a selected RAP. The UL transmissions may occur, e.g., in the same subframe (or slot/mini-slot), in consecutive subframes (or slot/mini-slot), or in the same burst.

For example, a PRACH resource and one or more associated UL radio resources for a two-step Msg1 may be allocated with a time offset and/or frequency offset, e.g., provided by RRC messages (as a part of RACH config.) and/or predefined (e.g., as a mapping table). FIG. 17A, FIG. 17B, and FIG. 17C are examples of radio resource allocations of a PRACH resource and one or more associated UL radio resources based on a time offset, a frequency offset, and a combination of a time offset and a frequency offset, respectively. The examples in FIG. 17A, FIG. 17B, and FIG. 17C may be a case of a PRACH resource and a UL radio resource where a single SSB transmission is configured. The examples may be a case of a PRACH resource and a UL radio resource associated with a first SSB transmission of one or more SSB transmissions.

In an example, a base station may employ the RAP to adjust UL transmission time for a cell and/or to aid in channel estimation for one or more TBs. A portion of the UL transmission for one or more TBs in a two-step RACH procedure may comprise, e.g., a wireless device ID, a C-RNTI, a service request such as buffer state reporting (e.g., a buffer status report) (BSR), one or more user data packets, and/or other information. A wireless device in an RRC CONNECTED state may use a C-RNTI as an identifier of the wireless device (e.g., a wireless device ID). A wireless device in an RRC INACTIVE state may use a C-RNTI (if available), a resume ID, or a short MAC-ID as an identifier of the wireless device. A wireless device in an RRC IDLE state may use a C-RNTI (if available), a resume ID, a short MACID, an IMSI (International Mobile Subscriber Identifier), a T-IMSI (Temporary-IMSI), and/or a random number as an identifier of the wireless device.

In a two-step RACH procedure, the UL transmission may comprise one or more TBs that may be transmitted in one or more ways. One or more transport blocks may be multiplexed with an RAP transmission in time and/or frequency domains. A base station may configure one or more resources reserved for the UL transmission that may be indicated to a wireless device before the UL transmission. If a wireless device transmits one or more TBs in a two-step Msg1 of a two-step RA procedure, a base station may transmit in a two-step Msg2 (e.g., an RAR) that may comprise a contention resolution message and/or an acknowledgement (ACK or NACK) message of the one or more TBs. A wireless device may transmit one or more second TBs after the reception of an RAR. The wireless device may transmit an indicator, such as buffer state reporting, in a two-step Msg1 of a two-step RA procedure. The indicator may indicate to a base station an amount of data the wireless device to transmit and/or an amount of data remains in a buffer. The base station may determine a UL grant based on the indicator. The base station may transmit the UL grant to the wireless device via an RAR.

In a two-step/RA procedure, a wireless device may receive two separate responses; a first response for RAP transmission; and a second response for one or more TB transmission. A wireless device may monitor a common search space to detect the first response with a random access RNTI generated based on time and frequency indices of PRACH resource where the wireless device transmits an RAP. A wireless device may monitor a common search space and/or a wireless device specific search space to detect the second response. To detect the second response, the wireless device may employ a C-RNTI (e.g., if configured) or a random access RNTI generated based on time and frequency indices of PRACH resource where the wireless device transmits an RAP. The wireless device specific search space may be predefined and/or configured by an RRC message.

A two-step RA procedure may be initiated based on one or more case-based procedures, services, or radio conditions. For example, if a cell is small such that there may be no need for a TA, a base station in the cell may configure one or more wireless devices under its coverage to use a two-step RA procedure. A wireless device may acquire the configuration, via one or more RRC messages (e.g., system information blocks, multicast and/or unicast RRC signaling), and/or via L1 control signaling (e.g., PDCCH order) used to initiate a two-step RA procedure.

For example, in a macro coverage area, a wireless device may have a stored and/or persisted TA value, e.g., a stationary or near stationary wireless device such as a sensor-type wireless device. In this case a two-step RA procedure may be initiated. A base station having macro coverage may use broadcasting and/or dedicated signaling to configure a two-step RA procedure with one or more wireless devices having stored and/or persisted TA values under the coverage.

A wireless device in an RRC connected state may perform a two-step RA procedure. For example, the two-step RA procedure may be initiated when a wireless device performs a handover (e.g., network-initiated handover), and/or when the wireless device requires or requests a UL grant for a transmission of delay-sensitive data and there are no physical-layer uplink control channel resources available to transmit a scheduling request. A wireless device in an RRC INACTIVE state may perform a two-step RA procedure, e.g., for a small data transmission while remaining in the RRC INACTIVE state or for resuming a connection. A wireless device may initiate a two-step RA procedure, for example, for initial access such as establishing a radio link, re-establishment of a radio link, handover, establishment of UL synchronization, and/or a scheduling request when there is no UL grant.

The following description presents one or more examples of a RACH procedure. The procedures and/or parameters described in the following may not be limited to a specific RA procedure. The procedures and/or parameters described in the following may be applied for a four-step RA procedure and/or a two-step RA procedure. For example, a RA procedure may refer to a four-step RA procedure and/or a two-step RA procedure in the following description.

Example of RACH Procedure

In an example, a base station may transmit, to a wireless device, one or more messages indicating random access parameters of a four-step random access procedure in FIG. 12 and/or a two-step random access procedure in FIG. 16. For example, the one or more messages may be broadcast RRC message, wireless device specific RRC message, and/or combination thereof. For example, the one or more message may comprise at least one of RACH-ConfigCommon, RACH-ConfigGeneric, and RACH-ConfigDedicated. For example, for a contention based (four-step and/or a two-step) random access procedure, a wireless device may receive, from a base station, at least RACH-ConfigCommon and RACH-ConfigGeneric. For example, for a contention free (four-step and/or a two-step) random access procedure, a wireless device may receive, from a base station, at least RACH-ConfigDedicated.

For example, a random access procedure may be initiated in one or more ways based at least on one of RACH-ConfigCommon, RACH-ConfigGeneric, and RACH-ConfigDedicated. For example, a random access procedure may be initiated by a PDCCH order transmitted by a base station, by the MAC entity of a wireless device, or by RRC. There may be one random access procedure ongoing at any point in time in a MAC entity. A random access procedure on an SCell may be initiated by a PDCCH order with ra-PreambleIndex different from a first index (that may be predefined or configured e.g., 0b000000). For example, if the MAC entity of a wireless device receives a request for a random access procedure while another is already ongoing in the MAC entity, a wireless device may continue with the ongoing procedure or start with the new procedure (e.g. for SI request).

In an example, a base station may transmit one or more RRC message to configure a wireless device at least one of following parameters for a random access procedure:

prach-ConfigIndex: the available set of PRACH occasions for the transmission of the Random Access Preamble;

preambleReceivedTargetPower: initial Random Access Preamble power;

rsrp-ThresholdSSB: an RSRP threshold for the selection of the SSB and corresponding Random Access Preamble and/or PRACH occasion. If the Random Access procedure is initiated for beam failure recovery, rsrp-ThresholdSSB refers to rsrp-ThresholdSSB inBeamFailureRecoveryConfig IE;

rsrp-ThresholdCSI-RS: an RSRP threshold for the selection of CSI-RS and corresponding Random Access Preamble and/or PRACH occasion. If the Random Access procedure is initiated for beam failure recovery, rsrp-ThresholdCSI-RS shall be set to a value calculated by multiplying rsrp-ThresholdSSB in BeamFailureRecoveryConfig IE by powerControlOffset;

rsrp-ThresholdSSB-SUL: an RSRP threshold for the selection between the NUL carrier and the SUL carrier;

powerControlOffset: a power offset between rsrp-ThresholdSSB and rsrp-ThresholdCSI-RS to be employed when the Random Access procedure is initiated for beam failure recovery;

powerRampingStep: the power-ramping factor;
powerRampingStepHighPriority: the power-ramping factor in case of differentiated Random Access procedure ra-PreambleIndex: an index of Random Access Preamble;

ra-ssb-OccasionMaskIndex: defines PRACH occasion(s) associated with an SSB in which the MAC entity may transmit a Random Access Preamble;

ra-OccasionList: defines PRACH occasion(s) associated with a CSI-RS in which the MAC entity may transmit a Random Access Preamble;

preambleTransMax: the maximum number of Random Access Preamble transmission ssb-perRACH-OccasionAndCB-PreamblesPerSSB: defines the number of SSBs mapped to each PRACH occasion and the number of Random Access Preambles mapped to each SSB;

the set of Random Access Preambles and/or PRACH occasions for SI request, if any;

the set of Random Access Preambles and/or PRACH occasions for beam failure recovery request, if any;

ra-ResponseWindow: the time window to monitor RA response(s);

ra-ContentionResolutionTimer: the Contention Resolution Timer.

In an example, a random access procedure may be initiated for beam failure detection and recovery. For example, a wireless device may be configured by RRC with a beam failure recovery procedure which may be employed for indicating to the serving base station of a SSB or CSI-RS when beam failure is detected on the serving SSB(s)/CSI-RS(s). Beam failure may be detected by counting one or more beam failure instance indication from the lower layers to the MAC entity. For example, a base station may configure, via RRC, the following parameters in the BeamFailureRecoveryConfig for the Beam Failure Detection and Recovery procedure: beamFailureInstanceMaxCount for the beam failure detection;

beamFailureDetectionTimer for the beam failure detection;

beamFailureRecoveryTimer for the beam failure recovery procedure;

rsrp-ThresholdSSB: an RSRP threshold for the beam failure recovery;

powerRampingStep: powerRampingStep for the beam failure recovery;

preambleReceivedTargetPower: preambleReceivedTargetPower for the beam failure recovery; preambleTransMax: preambleTransMax for the beam failure recovery;

ra-ResponseWindow: the time window to monitor response(s) for the beam failure recovery using contention-free Random Access Preamble;

prach-ConfigIndex: prach-ConfigIndex for the beam failure recovery;

ra-ssb-OccasionMaskIndex: ra-ssb-OccasionMaskIndex for the beam failure recovery;

ra-OccasionList: ra-OccasionList for the beam failure recovery.

In an example, a wireless device may employ one or more parameters for a random access procedure. For example, a wireless device may employ at least one of PREAMBLE_INDEX; PREAMBLE_TRANSMISSION_COUNTER; PREAMBLE_POWER_RAMPING_COUNTER; PREAMBLE_POWER_RAMPING_STEP; PREAMBLE_RECEIVED_TARGET_POWER; PREAMBLE_BACKOFF; PCMAX; SCALING_FACTOR_BI; and TEMPORARY_C-RNTI.

In an example, a wireless device may perform random access resource selection for selecting one or more preambles and one or more PRACH occasion (or resources comprising time, frequency, and/or code). For example, there may be one or more cases that a random access procedure may be initiated for beam failure recovery; and/or the beamFailureRecoveryTimer is either running or not configured; and/or the contention-free Random Access Resources for beam failure recovery request associated with any of the SSBs and/or CSI-RSs have been explicitly provided by RRC; and/or at least one of the SSBs with SS-RSRP above rsrp-ThresholdSSB amongst the SSBs in candidateBeamRSList or the CSI-RSs with CSI-RSRP above rsrp-ThresholdCSI-RS amongst the CSI-RSs in candidateBeamRSList is available. In this case, a wireless device may select an SSB with SS-RSRP above rsrp-ThresholdSSB amongst the SSBs in candidateBeamRSList or a CSI-RS with CSI-RSRP above rsrp-ThresholdCSI-RS amongst the CSI-RSs in candidateBeamRSList. For example, if CSI-RS is selected, and there is no ra-PreambleIndex associated with the selected CSI-RS, a wireless device may set the PREAMBLE_INDEX to a ra-PreambleIndex corresponding to the SSB in candidateBeamRSList which is quasi-collocated with the selected CSI-RS, otherwise the wireless device may set the PREAMBLE_INDEX to a ra-PreambleIndex corresponding to the selected SSB or CSI-RS from the set of Random Access Preambles for beam failure recovery request.

For example, there may be one or more cases that a random access procedure may be initiated and/or a ra-PreambleIndex has been explicitly provided by either PDCCH or RRC; and/or the ra-PreambleIndex is not a first preamble index (that may be predefined or configured e.g., 0b000000); and/or contention-free Random Access Resource associated with SSBs or CSI-RSs have not been explicitly provided by RRC. In this case, a wireless device may set the PREAMBLE_INDEX to the signalled ra-PreambleIndex.

For example, there may be one or more cases that a random access procedure may be initiated and/or the contention-free Random Access Resources associated with SSBs have been explicitly provided by RRC and at least one SSB with SS-RSRP above rsrp-ThresholdSSB amongst the associated SSBs is available. In this case, a wireless device may select an SSB with SS-RSRP above rsrp-ThresholdSSB amongst the associated SSBs. For example, the wireless device may set the PREAMBLE_INDEX to a ra-PreambleIndex corresponding to the selected SSB.

For example, there may be one or more cases that a random access procedure may be initiated and the contention-free random access resources associated with CSI-RSs have been explicitly provided by RRC and at least one CSI-RS with CSI-RSRP above rsrp-ThresholdCSI-RS amongst the associated CSI-RSs is available. In this case, a wireless device may select a CSI-RS with CSI-RSRP above rsrp-ThresholdCSI-RS amongst the associated CSI-RSs. for example, the wireless device may set the PREAMBLE_INDEX to a ra-PreambleIndex corresponding to the selected CSI-RS.

For example, there may be one or more cases that a random access procedure may be initiated and at least one of the SSBs with SS-RSRP above rsrp-ThresholdSSB is available. In this case, for example, a wireless device may select an SSB with SS-RSRP above rsrp-ThresholdSSB, otherwise may select any SSB. For example, a random access resource selection is performed when Msg3 1240, two-step Msg1, and/or one or more TBs in FIG. 16 is being retransmitted, a wireless device may select the same group of Random Access Preambles as was employed for the Random Access Preamble transmission attempt corresponding to the first transmission of Msg3, two-step Msg1, and/or one or more TBs. For example, if the association between random access preambles and SSBs is configured, a wireless device may select a ra-PreambleIndex randomly with equal probability from the Random Access Preambles associated with the selected SSB and the selected Random Access Preambles group. For example, if the association between random access preambles and SSBs is not configured, a wireless device may select a ra-PreambleIndex randomly with equal probability from the Random Access Preambles within the selected Random Access Preambles group. For example, a wireless device may set the PREAMBLE INDEX to the selected ra-PreambleIndex.

In an example, if an SSB is selected above and an association between PRACH occasions and SSBs is configured, a wireless device may determine the next available PRACH occasion from the PRACH occasions corresponding to the selected SSB permitted by the restrictions given by the ra-ssb-OccasionMaskIndex if configured (the MAC entity of the wireless device may select a PRACH occasion randomly with equal probability amongst the PRACH occasions occurring simultaneously but on different subcarriers, corresponding to the selected SSB; the MAC entity may take into account the possible occurrence of measurement gaps when determining the next available PRACH occasion corresponding to the selected SSB).

In an example, if a CSI-RS is selected above and an association between PRACH occasions and CSI-RSs is configured, a wireless device may determine the next available PRACH occasion from the PRACH occasions in ra-OccasionList corresponding to the selected CSI-RS (the MAC entity shall select a PRACH occasion randomly with equal probability amongst the PRACH occasions occurring simultaneously but on different subcarriers, corresponding to the selected CSI-RS; the MAC entity may take into account the possible occurrence of measurement gaps when determining the next available PRACH occasion corresponding to the selected CSI-RS).

In an example, if a CSI-RS is selected above and there is no contention-free Random Access Resource associated with the selected CSI-RS, a wireless device may determine the next available PRACH occasion from the PRACH occasions, permitted by the restrictions given by the ra-ssb-OccasionMaskIndex if configured, corresponding to the SSB in candidateBeamRSList which is quasi-collocated with the selected CSI-RS (the MAC entity may take into account the possible occurrence of measurement gaps when determining the next available PRACH occasion corresponding to the SSB which is quasi-collected with the selected CSI-RS).

For example, a wireless device may determine the next available PRACH occasion (the MAC entity shall select a PRACH occasion randomly with equal probability amongst the PRACH occasions occurring simultaneously but on different subcarriers; the MAC entity may take into account the possible occurrence of measurement gaps when determining the next available PRACH occasion).

For example, based on a selected PREABLE INDEX and PRACH occasion, a wireless device may perform the random access preamble transmission. For example, if the notification of suspending power ramping counter has not been received from lower layers; and/or if SSB selected is not changed (i.e. same as the previous Random Access Preamble transmission), a wireless device may increment PREAMBLE_POWER_RAMPING_COUNTER by 1. the wireless device may select a value of DELTA_PREAMBLE that may be predefined and/or semi-statically configured by a base station and set PREAMBLE_RECEIVED_TARGET_POWER to preambleReceivedTargetPower+DELTA_PREAMBLE+(PREAMBLE_POWER_RAMPING_COUNTER−1)×PREAMBLE_POWER_RAMPING_STEP.

The wireless device may instruct the physical layer to transmit the Random Access Preamble using the selected PRACH, corresponding RA-RNTI (if available), PREAMBLE_INDEX and PREAMBLE_RECEIVED_TARGET_POWER. For example, the wireless device may compute an RA-RNTI associated with the PRACH occasion in which the Random Access Preamble is transmitted, e.g., In an example, the RA-RNTI associated with the PRACH in which the Random Access Preamble is transmitted, may be computed in terms of index of the first OFDM symbol of the specified PRACH, an index of the first slot of the specified PRACH in a system frame, an index of the specified PRACH in the frequency domain, and/or uplink carrier indicator. For example, an example RA-RNTI may be calculated as: RA-RNTI=1+s_id+14×t_id+14×80×f_id+14×80×8×ul_carrier_id where s_id is the index of the first OFDM symbol of the specified PRACH (0≤s_id<14), t_id is the index of the first slot of the specified PRACH in a system frame (0≤t_id<80), f_id is the index of the specified PRACH in the frequency domain (0≤f_id<8), and ul_carrier_id is the UL carrier used for Msg1 1220 transmission or two-step Msg1 1620 (0 for NUL carrier, and 1 for SUL carrier or vice versa).

For example, a wireless device, that transmitted a random access preamble, may start to monitor a downlink control channel for a random access response corresponding to the random access preamble. The possible occurrence of a measurement gap may not determine when a wireless device starts to monitor a downlink control channel.

If a wireless device does not perform a contention-free random access procedure for beam a failure recovery request, the wireless device may start a random access window (e.g., ra-ResponseWindow) configured in a random access configuration parameter (e.g., RACH-ConfigCommon) at a first downlink control channel occasion from an end of a random access preamble transmission. The wireless device may monitor the first downlink control channel occasion of the SpCell for random access response(s) identified by the RA-RNTI while a random access response window (e.g., ra-ResponseWindow) is running.

In an example, a downlink assignment may be received by a wireless device, on the PDCCH for the RA-RNTI and the received TB (e.g., MAC PDU comprising one or more random access responses is successfully decoded. For example, the MAC PDU may comprise a MAC subPDU with Random Access Preamble identifier corresponding to a preamble that a wireless device transmits to a base station. In this case, the wireless device may determine that this random access response reception may be successful. For example, the MAC subPDU may comprise a preamble index (e.g., RAPID) only, e.g., for a random access procedure initiated for a system information request In an example embodiment, Listen-before-talk (LBT) may be implemented for transmission in a cell configured in unlicensed band (referred to as a LAA cell and/or a NR-U cell for the sake of convenience, for example, an LAA cell and NR-U cell may be interchangeable and may refer any cell operating in unlicensed band. The cell may be operated as non-standalone with an anchor cell in licensed band or standalone without an anchor cell in licensed band). The LBT may comprise a clear channel assessment. For example, in an LBT procedure, equipment may apply a clear channel assessment (CCA) check before using the channel. For example, the CCA utilizes at least energy detection to determine the presence or absence of other signals on a channel in order to determine if a channel is occupied or clear, respectively.

In an example, contention-based random access (CBRA) and/or contention-free random access (CFRA) may be supported on SpCell. CFRA may be supported on SCells. In an example, an RAR may be transmitted via SpCell, e.g., non-standalone scenario. In an example, an RAR may be transmitted via SpCell and/or SCell, e.g., standalone scenario. In an example, a predefined HARQ process ID for an RAR.

Figure 18A:
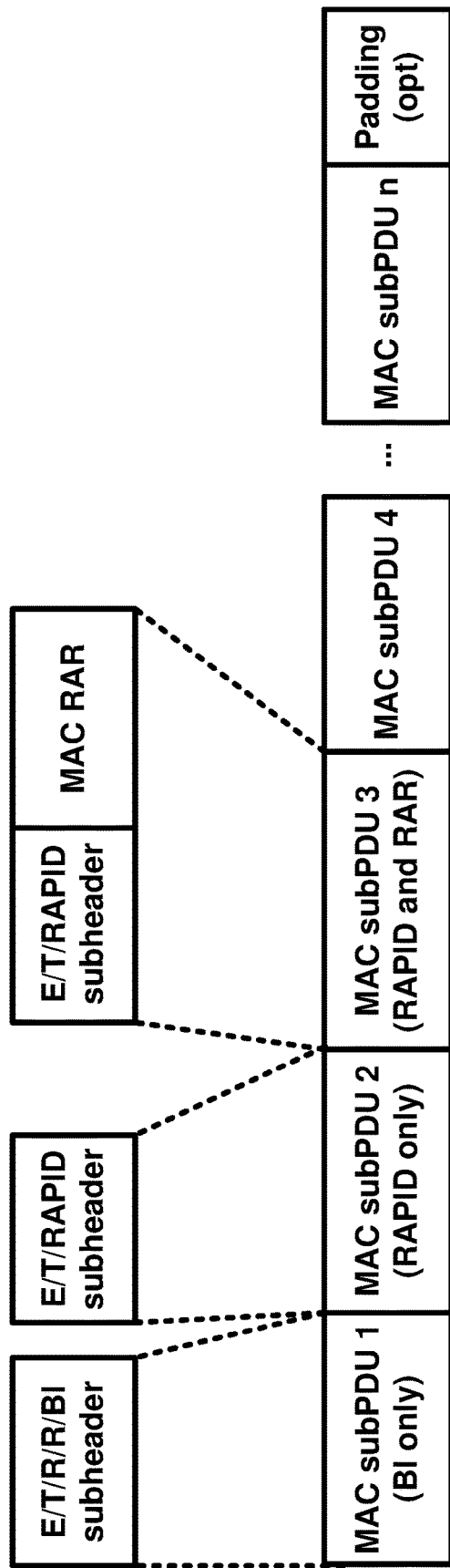
FIG. 18A, FIG. 18B, and FIG. 18C are respectively examples of an RAR, a MAC subheader with backoff indicator, and a MAC subheader with RAPID as per an aspect of an embodiment of the present disclosure.
Figure 18B:
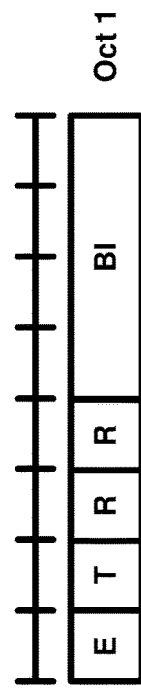
Figure 18C:
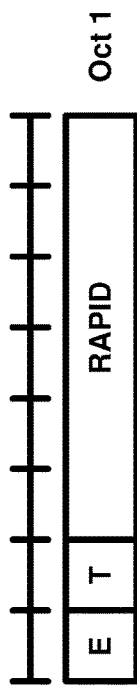

In a RA procedure, a wireless device may receive from a base station at least one RAR as a response of Msg1 1220 or two-step Msg1. An RAR may be in a form of MAC PDU comprising one or more MAC subPDUs and optionally padding. FIG. 18A is an example of an RAR. A MAC subheader may be octet aligned. Each MAC subPDU may comprise at least one of following: a MAC subheader with Backoff Indicator only; a MAC subheader with RAPID only (i.e. acknowledgment for SI request); a MAC subheader with RAPID and MAC RAR. FIG. 18B is an example of a MAC subheader with backoff indicator. For example, a MAC subheader with backoff indicator comprise one or more header fields, e.g., E/T/R/R/BI as described in FIG. 18B. A MAC subPDU with backoff indicator may be placed at the beginning of the MAC PDU, if included. MAC subPDU(s) with RAPID only and MAC subPDU(s) with RAPID and MAC RAR may be placed anywhere after MAC subPDU with Backoff Indicator and, if exist before padding as described in FIG. 18A. A MAC subheader with RAPID may comprise one or more header fields, e.g., E/T/RAPID as described in FIG. 18C. Padding may be placed at the end of the MAC PDU if present. Presence and length of padding may be implicit based on TB size, size of MAC subPDU(s).

In an example one or more header fields in a MAC subheader may indicate as follow: an E field may indicate an extension field that may be a flag indicating if the MAC subPDU including this MAC subheader is the last MAC subPDU or not in the MAC PDU. The E field may be set to "1" to indicate at least another MAC subPDU follows. The E field may be set to "0" to indicate that the MAC subPDU including this MAC subheader is the last MAC subPDU in the MAC PDU; a T filed may be a flag indicating whether the MAC subheader contains a Random Access Preamble ID or a Backoff Indicator (one or more backoff values may predefined and BI may indicate one of backoff value). The T field may be set to "0" to indicate the presence of a Backoff Indicator field in the subheader (BI). The T field may be set to "1" to indicate the presence of a Random Access Preamble ID field in the subheader (RAPID); an R filed may indicate a reserved bit that may be set to "0"; a BI field may be a backoff indicator field that identifies the overload condition in the cell. The size of the BI field may be 4 bits; an RAPID field may be aRandom Access Preamble IDentifier field that may identify the transmitted Random Access Preamble. If the RAPID in the MAC subheader of a MAC subPDU corresponds to one of the Random Access Preambles configured for SI request, MAC RAR may not be included in the MAC subPDU.

There may be one or more MAC RAR format. At least one of following MAC RAR format may be employed in a four-step or a two-step RA procedure. The MAC RAR may be fixed size and may comprise at least one of the following fields: an R field that may indicate a Reserved bit, set to "0"; a Timing Advance Command field that may indicate the index value TA employed to control the amount of timing adjustment; a UL Grantfield that indicate the resources to be employed on the uplink; and a RNTI field (e.g., Temporary C-RNTI and/or C-RNTI) that may indicate an identity that is employed during Random Access. For example, for a two-step RA procedure, an RAR may comprise at least one of following: a UE contention resolution identity, an RV ID for retransmission of one or more TBs, decoding success or failure indicator of one or more TB transmission, and one or more fields.

There may be a case that a base station may multiplex, in a MAC PDU, RARs for two-step and four-step RA procedures. If RARs for two-step and four-step RA procedure have the same size, a wireless device may not require an RAR length indicator field and/or the wireless device may determine the boundary of each RAR in the MAC PDU based on pre-determined RAR size information. The RAR may be a fixed size using the same format for two-step and four-step RA procedures.

In an example, an RAR for a two-step RA procedure may have a different format, size, and/or fields, from an RAR for a four-step RA procedure. If RARs for two-step and four-step RA procedures are multiplexed into a MAC PDU, and the RARs have different format between two-step and four-step RA procedure, an RAR may have a field to indicate a type of RAR (e.g., a reserved "R" field may be employed to indicate a type of RAR). A field for indicating an RAR type may be in a subheader (such as a MAC subheader) or in an RAR. An RAR may comprise different types of fields that may correspond with an indicator in a subheader or in an RAR. A wireless device may determine the boundary of one or more RARs in a MAC PDU based on one or more indicators.

In an example, for an SCell addition, a base station may be aware of whether SUL carrier(s) is (are) configured in an SCell, and/or which carrier is allowed to be employed for an SCell addition. A base station may configure DL measurements on NUL carrier(s) and/or SUL carrier(s). A base station may configure a wireless device with one or more RACH configurations for an SCell, e.g., a first RACH configuration for an SUL carrier, a second RACH configuration for a NUL carrier, and so on. A base station may transmit, to a wireless device via a PDCCH order comprising a parameter indicating in which carrier the wireless device starts a (contention free or contention based) random access procedure. For example, a PDCCH order triggering a (contention free or contention based) random access procedure may comprise one or more parameters indicating at least one of at least one preamble (e.g., preamble index), one or more PRACH resources (e.g., PRACH mask index), an SUL indicator, and/or a BWP indicator. For example, for an random access procedure, a wireless device receiving a PDCCH order may transmit at least one preamble via one or more PRACH resources of a BWP indicated by a BWP indicator of a carrier indicated by an SUL indicator.

In an example, a wireless device may determine a random access procedure unsuccessfully completed. For example, if a wireless device receives no RAR corresponding to one or more preambles transmitted by the wireless device during a random access procedure, the wireless device may consider the random access procedure unsuccessfully completed. There may be a number of preamble transmissions allowed during a random access procedure (e.g., preambleTransMax), wherein the number of preamble transmissions may be semi-statically configured by RRC. For example, if a wireless device receives no RAR corresponding to the number of preamble transmissions, the wireless device may consider a random access procedure unsuccessfully completed. In response to an unsuccessful completion of a random access procedure, a wireless device may indicate a problem to upper layer(s), wherein, in response to the indicated problem, the upper layers(s) may trigger radio link failure that may lead to prolonged random access delay and degraded user experience.

For example, a base station (source base station and/or a target gNB) configuring a wireless device with a RACH configuration for a random access (for a handover and/or SCell addition) may not allow to reuse the RACH configuration if the random access is unsuccessfully completed.

Figure 19:
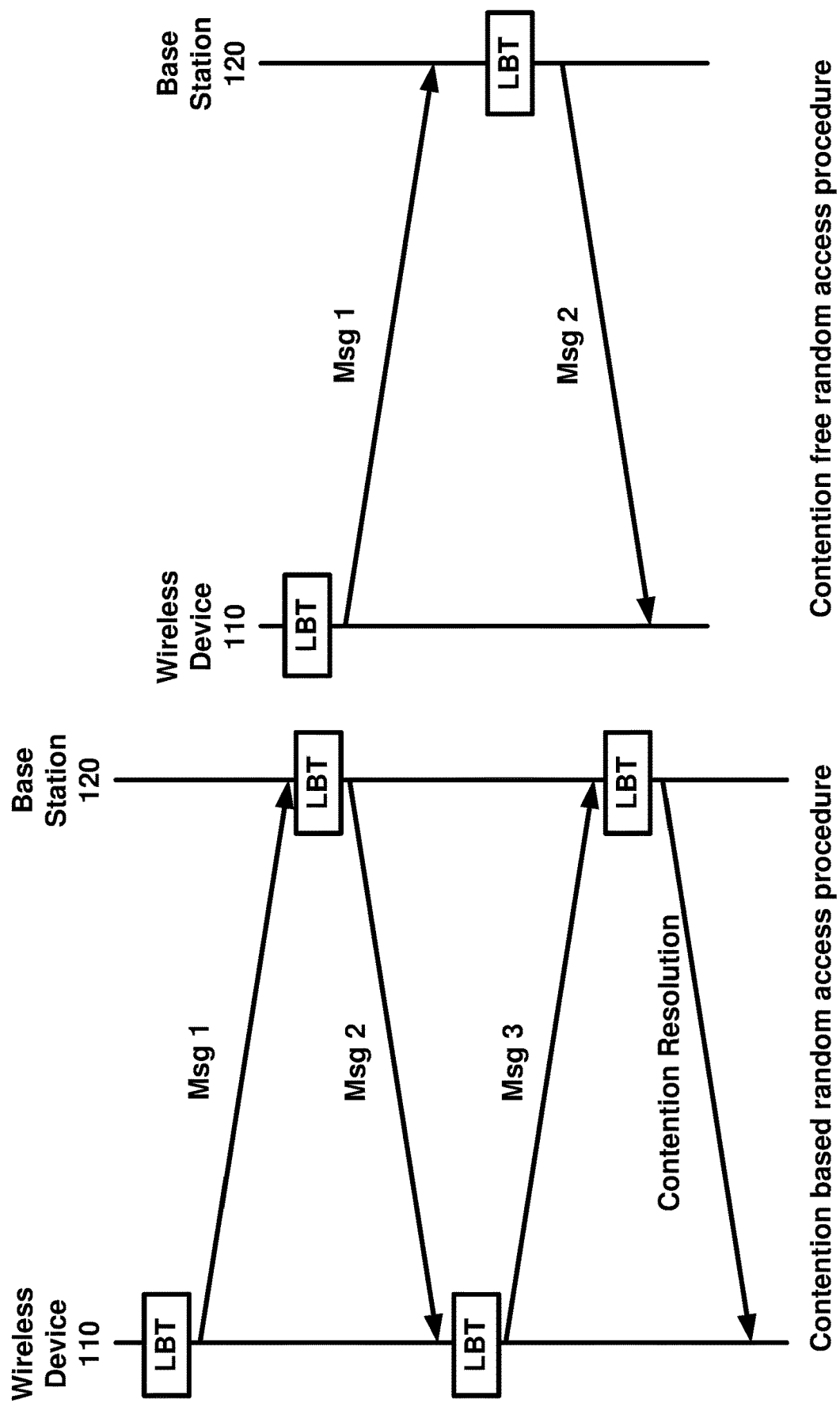
FIG. 19 is an example diagram of contention based and contention-free random access procedures with LBT as per an aspect of an embodiment of the present disclosure.

In an unlicensed band, a failure of a random access may occur due to LBT. For example, in an unlicensed band, at least one LBT may be performed prior to DL and/or UL transmission. For example, in a random access procedure in FIG. 12, Msg 1 1220, Msg 2 1230, Msg 3 1240, and contention resolution 1250 may require at least one LBT before the transmission for contention based random access, e.g., at least 4 LBTs. For contention-free case, Msg 1 1220 and Msg2 1230 may require at least one LBT, e.g., at least 2 LBTs. FIG. 19 is an example diagram of contention based and contention-free random access procedures with LBT.

In an example, a base station and/or a wireless device may not transmit a message (e.g., Msg 1, Msg 2, Msg 3, and contention resolution) for a random access procedure if LBT is failed prior to transmitting the message, e.g., CCA in LBT determines that a channel in unlicensed band is busy (occupied by other device). In an example, a failure of LBT may result in degrading a user experience (e.g., in terms of QoS, capacity (throughput), and/or coverage). For example, a base station and/or a wireless device may wait until the channel becomes idle. This may result in a latency problem to make a radio link connection between a base station and a wireless device. For example, a failure of an LBT during a random access procedure may lead a long delay for a wireless device to receive an UL grant and/or TA value from a base station. This may result in a call drop and/or traffic congestion. For example, a failure of an LBT in a random access procedure for an SCell addition may lead a cell congestion (e.g., load imbalancing) on one or more existing cells, e.g., since an SCell may not take over traffic from the one or more existing cells in time.

In an example, there may be a need to improve an efficiency of random access procedure operating in unlicensed band, e.g., to compensate a latency/delay, and/or performance degradation, due to the LBT failure. For example, selecting two or more SSBs and performing one or more LBTs on one or more PRACH occasions associated with the two or more SSBs my increase a success rate of LBT. For example, a wireless device may measure a plurality of downlink reference signals (SSBs or CSI-RSs, if CSI-RS is configured by RRC). The wireless device may select two or more SSBs by comparing RSRPs of the plurality of downlink reference signals and a threshold. For example, the threshold may comprise rsrp-ThresholdSSB when the plurality of downlink reference signals are SSBs. For example, the threshold may comprise rsrp-ThresholdCSI-RS when the plurality of downlink reference signals are CSI-RSs. For example, the wireless device may select two or more downlink referencing signals (SSBs or CSI-RSs) whose RSRPs are higher than the threshold. For example, if SSBs are configured with the wireless device, the wireless device may determine one or more PRACH occasions associated with the selected two or more downlink reference signals, e.g., SSBs. For example, the wireless device may determine the one or more PRACH based on an association between PRACH occasions and SSBs that may be indicated by one or more RRC parameters, e.g., ra-ssb-OccasionMaskIndex. For example, if CSI-RSs are configured with the wireless device, the wireless device may determine one or more PRACH occasions associated with the selected two or more downlink reference signals, e.g., CSI-RSs. For example, the wireless device may determine the one or more PRACH based on an association between PRACH occasions and CSI-RSs that may be indicated by one or more RRC parameters, e.g., ra-OccasionList.

Figure 20:
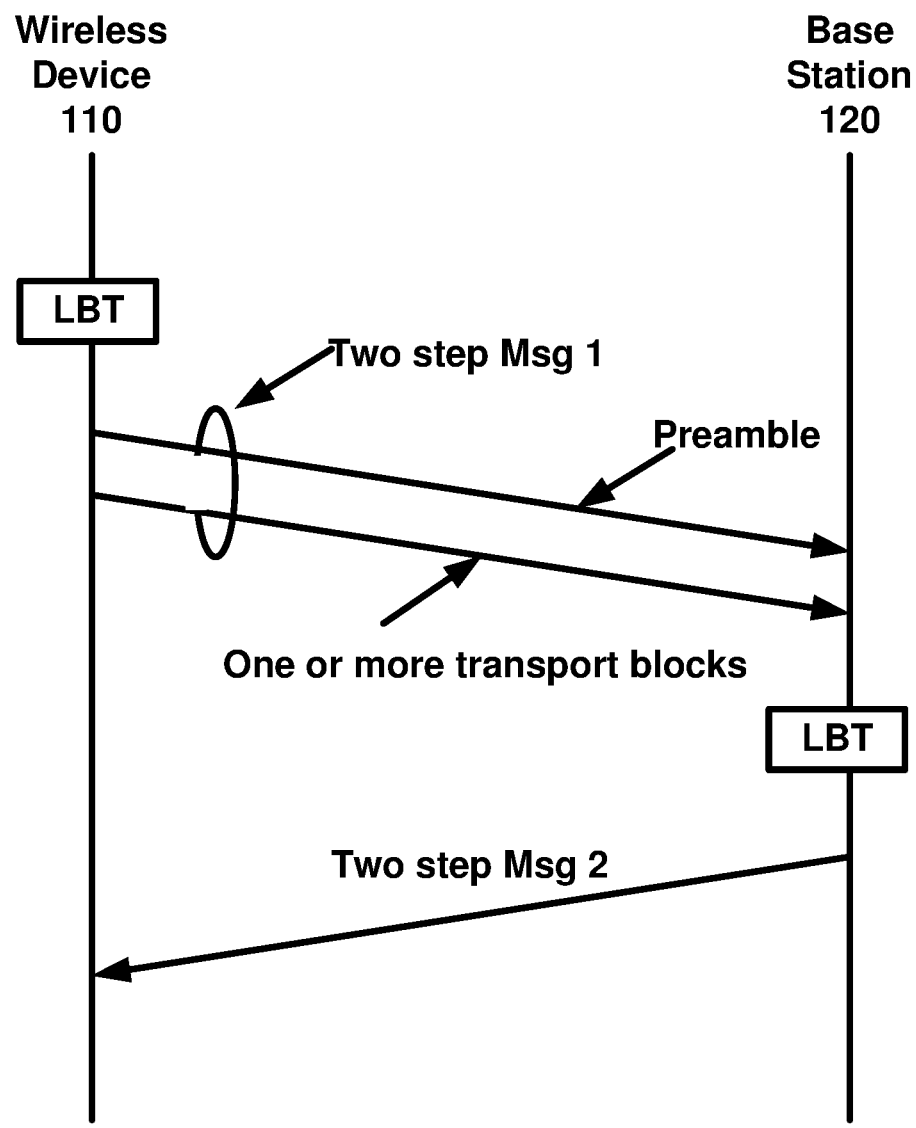
FIG. 20 is an example diagram of a two-step RA procedure with LBT as per an aspect of an embodiment of the present disclosure.

In an example, a two-step RA procedure may employ LBT in an unlicensed band. FIG. 20 is an example diagram of a two-step RA procedure with LBT. A base station and/or a wireless device may not transmit a message (e.g., two-step Msg 1, preamble, one or more transport blocks, and/or two-step Msg 2) for a random access procedure if LBT is failed prior to transmitting the message, e.g., CCA in LBT determines that a channel in unlicensed band is busy (occupied by other device). The transmissions of Preamble and for one or more transport blocks may have a same LBT and/or different LBTs.

Figure 21:
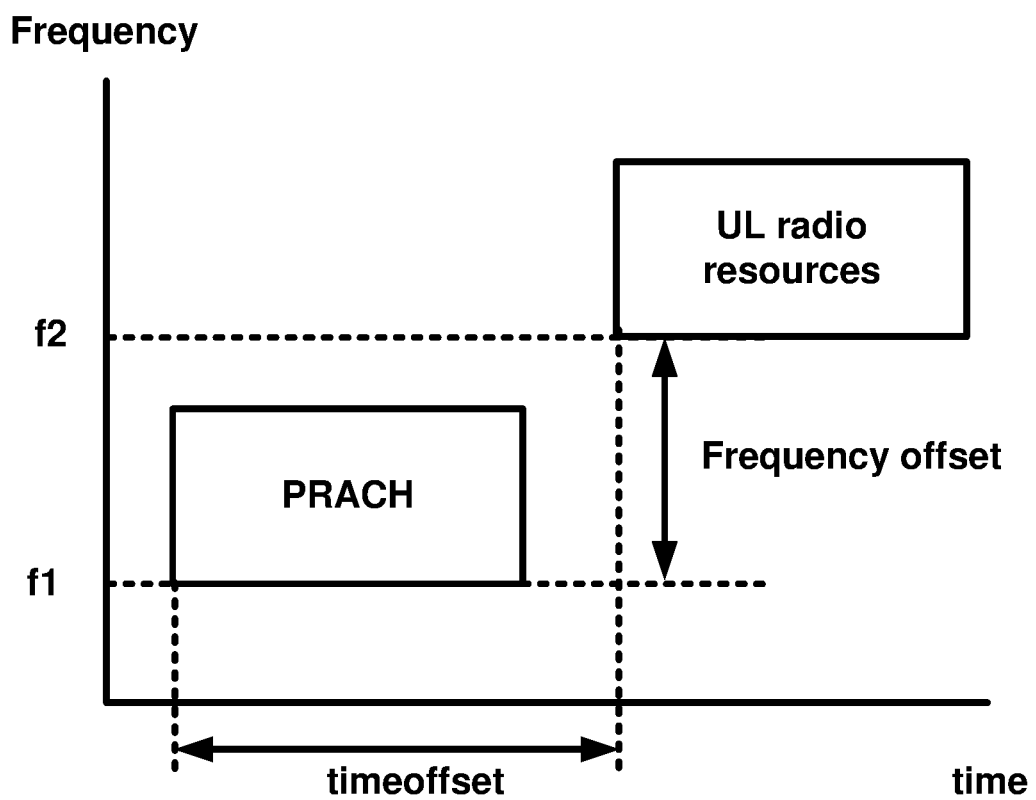
FIG. 21 is an example of radio resource allocation for a two-step RA procedure as per an aspect of an embodiment of the present disclosure.

For example, radio resources for transmissions of Preamble and one or more transport blocks may be configured in a same channel (or a same subband or a same BWP or a same UL carrier), where a wireless device performs an LBT for the transmissions (e.g., based on a regulation). In this case, an LBT result on the same channel (or the same subband or the same BWP or the same UL carrier) may applied for transmissions of Preamble and for one or more transport blocks. For example, FIG. 21 is an example of radio resource allocation for a two-step RA procedure. If a frequency offset in FIG. 21 is zero, PRACH and UL radio resources may be time-multiplexed. If a time-offset in FIG. 21 is zero, PRACH and UL radio resources may be frequency-multiplexed. The frequency offset in FIG. 21 may be an absolute number in terms of Hz, MHz, and GHz, and/or a relative number, e.g., one of frequency indices predefined/preconfigured. The time-offset in FIG. 21 may be an absolute number in terms of micro-second, milli-second, or second and/or a relative number, e.g., in terms of subframe, slot, mini-slot, OFDM symbol. PRACH for transmission of preamble and UL radio resources for transmission of one or more TBs may be subject to one LBT if f1 and f2 are configured in the same channel (or a same subband or a same BWP or a same UL carrier). For example, in FIG. 21, one LBT before PRACH may be performed by a wireless device (e.g., based on a regulation of unlicensed band). For example, a number of LBTs may be determined based on a value of time-offset in FIG. 21. For example, one LBT before PRACH may be performed by a wireless device if the value of time-offset is equal to and/or less than a threshold (that may be configured and/or defined by a regulation). For example, the one LBT determines idle, a wireless device may perform a transmission of Preamble via PRACH followed by a second transmission of one or more TBs via the UL radio resources with no LBT (the transmission order may be switched if the UL radio resources is allocated before PRACH in time domain). This may be a case that PRACH and UL radio resources are allocated closely enough in time domain. For example, if the value of time-offset is larger than the threshold, a wireless device may perform a first LBT before PRACH and perform a second LBT before UL radio resources.

For example, a bandwidth of BWP and/or UL carrier is larger than a first value (e.g., 20 MHz) and f1 and f2 are configured in the bandwidth, a wireless may perform an LBT and apply a result (idle/busy) of the LBT to the transmission of preamble and UL radio resources for transmission of one or more TBs. For example, if the channel is idle, a wireless device may perform the transmissions of Preamble and for one or more transport blocks. If the channel is busy, a wireless device may not perform the transmissions of Preamble and for one or more transport blocks.

For example, a bandwidth of BWP and/or UL carrier is less than a first value (e.g., 20 MHz) and f1 and f2 are configured in the bandwidth, a wireless may perform an LBT and apply a result (idle/busy) of the LBT to the transmission of preamble and UL radio resources for transmission of one or more TBs. For example, if the channel is idle, a wireless device may perform a first transmissions of Preamble followed by a second transmission of one or more transport blocks. If the channel is busy, a wireless device may not perform the transmissions of Preamble and for one or more transport blocks.

Figure 22:
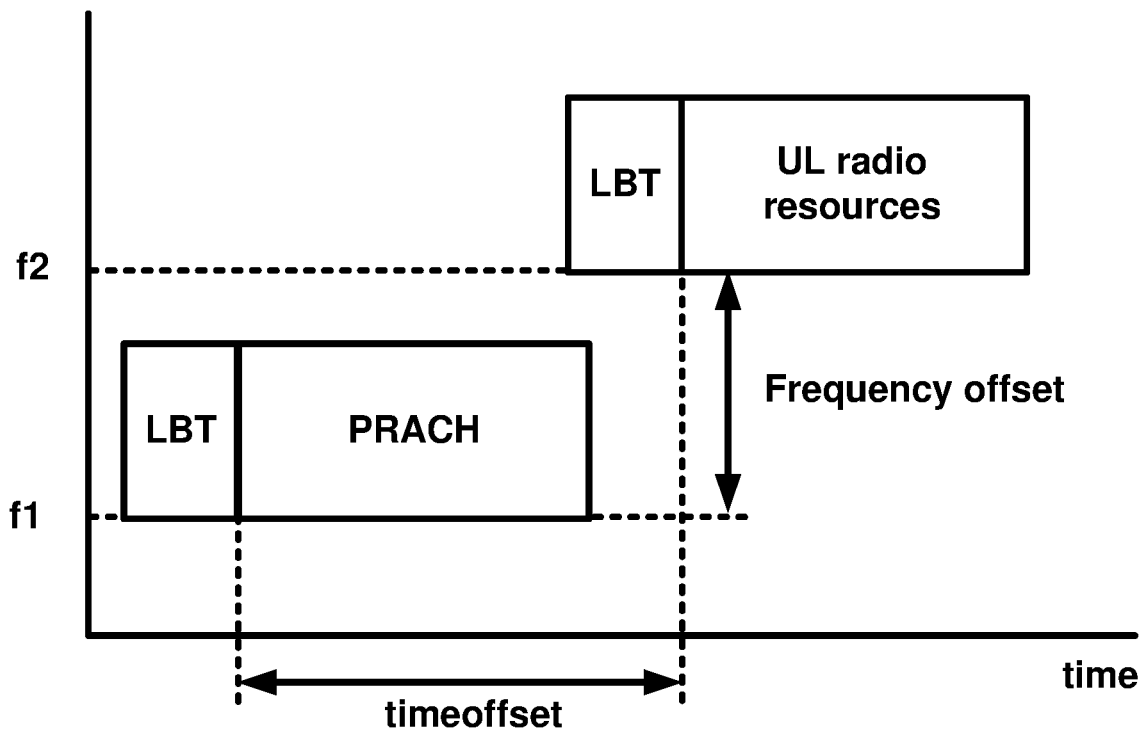
FIG. 22 is an example of one or more LBTs performed for a two-step RA procedure as per an aspect of an embodiment of the present disclosure.

For example, radio resources for transmissions of Preamble and one or more transport blocks may be configured in different channels (or different subbands or different BWPs or different UL carriers e.g., one in NUL and the other one in SUL) that may require separate LBTs. For example, a wireless device may perform an LBT per one or more channels, per one or more subbands, per one or more BWPs, and/or per one or more UL carriers. FIG. 22 is an example of one or more LBTs performed for a two-step RA procedure. In some cases, UL radio resources may be allocated before or aligned with PRACH in time. A wireless device may perform a first LBT (e.g., LBT in FIG. 22) before a first transmission of preamble (e.g., via PRACH) and perform a second LBT (e.g., LBT in FIG. 22) before a second transmission of one or more transport blocks (e.g., via UL radio resources). Depending on results of the first LBT and the second LBT, a wireless device may perform none of, one of, or both of the first transmission and the second transmission.

For example, the first transmission may be performed when a first result of the first LBT is idle. The second transmission may be independent of the first result. For example, the second transmission may be performed when a second result of the second LBT is idle. In this case, there may be a case that a wireless device may transmit Preamble in response to the first LBT being idle and may not be able to transmit one or more transport blocks in response to the second LBT being busy. For example, a wireless device may not transmit Preamble in response to the first LBT being busy and may transmit one or more transport blocks in response to the second LBT being idle. In a two-step RA procedure, one or more transport blocks may comprise an identifier of the wireless device so that a base station may identify which wireless device transmit the one or more transport blocks. The identity may be configured by the base station and/or may be at least a portion of wireless device-specific information, e.g., resume ID, DMRS sequence/index, IMSI, etc. If a wireless device transmits one or more TBs with no Preamble (e.g., when a channel, e.g. PRACH is busy), a base station may identify the wireless device based on the identity in the one or more TBs.

In a two-step RA procedure configured in an unlicensed band, the separate LBTs for transmissions of Preamble and one or more TBs may be performed in one or more cases. For example, a base station may configure a wireless device with the separate LBTs for a wideband operation (e.g., for a case that a bandwidth may be larger than 20 MHz). In the wideband operation, a base station may configure a wireless device with a wideband comprising one or more subbands and/or one or more BWPs. Some of the one or more subbands may be overlapped to each other at least a portion in frequency domain. Some of the one or more subbands may not be overlapped to each other at least a portion in frequency domain. Some of the one or more BWPs may be overlapped to each other at least a portion in frequency domain. Some of the one or more BWPs may not be overlapped to each other at least a portion in frequency domain. In a wideband operation, if two radio resources are allocated with a space larger than a threshold (e.g., 20 MHz) in frequency domain, separate LBTs may be required for transmissions via the two radio resources. For example, a wideband may comprise one or more subbands, and two radio resources may be allocated in different subbands. In this case, a first transmission scheduled in a first subband requires a first LBT, and a second transmission scheduled in a second subband requires a second LBT. The first LBT and the second LBT may be independent of each other.

For example, UL radio resources for transmission of one or more TBs may be subject to a first LBT (e.g., LBT) and be independent of a second LBT (e.g., LBT) for transmission of Preamble. For example, PRACH for transmission of Preamble may be subject to a second LBT (e.g., LBT) and be independent of a first LBT (e.g., LBT) for transmission of one or more TBs. For example, if f1 and f2 are configured in different channels (or different subbands or different BWPs or different UL carriers), a wireless device may perform separate LBTs for a first transmissions of Preamble and a second transmission of one or more transport blocks.

Figure 23A:
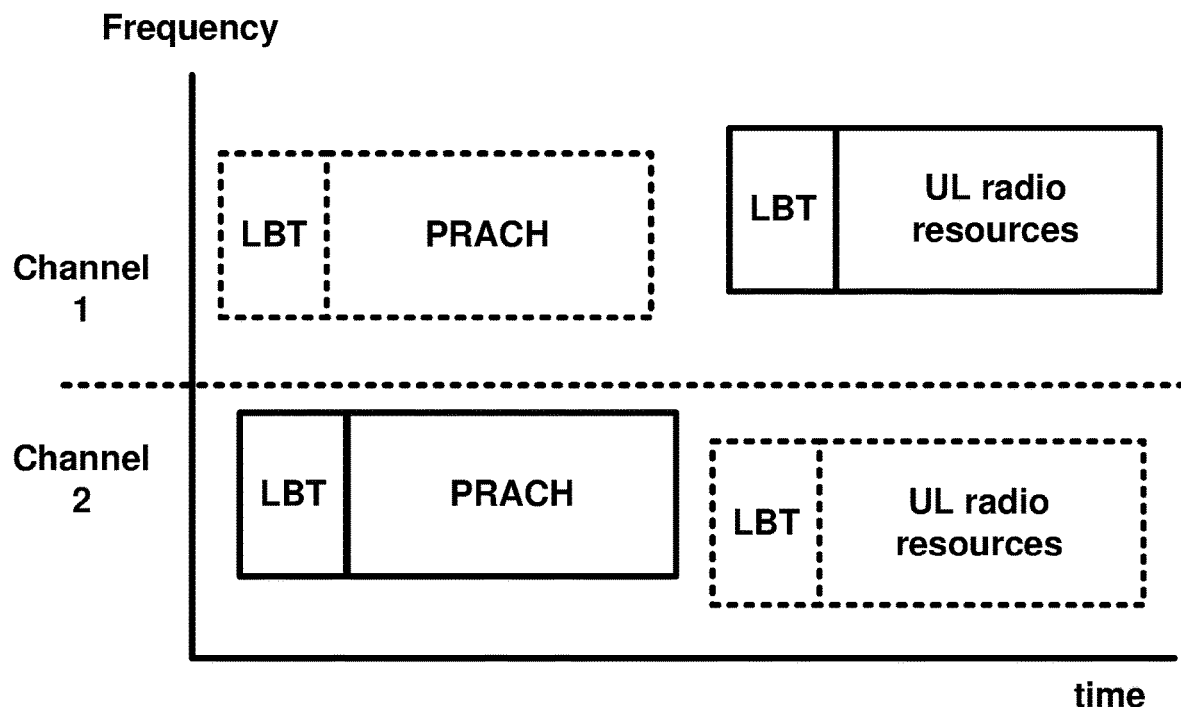
FIG. 23A and FIG. 23B are examples of one or more LBTs performed for a two-step RA procedure in an unlicensed band as per an aspect of an embodiment of the present disclosure.
Figure 23B:
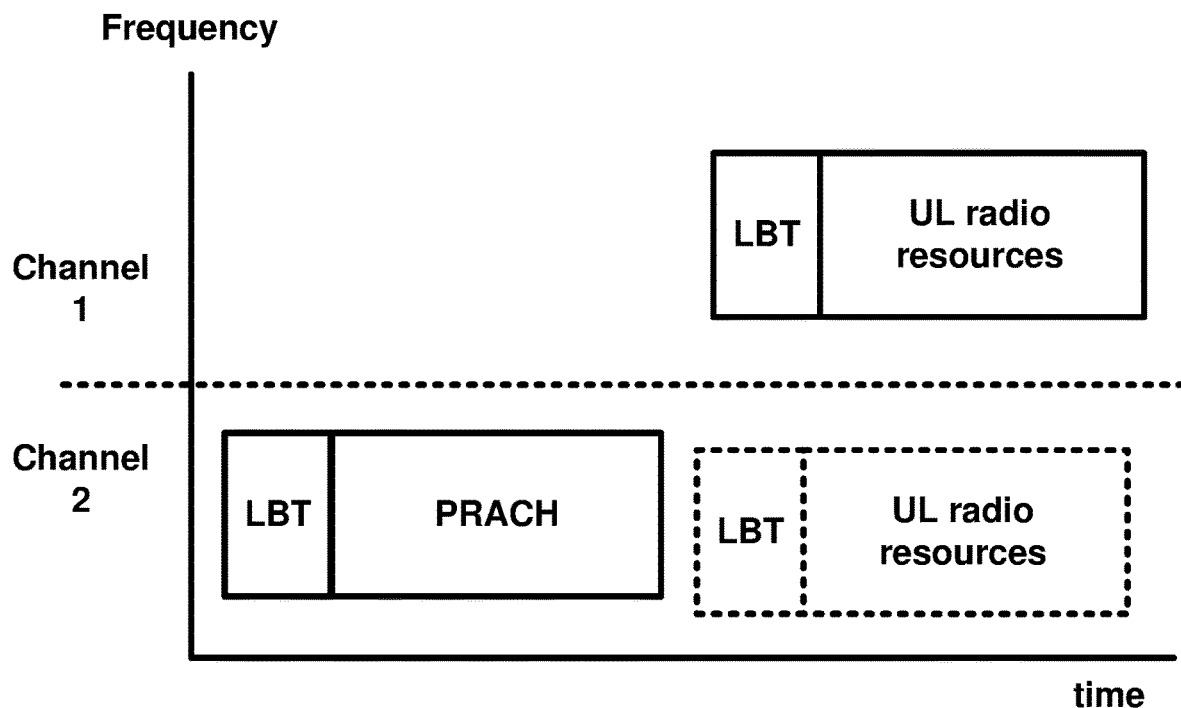

For example, FIG. 23A and FIG. 23B are examples of one or more LBTs performed for a two-step RA procedure in an unlicensed band. The resource allocation and the separate LBTs in FIG. 22 may be resulted from FIG. 23A and/or FIG. 23B. For example, a base station may configure a wireless device with one or more PRACH and one or more UL radio resources in different channels (BWPs and/or UL carriers). The wireless device may one or more first opportunities to transmit preambles and one or more second opportunities to transmit one or more TBs. For example, in FIG. 23A, a wireless device may have two opportunities (e.g., PRACH) for preamble transmission. Depending on LBT results, a wireless device may select one of two opportunities. For example, a wireless device may perform a first LBT and a second LBT (e.g., in FIG. 23A). If the results of the first and second LBTs are idle, a wireless device may select one of PRACH associated either a first LBT or a second LBT (e.g., based on random selection). If one of LBT result is idle and the other of LBT result is busy, a wireless device may select PRACH associated with the LBT being idle for preamble transmission. If the first and second LBTs are busy, a wireless device may not transmit a preamble and may perform one or more LBTs for one or more TB transmissions.

A wireless device may have one or more opportunities for transmission of one or more TBs via UL radio resources (e.g., in a similar way that a wireless device has for preamble transmission above). For example, the one or more opportunities for transmission of one or more TBs may be independent of one or more opportunities for transmission of preamble. For example, if a wireless device does not transmit a preamble due to a result (busy) of LBT, the wireless device may perform one or more LBTs to gain access to a channel to transmit one or more TBs. For example, in FIG. 23A, a wireless device may have a first LBT followed by a first transmission opportunity of one or more TBs via first UL radio resources and a second LBT (e.g., in FIG. 23A) followed by a second transmission opportunity of one or more TBs via second UL radio resources. Depending on LBT results, a wireless device may select one of opportunities. For example, in FIG. 23A, if (a first) LBT is busy but (a second) LBT is idle, a wireless device may transmit one or more TBs via UL radio resources (associated with the second LBT). If one or more LBTs to gain access for transmitting a preamble are busy, a wireless device may not transmit any preamble. In this case, a wireless device may perform one or more second LBTs (e.g., in FIG. 23A) for transmission of one or more TBs.

For example, before a wireless device initiates a two-step RA procedure, the wireless device may receive, from a base station, control message(s) (e.g., RRC and/or PDCCH) indicating one or more associations between PRACH and UL radio resources. The associations may be one-to-one, multi-to-one, one-to-multi, and/or multi-to-multi between one or more PRACHs and one or more UL radio resources. Based on the associations, a wireless device may determine which UL radio resources and/or which PRACH need to be selected. For example, in FIG. 23A, the associations may indicate one-to-multi association from PRACH on channel 2 to UL radio resources on channel 1 and UL radio resources on channel 2. For example, the associations may indicate one-to-one association from PRACH on channel 1 to UL radio resources on channel 1. In this case, a wireless device may perform one or more LBTs (depending on a regulation and/or resource allocation whether they are in the same channel) for transmission of one or more TBs depending on a selection of PRACH. For example, in FIG. 23A, a wireless device may perform two LBTs (for PRACHs). If LBT on channel 2 may be idle but LBT on channel 1 may be busy, a wireless device transmits a preamble via PRACH on channel 2. The wireless device may choose one or more candidate UL radio resources based on a configured association of PRACH on channel 2, which may be one-to-multi from PRACH on channel 2 to UL radio resources on channel 1 and UL radio resources on channel 2. The wireless device may perform LBT on channel 1 and LBT on channel 2 (for the UL resources) based on the configured association. Depending on the results of the LBTs, a wireless device may transmit one or more TBs. FIG. 23B is an example of a two-step RA procedure. In this case, UL radio resources is associated with one PRACH. For example, a base station configured an association from PRACH on channel 2 to UL radio resources on channel 1 and UL radio resources on channel 2.

The PRACH and/or UL radio resources in FIG. 21, FIG. 22, FIG. 23A, and/or FIG. 23B may be associated with at least one reference signal configuration (SSB, CSI-RS, DM-RS). A base station may transmit at least one control message to a wireless device to indicate such an association. If the base station transmit a plurality of reference signals, a configuration of each reference signal have an association with at least one PRACH, that may be configured by RRC and/or PDCCH. In downlink channel, there may be a plurality of PRACHs and a plurality of UL radio resources associated with the plurality of PRACHs.

In an example, there may be a need to improve an efficiency of random access procedure operating in unlicensed band, e.g., to compensate a latency/delay, and/or performance degradation, due to the LBT failure.

In an example, in response to a PRACH transmission, the wireless device may attempt to detect a DCI (e.g., DCI format 1_0) during a window (e.g., ra-responseWindow). In an example, the DCI may be with CRC scrambled by a corresponding RA-RNTI.

In an example, the base station may provide the wireless device with a length of the window by a higher layer parameter ra-ResponseWindow. In an example, the length of the window may be in number of slots. In an example, the wireless device may determine a slot duration for the length of the window based on the SCS for the Type1-PDCCH CSS set.

In an example, the wireless device may detect the DCI (e.g., DCI format 1_0) with CRC scrambled by the corresponding RA-RNTI within the window. In an example, the wireless device may detect a transport block in a PDSCH within the window. In an example, the DCI may schedule the transport block in the PDSCH. In an example, in response to the detecting the transport block, a lower layer (e.g., PHY, MAC) of the wireless device may pass the transport block to a higher layer of the wireless device (e.g., MAC, RRC). The higher layer may parse the transport block for a random-access preamble identity (RAPID) associated with the PRACH transmission. In an example, the higher layer may identify the RAPID in at least one random-access response (RAR) message of the transport block. In an example, in response to the identifying, the higher layer may indicate an uplink grant (e.g., RAR uplink grant) to the lower layer of the wireless device.

In an example, the higher layer of the wireless device may indicate to the lower layer (e.g., physical layer) of the wireless device to transmit a second PRACH in response to not detecting the DCI (e.g., DCI format 1_0) with CRC scrambled by the corresponding RA-RNTI within the window.

In an example, the higher layer of the wireless device may indicate to the lower layer (e.g., physical layer) of the wireless device to transmit a second PRACH in response to not receiving the transport block in the PDSCH, correctly, within the window.

In an example, the higher layer of the wireless device may indicate to the lower layer (e.g., physical layer) of the wireless device to transmit a second PRACH in response to not identifying the RAPID associated with the PRACH transmission from the wireless device.

In response to the higher layer indicating to the lower layer to transmit the second PRACH, the wireless device may transmit the second PRACH within a first offset (e.g., $N_{T,1}$+0.75 msec) after the last symbol of the window In an example, the wireless device may detect the DCI with CRC scrambled by the corresponding RA-RNTI.

In an example, the wireless device may detect/receive the transport block in the PDSCH.

In an example, the wireless device may initiate the PRACH transmission in response to receiving, from the base station, a PDCCH order.

In an example, the RAR UL grant may schedule a PUSCH transmission (e.g., Msg3) from the wireless device. In an example, the RAR UL grant may comprise at least one of: frequency hopping flag (e.g., 1 bit), a frequency resource allocation for the PUSCH transmission (e.g., 14 bit), a time resource allocation for the PUSCH transmission (e.g., 4 bit), MCS (e.g., 4 bit), TPC command for the PUSCH transmission (e.g., 3 bit), and CSI request (e.g., 1 bit).

In an example, the RAR UL grant in the at least one RAR message may schedule a PUSCH transmission (e.g., Msg3). In an example, the wireless device may transmit a second transport block in the PUSCH using a first redundancy version (e.g., 0).

In an example, the base station may not provide the wireless device with a C-RNTI. In an example, the wireless device may be in RRC-IDLE mode. In an example, the wireless device may be in RRC-INACTIVE mode. In an example, when the wireless device transmits the PUSCH scheduled by the RAR UL grant, in response to not being provided with the C-RNTI, the wireless device may attempt to detect a third DCI (e.g., DCI format 1_0) with CRC scrambled by the TC-RNTI. In an example, the third DCI may schedule a second PDSCH. In an example, the second PDSCH may comprise a UE contention resolution identity.

Example Bandwidth Parts (BWPs)

In an example, a wireless device may be configured with one or more BWPs for a serving cell (e.g., PCell, SCell). In an example, the serving cell may be configured with at most a first number (e.g., four) BWPs. In an example, for an activated serving cell, there may be one active BWP at any point in time.

In an example, a BWP switching for a serving cell may be used to activate an inactive BWP and deactivate an active BWP at a time. In an example, the BWP switching may be controlled by a PDCCH indicating a downlink assignment or an uplink grant. In an example, the BWP switching may be controlled by an inactivity timer (e.g. bwp-InactivityTimer). In an example, the BWP switching may be controlled by a MAC entity in response to initiating a Random Access procedure. In an example, the BWP switching may be controlled by an RRC signalling.

In an example, in response to RRC (re-)configuration of firstActiveDownlinkBWP-Id (e.g., included in RRC signaling) and/or firstActiveUplinkBWP-Id (e.g., included in RRC signaling) for a serving cell (e.g., SpCell), the wireless device may activate a DL BWP indicated by the firstActiveDownlinkBWP-Id and/or an UL BWP indicated by the firstActiveUplinkBWP-Id, respectively without receiving a PDCCH indicating a downlink assignment or an uplink grant. In an example, in response to an activation of an SCell, the wireless device may activate a DL BWP indicated by the firstActiveDownlinkBWP-Id and/or an UL BWP indicated by the firstActiveUplinkBWP-Id, respectively without receiving a PDCCH indicating a downlink assignment or an uplink grant.

In an example, for an active BWP of an activated serving cell (e.g., PCell, SCell) configured with one or more BWPs, a wireless device may perform, on the active BWP, at least one of: transmitting on UL-SCH on the active BWP; transmitting on RACH on the active BWP if PRACH occasions are configured; monitoring a PDCCH on the active BWP; transmitting, if configured, PUCCH on the active BWP; reporting CSI for the active BWP; transmitting, if configured, SRS on the active BWP; receiving DL-SCH on the active BWP; (re-) initializing any suspended configured uplink grants of configured grant Type 1 on the active BWP according to a stored configuration, if any, and to start in a symbol based on some procedures.

In an example, for a deactivated BWP of an activated serving cell configured with one or more BWPs, a wireless device may not perform at least one of: transmitting on UL-SCH on the deactivated BWP; transmitting on RACH on the deactivated BWP; monitoring a PDCCH on the deactivated BWP; transmitting PUCCH on the deactivated BWP; reporting CSI for the deactivated BWP; transmitting SRS on the deactivated BWP, receiving DL-SCH on the deactivated BWP. In an example, for a deactivated BWP of an activated serving cell configured with one or more BWPs, a wireless device may clear any configured downlink assignment and configured uplink grant of configured grant Type 2 on the deactivated BWP; may suspend any configured uplink grant of configured Type 1 on the deactivated (or inactive) BWP.

In an example, a wireless device may initiate a random-access procedure (e.g., contention-based random access, contention-free random access) on a serving cell (e.g., PCell, SCell).

In an example, a wireless device may receive, from a base station, one or more configuration parameters for a two-step random-access (RA) procedure of a cell (e.g., PCell, SCell). For example, the one or more configuration parameters may indicate at least one of following: one or more RACH occasions (e.g., time-frequency resources), one or more random-access preambles (RAPs) (or RAP groups), preamble format, SSB information (e.g., a number of transmitting SSBs, downlink resource allocation of SSB transmissions, transmission power of SSB transmission, and/or other information), one or more uplink radio resources (in terms of time, frequency, code/sequence/signature), and power control parameters (e.g., cell and/or UE specific power adjustments used for calculating received target power, inter-cell interference control parameter that may be used as a scaling factor of pathloss measurement, reference signal power to calculate for pathloss measurement, and/or one or more margins).

In an example, the two-step RA procedure may comprise a first uplink (UL) transmission of a RAP (e.g., two-step Msg1) of the one or more RAPs and a second UL transmission of one or more transport blocks (e.g., FDM-ed, TDM-ed). In an example, in response to receiving the RAP and/or the one or more transport blocks, the base station may transmit, to the wireless device, a two-step Msg2. The two-step Msg2 may comprise a response, e.g., random access response (RAR), corresponding to the first UL transmission and/or the second UL transmission.

In an example, the two-step Msg2 may comprise at least one of following: a timing advance command indicating the TA value, a power control command, an RAR UL grant (e.g., radio resource assignment, and/or MCS), a wireless device ID for contention resolution (e.g., a contention resolution message), an RNTI (e.g., C-RNTI or TC-RNTI), and/or other information. The two-step Msg2 (e.g., an RAR) may comprise a preamble identifier corresponding to the RAP, a positive (ACK) or negative acknowledgement (NACK) of a reception of the one or more transport blocks, and/or an indication of a successful decoding of the one or more transport blocks. In an example, the wireless device may transmit one or more second transport blocks based on the two-step Msg2.

In an example, in the two-step RA procedure, the wireless device may transmit the RAP via at least one RACH resource of the one or more RACH occasions indicated by the one or more configuration parameters. In an example, the wireless device may transmit the one or more transport blocks via at least one UL radio resource of the one or more uplink radio resources indicated by the one or more configuration parameters.

In an example, the one or more configuration parameters may indicate one or more associations between the one or more uplink radio resources and the one or more RAPs (or RAP groups). In an example, the one or more configuration parameters may indicate one or more associations between the one or more uplink radio resources and the one or more RACH occasions.

In an example, the one or more associations may be one-to-one, multi-to-one, one-to-multi, and/or multi-to-multi between one or more RAPs and one or more uplink radio resources. In an example, the one or more associations may be one-to-one, multi-to-one, one-to-multi, and/or multi-to-multi between one or more RACH occasions and one or more uplink radio resources.

Based on the associations, a wireless device may determine which UL radio resource and/or which PRACH resource or RAP need to be selected. In an example, when the wireless device selects a RAP of the one or more RAPs for a two-step RA procedure, based on the selection of the RAP and the one or more associations, the wireless device may determine at least one UL radio resource of the one or more uplink radio resources. In an example, in response to the determining, the wireless device may transmit the one or more transport blocks via the at least one UL radio resource for the two-step RA procedure.

In an example, the first transmission of the RAP may be overlapped in time and/or in frequency (partially or entirely) with the second transmission of the one or more transport blocks. In an example, the first transmission of the RAP may be multiplexed with the second transmission of the one or more transport blocks in time and/or frequency domains In an example, a wireless device may perform an LBT on an uplink channel. In an example, the wireless device may perform an uplink transmission via the uplink channel in response to a success of the LBT for the uplink channel. In an example, the success of the LBY for the uplink channel may comprise that the wireless device may determine the uplink channel idle (e.g., not being occupied by another wireless device).

In an example, the wireless device may not perform an uplink transmission (e.g., two-step Msg 1, preamble, one or more transport blocks) via the uplink channel in response to a failure of LBT for the uplink transmission. In an example, the failure of the LBT may comprise that the wireless device determines that the uplink channel (e.g., PRACH, PUSCH, PUCCH) for the uplink transmission is busy (occupied by another wireless device).

In an example, the wireless device may perform a first LBT for the first UL transmission of the RAP. In an example, the wireless device may perform a second LBT for the second UL transmission of the one or more transport blocks. In an example, the first LBT and the second LBT may be the same (e.g., simultaneous, same frequency, same time, etc). In an example, the first LBT and the second LBT may be different (e.g., different times, frequency, etc).

In an example, the wireless device may determine a success of the first LBT for the RAP. In an example, in response to the success of the first LBT, the wireless device may perform the first UL transmission of the RAP via the RACH resource. In an example, in response to the success of the first LBT, the wireless device may not perform the second LBT for the second UL transmission of the one or more transport blocks. In an example, in response to the not performing the second LBT, the wireless device may perform the second UL transmission of the one or more transport blocks via the at least one UL radio resource when the first LBT for the RAP is successful. This may be a case that PRACH and UL radio resources are allocated closely enough in time domain. In an example, the wireless device may perform the first and the second UL transmissions back to back in response to the being allocated closely enough in time.

In an example, the wireless device may determine a success of the first LBT (e.g., idle) for the RAP. In an example, in response to the success of the first LBT, the wireless device may perform the first UL transmission of the RAP via the RACH resource and the second UL transmission of the one or more transport blocks via the at least one UL radio resource.

In an example, the wireless device may determine a failure of the first LBT (e.g., busy) for the RAP. In an example, in response to the failure of the first LBT, the wireless device may not perform the first UL transmission of the RAP via the RACH resource and the second UL transmission of the one or more transport blocks via the at least one UL radio resource.

In an example, a wireless device may receive, from a base station, one or more messages (e.g. RRC connection reconfiguration message, or RRC connection reestablishment message, or RRC connection setup message) comprising one or more configuration parameters for a cell (e.g., PCell, PSCell, SCell). In an example, the one or more configuration parameters may comprise bandwidth part (BWP) configuration parameters for a plurality of downlink BWPs of the cell and a plurality of uplink BWPs of the cell.

In an example, the wireless device may operate in a paired spectrum (e.g., frequency division duplex (FDD)).

In an example, the one or more configuration parameters may further comprise downlink BWP specific indices for the plurality of downlink BWPs and/or uplink BWP specific indices for the plurality of uplink BWPs. In an example, each downlink BWP of the plurality of downlink BWPs may be identified by a respective one downlink BWP specific index of the downlink BWP specific indices (e.g., provided by a higher layer parameter bwp-ID). In an example, each uplink BWP of the plurality of uplink BWPs may be identified by a respective one uplink BWP specific index of the uplink BWP specific indices (e.g., provided by a higher layer parameter bwp-ID).

In an example, at a time slot, the wireless device may operate on a first downlink BWP of the plurality of downlink BWPs and a second uplink BWP of the plurality of uplink BWPs of the cell. In response to the operating, the wireless device may be, at the time slot, active on the first downlink BWP and the second uplink BWP for the cell. In an example, at the time slot, the first downlink BWP and the second uplink BWP may be an active downlink BWP and an active uplink BWP of the cell, respectively in response to the operating.

In an example, when the first downlink BWP is the active downlink BWP and the second uplink BWP is the active uplink BWP of the cell (e.g., at the time slot), the wireless device may initiate a random-access procedure (e.g., contention-based random-access procedure, contention-free random-access procedure). The wireless device may perform the random-access procedure on the first downlink BWP and the second uplink BWP.

In an example, the random-access procedure may be initiated for an initial access from RRC_IDLE, an RRC Connection Re-establishment procedure, a handover, a DL or UL data arrival during RRC_CONNECTED when UL synchronization status is "non-synchronized", a transition from RRC_INACTIVE, a time alignment establishment at SCell addition, a beam failure recovery, or a request for other system information (SI).

In an example, the one or more configuration parameters may comprise one or more PRACH resources on the second uplink BWP. In an example, the one or more configuration parameters may comprise one or more RSs (e.g., SS/PBCH blocks, CSI-RS). In an example, the one or more configuration parameters may further comprise one or more associations (or correspondence) between the one or more RSs and the one or more PRACH resources (e.g., the association may be one-to-one, one-to-many, many-to-one, etc). The association may be provided by configuration parameters (e.g., RACH-ConfigDedicated, CandidateBeamRSList, RACH-ConfigCommon, ra-ssb-OccasionMaskIndex, ra-OccasionList etc).

In an example, the performing the random-access procedure on the second uplink BWP may comprise performing a random-access resource selection on the second uplink BWP. In an example, the performing the random-access resource selection may comprise selecting a first RS in the one or more RSs. The first RS may be a first SS/PBCH block or a first CSI-RS. In an example, based on the one or more associations, the first RS may be associated with (or corresponding to) a PRACH resource of the one or more PRACH resources configured on the second uplink BWP. The PRACH resource may comprise at least one preamble (associated with PREAMBLE_INDEX) and at least one PRACH occasion (e.g., time, frequency, code) on the second uplink BWP.

In an example, in response to the performing the random-access resource selection, the wireless device may perform a random-access preamble transmission. In an example, in the random-access preamble transmission, the wireless device may transmit, in a first slot, the at least one preamble via the at least one PRACH resource of the second uplink BWP for the random-access procedure.

In an example, in response to transmitting the at least one preamble in the first slot, the wireless device may start, from a second slot, a configured response window (e.g., ra-responseWindow). In an example, the configured response window may be configured by the one or more configuration parameters (e.g., RACH-ConfigCommon, BeamFailureRecoveryConfig).

In an example, when the configured response window is running, the wireless device may monitor for a random-access response (RAR) corresponding to the at least one preamble. The monitoring for the random-access response may comprise monitoring, for a DCI (e.g. a downlink assignment, an uplink grant), at least one PDCCH in the second downlink BWP of the cell (e.g., SpCell).

In an example, the DCI may be identified with CRC scrambled by a C-RNTI or MCS-C-RNTI of the wireless device. For example, the random-access procedure may be initiated for a beam failure recovery of the cell.

In an example, the DCI may be identified with CRC scrambled by a RA-RNTI.

In an example, an offset between the first slot and the second slot may be fixed. In an example, the offset may be 4 slots.

In an example, the second slot may be at a first PDCCH occasion of the second downlink BWP from the end of the transmitting the at least one preamble.

In an example, when the random-access procedure is initiated for a beam failure recovery, in response to receiving the DCI (e.g., scrambled by C-RNTI or MCS-C-RNTI) on the at least one PDCCH in the second downlink BWP of the cell, within the configured response window, the random-access procedure (e.g., contention-free random-access procedure) for the beam failure recovery may be successfully completed.

In an example, the random-access response may comprise a first MAC subPDU with a random-access preamble identifier. In an example, the random-access preamble identifier may be associated with (or corresponding to) the at least one preamble (e.g., PREAMBLE_INDEX).

In an example, when the random-access procedure is not initiated for a beam failure recovery (e.g., contention-free random-access procedure for the beam failure recovery), in response to receiving the DCI (e.g., scrambled by RA-RNTI) in the at least one PDCCH of the second downlink BWP of the cell, within the configured response window, and the random-access preamble identifier being associated with (or corresponding to) the at least one preamble, a reception of the random-access response may be successfully completed.

In an example, when the random-access procedure is not initiated for a beam failure recovery and a reception of the random-access response is successfully completed, in response to receiving the DCI (e.g., scrambled by RA-RNTI) on the at least one PDCCH in the second downlink BWP of the cell, within the configured response window, the random-access procedure (e.g., contention-free random-access procedure) may be successfully completed.

In an example, the configured response window may expire. In an example, the wireless device may not receive the DCI within the configured response window. In response to the configured response window expiring and the wireless device not receiving the DCI (e.g., scrambled by C-RNTI) or a random-access response comprising the random-access preamble identifier being associated with (or corresponding to) the at least one preamble, the wireless device may consider a reception of the random-access response unsuccessful and may increment a preamble transmission counter variable (e.g., PREAMBLE_TRANSMISSION_COUNTER) by one.

In an example, in response to the incrementing, the preamble transmission counter variable may be equal to or greater than a preamble maximum transmission parameter (e.g., RRC parameter preambleTransMax).

In an example, the cell may be an SpCell (e.g., PCell, PSCell). In an example, the wireless device may transmit the at least one preamble on the SpCell in response to the cell being the SpCell. In an example, the wireless device may indicate a problem of the random-access procedure to upper layers (e.g., RRC) in response to the preamble transmission counter variable being equal to or greater than the preamble maximum transmission parameter.

In an example, the cell may be an SCell. In an example, the wireless device may transmit the at least one preamble on the SCell in response to the cell being the SCell. In an example, the wireless device may complete the random-access procedure unsuccessfully in response to the preamble transmission counter variable being equal to or greater than the preamble maximum transmission parameter.

In an example, in response to the indicating the problem of the random-access procedure to the upper layers (e.g., RRC), the upper layers may trigger a radio link failure that may lead to prolonged random-access delay and degraded user experience.

In an example, in response to the incrementing, the preamble transmission counter variable may be less than the preamble maximum transmission parameter plus one. In response to the preamble transmission counter variable being less than the preamble maximum transmission parameter plus one, the wireless device may consider the random-access procedure incomplete.

In an example, in response to the considering the random-access procedure incomplete, the wireless device may select a random back-off time. The random back-off time may be selected according to a uniform distribution between zero and a preamble back-off variable in the RAR. In an example, the wireless device may start a back-off timer with a value indicated by the random back-off time in response to the selecting.

In an example, while the back-off timer is running, the wireless device may perform a second random-access resource selection. The wireless device may select a second RS in the one or more RSs. In an example, the second RS may be a second SS/PBCH block or a second CSI-RS. In an example, based on the one or more associations, the second RS may be associated with (or corresponding to) a second PRACH resource of the one or more PRACH resources configured on the second uplink BWP. The second PRACH resource may comprise at least one second preamble and at least one second PRACH occasion (e.g., time, frequency, code) on the second uplink BWP. In an example, when the wireless device performs the second random-access resource selection, the wireless device may perform a second random-access preamble transmission. In an example, in the second random-access preamble transmission, the wireless device may transmit, in a third slot, the at least one second preamble via the at least one second PRACH resource of the second uplink BWP for the random-access procedure.

In an example, in a contention-based two-step random-access procedure, PUSCH resources to transmit a MsgA payload of the contention-based two-step random-access procedure may be shared among a plurality of wireless devices. In an example, each wireless device of the plurality of wireless devices may transmit, via the PUSCH resources, a MsgA payload for a respective contention-based two-step random-access procedure. Based on the PUSCH resources being shared, a wireless device, of the plurality of wireless devices, may not release the PUSCH resources in response to completing a contention-based two-step random-access procedure. Based on not releasing the PUSCH resources, the wireless device may transmit, via the PUSCH resources, a MsgA payload for a subsequent contention-based two-step random-access procedure.

In an example, in a contention-free two-step random-access procedure, PUSCH resources to transmit a MsgA payload of the contention-free two-step random-access procedure may be dedicated to a wireless device. Based on the PUSCH resources being dedicated, the PUSCH resources may be contention-free PUSCH resources. In an example, the wireless device may initiate a contention-free two-step random-access procedure (e.g., for handover, for beam failure recovery procedure, etc). Based on the initiating the contention-free two-step random-access procedure, the wireless device may transmit a random-access preamble via contention-free random-access resources and a MsgA payload. The wireless device may transmit the MsgA payload via the contention-free PUSCH resource(s). The wireless device may complete the contention-free two-step random-access procedure based on receiving a random-access response. In an example, the wireless device may not release the contention-free PUSCH resource(s) based on the completing. The wireless device may use (or transmit via) the contention-free PUSCH resource(s) for subsequent random-access procedures.

In an example, based on the completing the contention-free two-step random-access procedure, the base station may allocate/assign the contention-free PUSCH resource(s) to a second wireless device. This may increase the resource efficiency when the wireless device does not use the contention-free PUSCH resource(s) for the subsequent random-access procedures for a long time. The contention-free PUSCH resource(s) not used by the wireless device may be allocated/assigned to the second wireless device. Implementation of not releasing the contention-free PUSCH resource(s) based on the completing the contention-free two-step random-access procedure may not be efficient. For example, when the number of wireless devices in a cell is high, resource efficiency may be important to meet quality of service (QoS) demands of the wireless devices in the cell. When the wireless device does not release the contention-free PUSCH resource(s) assigned/allocated to the second wireless device, the wireless device and the second wireless device may transmit via the contention-free PUSCH resource(s) resulting in collision. This may lead to unsuccessful reception of MsgA payload at the base station, lowering the data rate, increasing the delay of a successful communication, increasing battery consumption due to retransmissions, etc. There is a need to implement an enhanced procedure for the contention-free PUSCH resource(s) when a wireless device completes a contention-free two-step random-access procedure.

In an example, the wireless device may release the contention-free PUSCH resource(s) during the contention-free two-step random-access procedure. In an example, the wireless device may release the contention-free PUSCH resource(s) after the contention-free two-step random-access procedure is completed. The wireless device may release the contention-free PUSCH resource(s) after a time duration after the contention-free two-step random-access procedure is completed. In an example, the wireless device may release the contention-free PUSCH resource(s) based on an indication (e.g., downlink control information indicating to release) from the base station. There is a need to define at which point/condition to release the contention-free PUSCH resources. This may enable the base station and the wireless device to be aligned on the usage of the contention-free PUSCH resources. In an example, the base station may not monitor the contention-free PUSCH resources for a MsgA reception when the wireless device releases the contention-free PUSCH resources. This may lead to power efficiency at the base station.

In an example embodiment, a wireless device may release the contention-free PUSCH resource(s) based on the completing the contention-free two-step random-access procedure. In an example, the wireless device may complete the contention-free two-step random-access procedure based on receiving a PDCCH scheduling a random-access response. The PDCCH may be identified by a C-RNTI. The PDCCH may be identified by a RA-RNTI. The PDCCH may be identified by a MSGB-RNTI. In an example, the wireless device may complete the contention-free two-step random-access procedure based on a number of preamble transmissions reaching to a configured maximum number. Releasing the contention-free PUSCH resource(s) may increase the resource efficiency, improve the battery consumption and reduce collisions.

Figure 24:
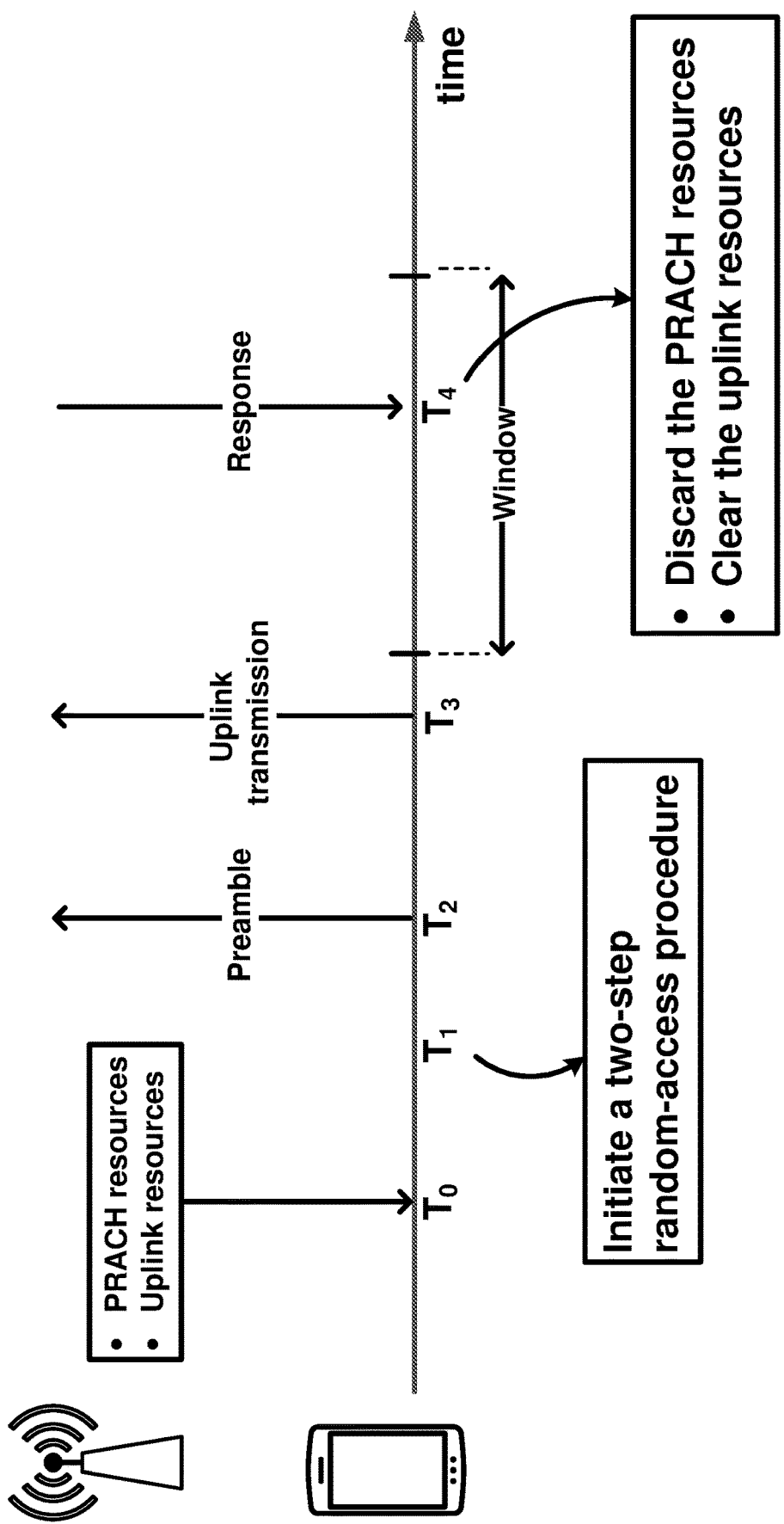
FIG. 24 is an example of a random-access procedure as per an aspect of an embodiment of the present disclosure.

FIG. 24 shows an example of a random-access procedure as per an aspect of an embodiment of the present disclosure.

In an example, a wireless device may receive, from a base station, one or more configuration parameters for a two-step random-access (RA) procedure of a cell (e.g., PCell, SCell) at time T0 in FIG. 24. In an example, the one or more configuration parameters may indicate one or more PRACH resources (e.g., PRACH resources in FIG. 24).

In an example, the one or more PRACH resources may comprise one or more random-access preambles (RAPs). In an example, the one or more PRACH resources may comprise one or more RACH occasions (e.g., time/frequency occasion).

In an example, the one or more configuration parameters may indicate one or more uplink radio resources (in terms of time, frequency, code/sequence/signature) for a MsgA payload transmission of the two-step RA procedure. The one or more uplink radio resources are Uplink resources in FIG. 24. In an example, the uplink radio resources may be PUSCH resources.

In an example, an uplink radio resource of the one or more uplink radio resources may indicate at least one time resource/occasion. In an example, an uplink radio resource of the one or more uplink radio resources may indicate at least one frequency resource/occasion.

In an example, the one or more configuration parameters may indicate one or more uplink grants. The one or more uplink grants may indicate one or more uplink radio resources (in terms of time, frequency, code/sequence/signature). In an example, the one or more uplink grants indicating the one or more uplink radio resources (or PUSCH resources) may comprise that an uplink grant of the one or more uplink grants may indicate at least one time resource/occasion of the one or more uplink radio resources (or PUSCH resources). In an example, the one or more uplink grants indicating the one or more uplink radio resources may comprise that an uplink grant of the one or more uplink grants may indicate at least one frequency resource/occasion of the one or more uplink radio resources.

In an example, the base station may broadcast one or more uplink radio resources (in terms of time, frequency, code/sequence/signature). The one or more uplink radio resources are Uplink resources in FIG. 24. In an example, in response to the broadcasting the one or more uplink resources, a plurality of wireless devices (in the cell) including the wireless device may share the one or more uplink radio resources (or PUSCH resources).

In an example, the base station may broadcast one or more uplink grants. The one or more uplink grants may indicate one or more uplink radio resources (in terms of time, frequency, code/sequence/signature). The one or more uplink radio resources are Uplink resources in FIG. 24. In an example, in response to the broadcasting the one or more uplink grants, a plurality of wireless devices (in the cell) including the wireless device may share the one or more uplink grants. In an example, the one or more uplink grants indicating the one or more uplink radio resources may comprise that an uplink grant of the one or more uplink grants may indicate at least one time resource/occasion of the one or more uplink radio resources. In an example, the one or more uplink grants indicating the one or more uplink radio resources may comprise that an uplink grant of the one or more uplink grants may indicate at least one frequency resource/occasion of the one or more uplink radio resources.

In an example, the one or more configuration parameters may indicate one or more associations/mappings between the one or more uplink radio resources (or the one or more uplink grants) and the one or more PRACH resources. In an example, the one or more configuration parameters may indicate one or more associations/mappings between the one or more uplink radio resources (or the one or more uplink grants) and the one or more RAPs of the one or more PRACH resources. In an example, the one or more configuration parameters may indicate one or more associations/mappings between the one or more uplink radio resources (or the one or more uplink grants) and the one or more RACH occasions of the one or more PRACH resources. In an example, the one or more associations/mappings may be one-to-one, multi-to-one, one-to-multi, and/or multi-to-multi.

Figure 25:
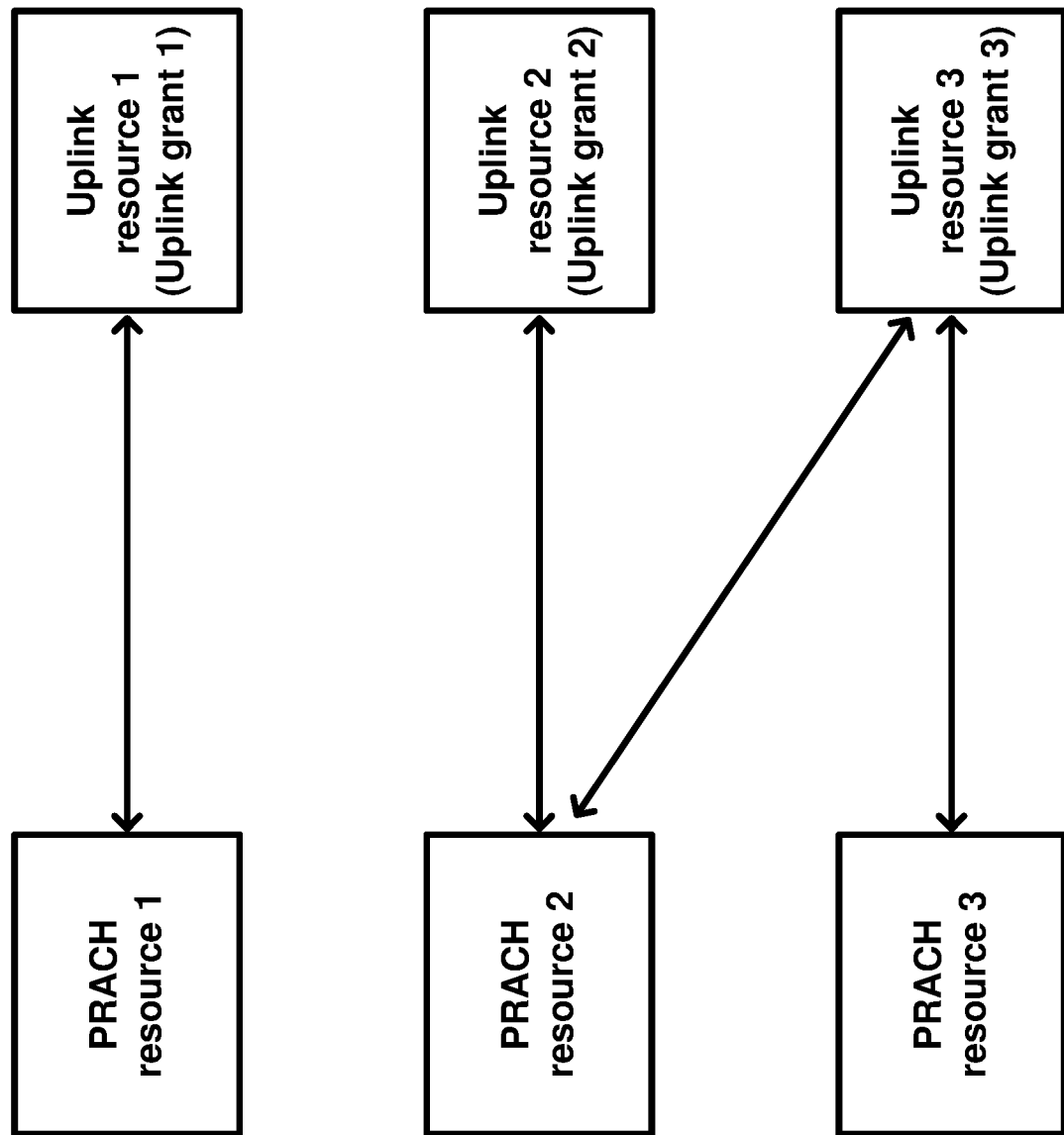
FIG. 25 is an example of association/mapping in a two-step random-access procedure as per an aspect of an embodiment of the present disclosure.

In an example, in FIG. 25, PRACH resource 1 of the one or more PRACH resources is one-to-one associated/mapped with uplink resource 1 of the one or more uplink radio resources (or with uplink grant 1 of the one or more uplink grants). In an example, in response to the one-to-one association/mapping, when the wireless device selects the PRACH resource 1 for a two-step random-access procedure, the wireless device selects the uplink resource 1 (indicated by the uplink grant 1) for an uplink transmission of a transport block (e.g., PUSCH, Msg3). In an example, when the base station receives a transport block on the uplink resource 1, based on the one-to-one association/mapping, the base station may determine that the wireless device selected the PRACH resource 1 for a two-step random-access procedure.

In an example, in FIG. 25, PRACH resource 2 of the one or more PRACH resources is one-to-multi associated/mapped with uplink resource 2 of the one or more uplink radio resources (or with uplink grant 2 of the one or more uplink grants) and uplink resource 3 of the one or more uplink radio resources (or with uplink grant 3 of the one or more uplink grants). In an example, in response to the one-to-multi association/mapping, when the wireless device selects the PRACH resource 2 for a two-step random-access procedure, the wireless device selects the uplink resource 2 (indicated by the uplink grant 2) or the uplink resource 3 (indicated by the uplink grant 3) for an uplink transmission of a transport block (e.g., PUSCH, Msg3). In an example, when the base station receives a transport block on the uplink resource 2 or on the uplink resource 3, based on the one-to-multi association/mapping, the base station may determine that the wireless device selected the PRACH resource 2 for a two-step random-access procedure.

In an example, in FIG. 25, uplink resource 3 of the one or more uplink radio resources (or uplink grant 3 of the one or more uplink grants) is multi-to-one associated/mapped with PRACH resource 2 of the one or more PRACH resources and PRACH resource 3 of the one or more PRACH resources. In an example, in response to the multi-to-one association/mapping, when the wireless device selects the PRACH resource 2 or the PRACH resource 3 for a two-step random-access procedure, the wireless device may select the uplink resource 3 (or the uplink grant 3 of the one or more uplink grants) for an uplink transmission of a transport block (e.g., PUSCH, Msg3). In an example, when the base station receives a transport block on the uplink resource 3, based on the multi-to-one association/mapping, the base station may determine that the wireless device selected the PRACH resource 2 or the PRACH resource 3 for a two-step random-access procedure.

In an example, the wireless device may initiate a two-step random-access procedure (e.g., contention-free random-access procedure, contention-based random-access procedure) for the cell at time T1 in FIG. 24. In an example, the wireless device may perform a first random-access resource selection in response to the initiating the two-step random-access procedure. In an example, the wireless device may select a random-access channel (PRACH) resource of the one or more PRACH resources for the first random-access selection. In an example, the PRACH resource may comprise at least one preamble. In an example, the PRACH resource may comprise at least one PRACH occasion (e.g., time resource/occasion, frequency resource/occasion, code).

In an example, when the wireless device performs the first random-access resource selection for the two-step random-access procedure, based on the one or more associations/mappings (e.g., in FIG. 25), the wireless device may determine/select at least one UL radio resource (e.g., PUSCH resource) of the one or more uplink radio resources (or determine/select at least one UL grant of the one or more uplink grants) for an uplink transmission of a transport block (e.g., MsgA payload, Msg3, PUSCH). In an example, the PRACH resource may be (e.g., one-to-one, one-to-multi, multi-to-one) associated/mapped with the at least one UL radio resource (or the at least one UL grant). In an example, at least one UL grant may indicate the at least one UL radio resource. In an example, the at least one UL radio resource may comprise at least one time resource/occasion and/or at least one frequency resource/occasion. In an example, the PRACH resource being associated/mapped with the at least one UL radio resource (or the at least one UL grant) may comprise the at least one preamble of the PRACH resource being associated/mapped with the at least one UL radio resource (or the at least one UL grant). In an example, the PRACH resource being associated/mapped with the at least one UL radio resource (or the at least one UL grant) may comprise the at least one PRACH occasion of the PRACH resource being associated/mapped with the at least one UL radio resource (or the at least one UL grant).

In an example, based on the first random-access selection, the wireless device may transmit, via the at least one PRACH occasion, the at least one preamble for the two-step random-access procedure at time T2 in FIG. 24.

In an example, in response to the determining/selecting the at least one UL radio resource (or the at least one UL grant), the wireless device may transmit, via the at least one UL radio resource (e.g., a PUSCH resource), the transport block (e.g., MsgA payload) for the uplink transmission for the two-step random-access procedure at time T3 in FIG. 24. In an example, the at least one UL grant may indicate the at least one UL radio resource.

In an example, the transmission of the at least one preamble may overlap in time and/or in frequency (partially or entirely) with the uplink transmission of the transport block (e.g., FIG. 17B.). In an example, the at least one PRACH occasion may be multiplexed with the at least one UL radio resource in time and/or frequency domains (e.g., TDM-ed, FDM-ed). In an example, when the at least one PRACH occasion is multiplexed with the at least one UL radio resource in a frequency domain, the wireless device may transmit the at least one preamble and the at least one UL radio resource simultaneously (e.g., FIG. 17B, T2 and T3 may be the same in FIG. 24).

In an example, when the at least one PRACH occasion is multiplexed with the at least one UL radio resource in a time domain, the wireless device may transmit the at least one preamble and the transport block at different times with a time gap (e.g., FIG. 17A, FIG. 17C, T2 and T3 may be different in FIG. 24).

In an example, in response to the transmitting the at least one preamble and/or the transport block, the wireless device may monitor a PDCCH for a response (e.g., random-access response, two-step Msg2, MsgB), from the base station. In an example, the response may be corresponding to the at least one preamble. In an example, the response may be corresponding to the transport block. In an example, the response may be corresponding to the at least one preamble and the transport block.

In an example, the base station may detect the at least one preamble and the transport block. In response to the detecting the at least one preamble and the transport block, the response, from the base station, may be corresponding to the at least one preamble and the transport block.

In an example, the base station may detect the at least one preamble. In an example, the base station may not detect the transport block. In response to the detecting the at least one preamble and not detecting the transport block, the response, from the base station, may be corresponding to the at least one preamble.

In an example, the base station may not detect the at least one preamble. In an example, the base station may detect the transport block. In response to the not detecting the at least one preamble and detecting the transport block, the response, from the base station, may be corresponding to the transport block.

In an example, the response may comprise at least one of following: an RAR UL grant (e.g., radio resource assignment, and/or MCS), a wireless device ID for contention resolution (e.g., a contention resolution message), an RNTI (e.g., C-RNTI or TC-RNTI), and/or other information. In an example, the response may comprise a timing advance command (e.g., Timing advance command MAC-CE) indicating a timing advance value. In an example, the response (e.g., an RAR) may comprise a preamble identifier corresponding to the at least one preamble, a positive (ACK) or negative acknowledgement (NACK) of a reception of the transport block, and/or an indication of a successful decoding of the transport block.

In an example, the monitoring for the response may comprise attempting to detect a DCI (e.g., DCI format 1_0) during a window (e.g., ra-responseWindow). In an example, the one or more configuration parameters may indicate the window (e.g., Window in FIG. 24).

In an example, the monitoring for the response may comprise monitoring, for a DCI (e.g. a downlink assignment, an uplink grant), at least one PDCCH in the cell (e.g., SpCell). In an example, the DCI may comprise an uplink grant. In an example, the DCI may comprise a downlink assignment.

In an example, the DCI may be with CRC scrambled by a second RNTI. In an example, the second RNTI may be RA-RNTI. In an example, the second RNTI may be a C-RNTI. In an example, the second RNTI may be a TC-RNTI. In an example, the second RNTI may be a CS-RNTI. In an example, the second RNTI may be a MCS-C-RNTI. In an example, the second RNTI may be a MSGB-RNTI (e.g., since the DCI is scheduling the response, which is also named as MsgB).

In an example, the wireless device may detect the DCI (e.g., DCI format 1_0) in the at least one PDCCH in the cell within the window at time T4 in FIG. 24. In an example, the wireless device may detect a first transport block in a PDSCH. In an example, the DCI may schedule the first transport block in the PDSCH. In an example, in response to the detecting the first transport block, a lower layer (e.g., PHY, MAC) of the wireless device may pass the first transport block to a higher layer of the wireless device (e.g., MAC, RRC). The higher layer may parse the first transport block for a random-access preamble identity (RAPID).

In an example, the wireless device may receive the response corresponding to the at least one preamble. In an example, receiving the response corresponding to the at least one preamble may comprise that the RAPID (in the first transport block) identifies the at least one preamble. In an example, receiving the response corresponding to the at least one preamble may comprise that the RAPID (in the first transport block) indicates the at least one preamble. In an example, the DCI scheduling the response may have a CRC scrambled by the second RNTI (e.g., RA-RNTI). In an example, in response to the receiving the response corresponding to the at least one preamble, the wireless device may complete the reception of the response successfully.

In an example, the wireless device may receive the response corresponding to the transport block. In an example, receiving the response corresponding to the transport block may comprise that the response identifies a wireless ID (e.g., contention-resolution ID, wireless-specific/dedicated ID, random number selected by the wireless device, etc). In an example, receiving the response corresponding to the transport block may comprise that the response comprises an RNTI (e.g., C-RNTI or TC-RNTI) of the wireless device. In an example, receiving the response corresponding to the transport block may comprise that the DCI scheduling the response has a CRC scrambled by the second RNTI (e.g., C-RNTI) of the wireless device. In an example, the response may comprise a timing advance command (e.g., Timing advance command MAC-CE) indicating a timing advance value. In an example, receiving the response corresponding to the transport block may comprise that the response comprises an identifier corresponding to the transport block. In an example, receiving the response corresponding to the transport block may comprise that the response comprises an ACK/NACK for a reception of the transport block. In an example, receiving the response corresponding to the transport block may comprise that the response comprises an indication of a successful decoding of the transport block. In an example, in response to the receiving the response corresponding to the transport block, the wireless device may complete the reception of the response successfully.

In an example, the two-step random-access procedure may be a contention-free random-access procedure. In an example, in response to receiving the response corresponding to the at least one preamble, the two-step random-access procedure may be successfully completed.

In an example, the two-step random-access procedure may be a contention-free random-access procedure. In an example, in response to receiving the response corresponding to the transport block, the two-step random-access procedure may be successfully completed.

In an example, the two-step random-access procedure may be a contention-free random-access procedure. In an example, in response to receiving the response corresponding to the at least one preamble and the transport block, the two-step random-access procedure may be successfully completed.

In an example, the two-step random-access procedure may be a contention-free random-access procedure. In an example, in response to receiving the response corresponding to at least one of the transmitted at least one preamble and the transport block, the two-step random-access procedure may be successfully completed.

In an example, the wireless device may determine that the two-step random access procedure is unsuccessfully completed. For example, when the wireless device does not receive the response corresponding to at least one of the transmitted at least one preamble and the transport block during the window, based on a maximum number of preamble transmissions (e.g., preambleTransMax configured by the one or more configuration parameters), the wireless device may consider the two-step random-access procedure unsuccessfully completed. In an example, a number of preamble transmissions may be equal to or greater than the maximum number of preamble transmissions.

In an example, the two-step random-access procedure may be a contention-free random-access procedure.

In an example, the base station may explicitly indicate/signal the one or more PRACH resources for the contention-free random-access procedure (e.g., handover, system information request, PDCCH order, beam failure recovery procedure). In an example, the base station may explicitly indicate the one or more PRACH resources in response to the two-step random-access procedure being the contention-free random-access procedure (e.g., handover, system information request, PDCCH order, beam failure recovery procedure).

In an example, for the explicit indication/signaling, the base station may provide the wireless device with the one or more PRACH resources by a higher layer parameter rach-ConfigDedicated. In an example, the one or more configuration parameters may comprise the higher layer parameter rach-ConfigDedicated.

In an example, for the explicit indication/signaling, the base station may provide the wireless device with the one or more PRACH resources by an RRC signaling (e.g., BeamFailureRecoveryConfig, SI-SchedulingInfo), a DCI or a MAC CE.

In an example, the base station may explicitly indicate/signal (e.g., by a PDCCH order) the at least one preamble (e.g., ra-PreambleIndex) for the contention-free random-access procedure. In an example, the base station may explicitly indicate/signal (e.g., by a PDCCH order) the at least one preamble (e.g., ra-PreambleIndex) in response to the two-step random-access procedure being the contention-free random-access procedure. In an example, for the explicit indication/signaling, the base station may transmit, to the wireless device, a DCI (e.g., PDCCH order) indicating the at least one preamble (e.g., ra-PreambleIndex).

In an example, when the wireless device completes the two-step random-access procedure (e.g., successfully or unsuccessfully), in response to the two-step random-access procedure being the contention-free random-access procedure (e.g., initiated by handover, system information request, PDCCH order), the wireless device may discard the one or more PRACH resources. In an example, the base station may explicitly indicate/signal the one or more PRACH resources for the contention-free random-access procedure. In an example, the wireless device may not initiate the two-step random-access procedure (or the contention-free random-access procedure) for a beam failure recovery procedure of the cell. In an example, when the wireless device discards the one or more PRACH resources, in response to the one or more associations/mappings between the one or more uplink radio resources (or the one or more uplink grants) and the one or more PRACH resources, the wireless device may clear the one or more uplink radio resources (or clear the one or more uplink grants) at time T4 in FIG. 24.

In an example, in response to the completing the two-step random-access procedure (e.g., successfully or unsuccessfully) and the two-step random-access procedure being the contention-free random-access procedure (e.g., initiated by handover, system information request, PDCCH order), the wireless device may clear the one or more uplink radio resources (or clear the one or more uplink grants) at time T4 in FIG. 24.

In an example, when the wireless device completes the two-step random-access procedure at time T4 in FIG. 24, in response to the two-step random-access procedure being the contention-free random-access procedure (e.g., initiated by handover, system information request, PDCCH order), the wireless device may discard the PRACH resource. In an example, the base station may explicitly indicate/signal the at least one preamble of the PRACH resource for the contention-free random-access procedure. In an example, the wireless device may not initiate the two-step random-access procedure (or the contention-free random-access procedure) for a beam failure recovery procedure of the cell. In an example, when the wireless device discards the PRACH resource, in response to the PRACH resource being associated/mapped with the at least one UL radio resource (or the at least one UL grant), the wireless device may clear the at least one UL radio resource (or clear the at least one UL grant) at time T4 in FIG. 24.

In an example, in response to the completing the two-step random-access procedure (e.g., successfully or unsuccessfully) and the two-step random-access procedure being the contention-free random-access procedure (e.g., initiated by handover, system information request, PDCCH order), the wireless device may clear the at least one UL radio resource (or clear the at least one UL grant) at time T4 in FIG. 24.

In an example, the base station may explicitly indicate/signal the one or more uplink radio resources (or the one or more uplink grants) for the contention-free random-access procedure (e.g., handover, system information request, PDCCH order, beam failure recovery procedure). In an example, the base station may explicitly indicate/signal the one or more uplink radio resources (or the one or more uplink grants) in response to the two-step random-access procedure being the contention-free random-access procedure (e.g., handover, system information request, PDCCH order, beam failure recovery procedure). In an example, for the explicit indication/signaling, the base station may provide the wireless device with the one or more uplink radio resources (or the one or more uplink grants) by an RRC signaling, a DCI or MAC-CE.

In an example, the base station may explicitly indicate/signal the at least one UL radio resource (or the at least one UL grant) for the contention-free random-access procedure (e.g., handover, system information request, PDCCH order, beam failure recovery procedure). In an example, the base station may explicitly indicate/signal the at least one UL radio resource (or the at least one UL grant) in response to the two-step random-access procedure being the contention-free random-access procedure (e.g., handover, system information request, PDCCH order, beam failure recovery procedure). In an example, for the explicit indication/signaling, the base station may provide the wireless device with the at least one UL radio resource (or the at least one UL grant) by an RRC signaling, a DCI or MAC-CE.

In an example, when the wireless device completes the two-step random-access procedure (e.g., successfully or unsuccessfully) and the two-step random-access procedure is the contention-free random-access procedure (e.g., initiated by handover, system information request, PDCCH order), the wireless device may clear the one or more uplink radio resources (or clear the one or more uplink grants) at time T4 in FIG. 24 in response to the base station explicitly indicating/signalling the one or more uplink radio resources (or the one or more uplink grants) for the two-step random-access procedure. In an example, the wireless device may not initiate the two-step random-access procedure (or the contention-free random-access procedure) for a beam failure recovery procedure of the cell.

In an example, when the wireless device completes the two-step random-access procedure (e.g., successfully or unsuccessfully) and the two-step random-access procedure is the contention-free random-access procedure (e.g., initiated by handover, system information request, PDCCH order), the wireless device may clear the at least one UL radio resource (or the at least one UL grant) at time T4 in FIG. 24 in response to the base station explicitly indicating/signaling the at least one UL radio resource (or the at least one UL grant) for the two-step random-access procedure. In an example, the wireless device may not initiate the two-step random-access procedure (or the contention-free random-access procedure) for a beam failure recovery procedure of the cell.

In an example, the clearing the at least one UL radio resource (or the at least one UL grant) may comprise that the wireless device may not transmit a transport block via the at least one UL radio resource indicated by the at least one UL grant. In an example, the wireless device may not transmit a transport block via the at least one UL radio when the wireless device initiates a new random-access procedure. In an example, the base station may assign/allocated the at least one UL radio resource to a second wireless device. If a wireless device does not clear the at least one UL radio resource, the wireless device may transmit a transport block via the at least one UL radio resource resulting in a collision with the second wireless device. In an example, the clearing the at least one UL radio resource (or the at least one UL grant) may comprise that the wireless device may not use the at least one UL grant for an uplink transmission of a transport block. In an example, the clearing the at least one UL radio resource (or the at least one UL grant) may comprise releasing the at least one UL radio resource (or the at least one UL grant).

In an example, the clearing the one or more uplink radio resources (or clear the one or more uplink grants) may comprise that the wireless device may not transmit a transport block via the one or more uplink radio resources indicated by the one or more uplink grants. In an example, the clearing the one or more uplink radio resources (or clear the one or more uplink grants) may comprise that the wireless device may not transmit a transport block via an uplink radio resource of the one or more uplink radio resources indicated by an uplink grant of the one or more uplink grants. In an example, the base station may assign/allocated the one or more uplink radio resources to at least one wireless device. If a wireless device does not clear the one or more uplink radio resources, the wireless device may transmit a transport block via the one or more uplink radio resources resulting in a collision with the at least one wireless device. In an example, the clearing the one or more uplink radio resources (or the one or more uplink grants) may comprise that the wireless device may not use the one or more uplink grants for an uplink transmission of a transport block. In an example, the clearing the one or more uplink radio resources (or the one or more uplink grants) may comprise releasing the one or more uplink radio resources (or the one or more uplink grants).

In an example, the releasing an uplink resource (or an uplink grant) may comprise that the wireless device releases a configuration of the uplink resource (or the uplink grant). In an example, the base station may reconfigure (or reschedule) the wireless device with the uplink resource (or the uplink grant) via an explicit message, PDCCH signaling, MAC CE, RRC message etc. to enable the wireless device to use the uplink resource (or the uplink grant) again.

Figure 26:
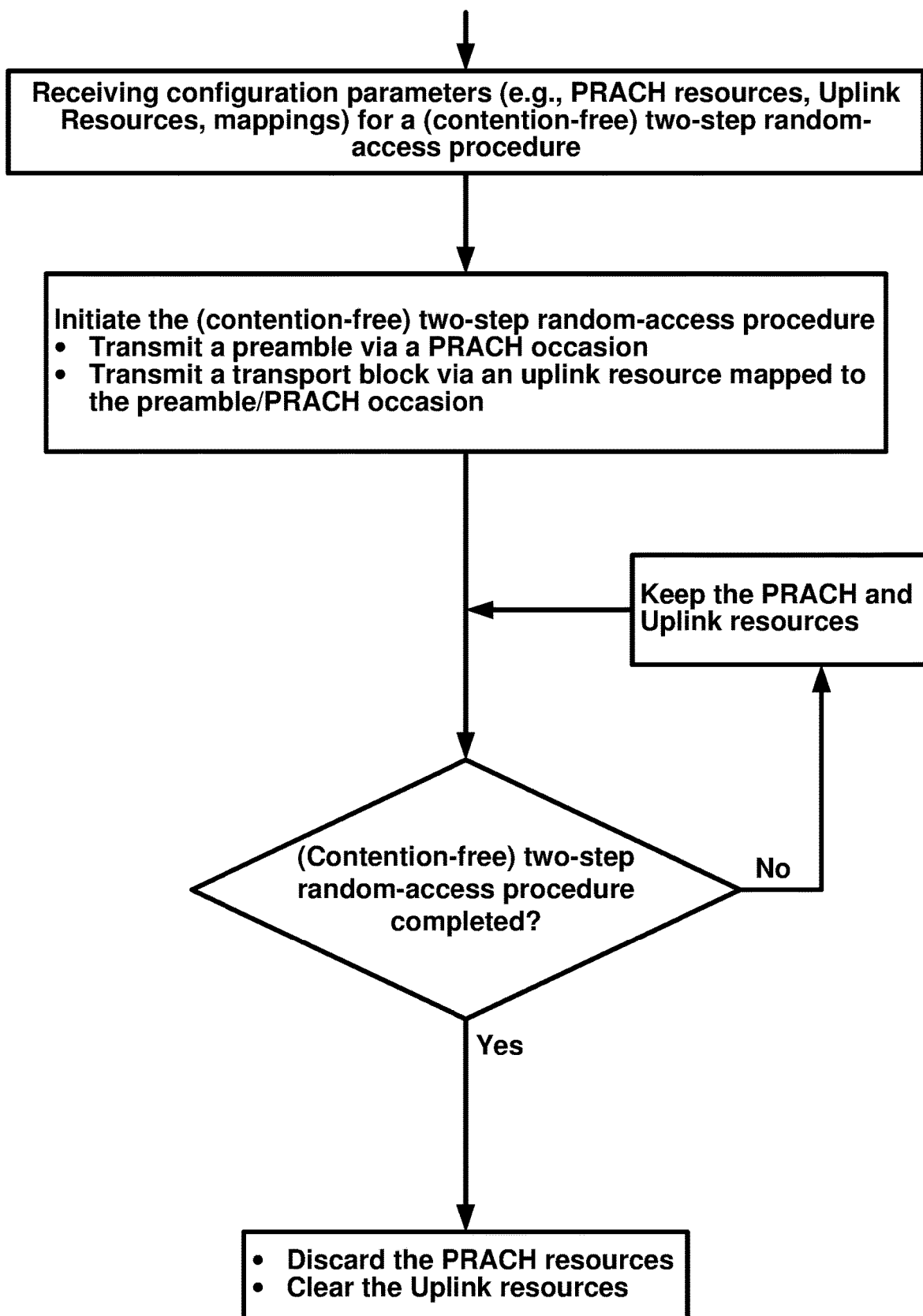
FIG. 26 is an example flowchart of a random-access procedure as per an aspect of an embodiment of the present disclosure.

FIG. 26 shows an example flowchart of a random-access procedure as per an aspect of an embodiment of the present disclosure.

Figure 27:
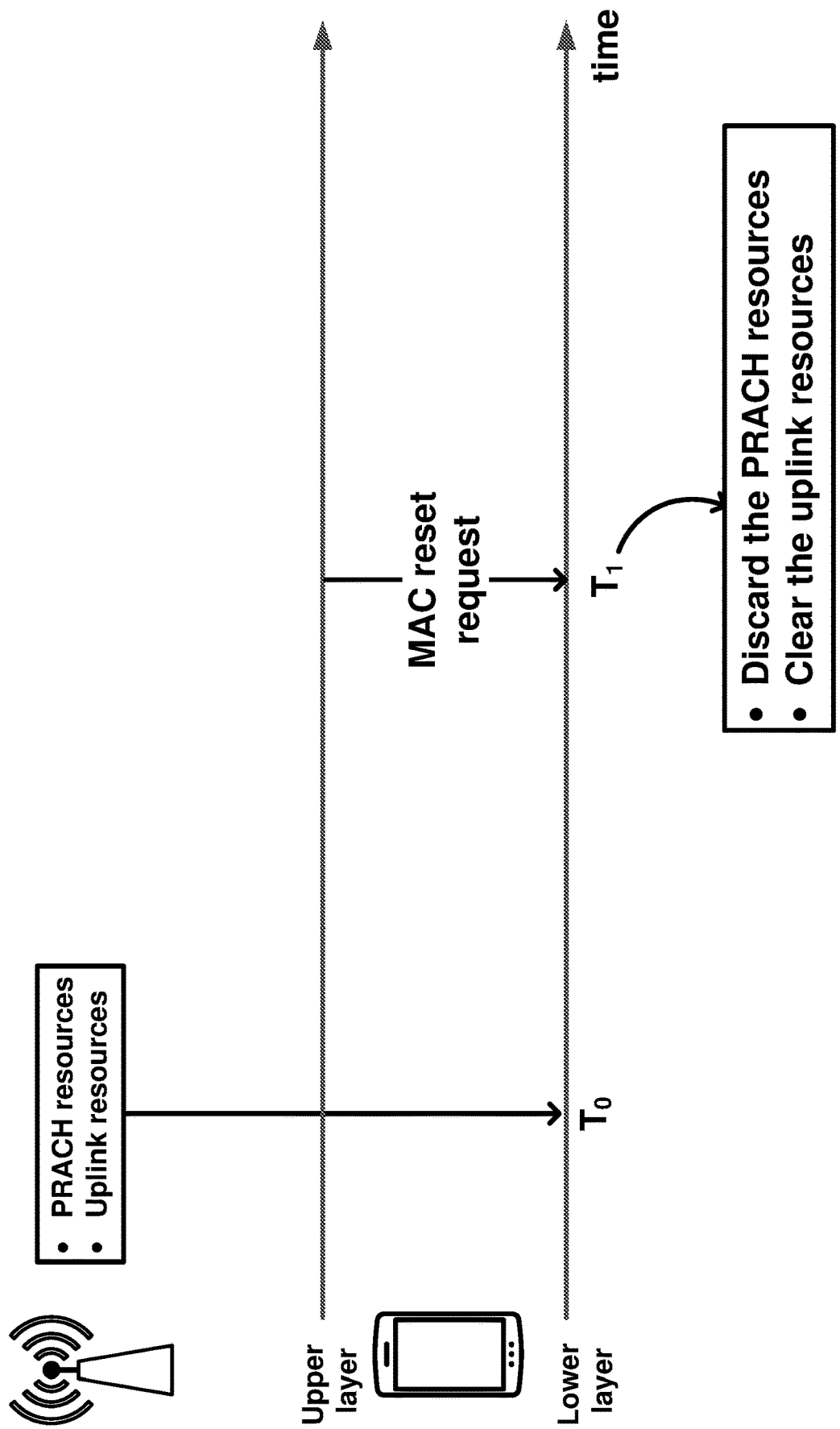
FIG. 27 is an example of a random-access procedure as per an aspect of an embodiment of the present disclosure.

FIG. 27 shows an example of a random-access procedure as per an aspect of an embodiment of the present disclosure.

In an example, the step at time T0 in FIG. 27 is the same as the step at time T0 in FIG. 24. The discussions for the step at time T0 in FIG. 24 apply to the step at time T0 in FIG. 27.

In an example, a wireless device may receive, from a base station, one or more configuration parameters for a two-step random-access (RA) procedure of a cell (e.g., PCell, SCell) at time T0 in FIG. 27. In an example, the one or more configuration parameters may indicate one or more PRACH resources (e.g., PRACH resources in FIG. 27). In an example, the one or more configuration parameters may indicate one or more uplink radio resources (or one or more uplink grants). The one or more uplink radio resources are Uplink resources in FIG. 27.

In an example, a higher (or upper) layer (e.g., RRC, MAC) of the wireless device may request, from a lower layer (e.g., MAC, PHY) of the wireless device, a reset of a MAC entity of the wireless device (e.g., MAC reset request in FIG. 27) at time T1 in FIG. 27.

In an example, the two-step random-access procedure may be a contention-free random-access procedure. In an example, the base station may explicitly (e.g., by a higher layer parameter rach-ConfigDedicated, RRC signaling, BeamFailureRecoveryConfig, SI-SchedulingInfo, DCI, MAC CE, etc) indicate/signal the one or more PRACH resources for the contention-free random-access procedure (e.g., handover, system information request, PDCCH order, beam failure recovery procedure). In an example, the two-step random-access procedure may be a contention-free random-access procedure. In an example, the base station may explicitly indicate/signal the one or more PRACH resources in response to the two-step random-access procedure being the contention-free random-access procedure.

In an example, the two-step random-access procedure may be a contention-free random-access procedure. In an example, the base station may explicitly indicate/signal (e.g., by a PDCCH order) the at least one preamble (e.g., ra-PreambleIndex) for the contention-free random-access procedure. In an example, the base station may explicitly indicate/signal the at least one preamble in response to the two-step random-access procedure being the contention-free random-access procedure.

In an example, when the higher layer (e.g., RRC, MAC) of the wireless device requests, from the lower layer (e.g., MAC, PHY) of the wireless device, the reset of the MAC entity, in response to the base station explicitly indicating/signalling the one or more PRACH resources for the two-step random-access procedure (e.g., the contention-free random-access procedure initiated by e.g., handover, system information request, PDCCH order, beam failure recovery procedure), the wireless device may discard the one or more PRACH resources. In an example, when the wireless device discards the one or more PRACH resources, in response to the one or more associations/mappings between the one or more uplink radio resources (or the one or more uplink grants) and the one or more PRACH resources, the wireless device may clear the one or more uplink radio resources (or clear the one or more uplink grants) at time T1 in FIG. 27.

In an example, in response to the higher layer (e.g., RRC, MAC) of the wireless device requesting, from the lower layer (e.g., MAC, PHY) of the wireless device, the reset of the MAC entity and the base station explicitly indicating/signalling the one or more PRACH resources for the two-step random-access procedure, the wireless device may clear the one or more uplink radio resources (or clear the one or more uplink grants) at time T1 in FIG. 27.

In an example, when the higher layer (e.g., RRC, MAC) of the wireless device requests, from the lower layer (e.g., MAC, PHY) of the wireless device, the reset of the MAC entity, in response to the base station explicitly indicating/signalling the at least one preamble of the PRACH resource for the two-step random-access procedure (e.g., the contention-free random-access procedure initiated by e.g., handover, system information request, PDCCH order, beam failure recovery procedure), the wireless device may discard the PRACH resource. In an example, when the wireless device discards the PRACH resource, in response to the PRACH resource being associated/mapped with the at least one UL radio resource (or the at least one UL grant), the wireless device may clear the at least one UL radio resource (or clear the at least one UL grant) at time T1 in FIG. 27.

In an example, in response to the higher layer (e.g., RRC, MAC) of the wireless device requesting, from the lower layer (e.g., MAC, PHY) of the wireless device, the reset of the MAC entity and the base station explicitly indicating/signalling the at least one preamble of the PRACH resource for the two-step random-access procedure, the wireless device may clear the at least one UL radio resource (or clear the at least one UL grant) at time T1 in FIG. 27.

In an example, the base station may explicitly indicate/signal the one or more uplink radio resources (or the one or more uplink grants) for the contention-free random-access procedure (e.g., handover, system information request, PDCCH order, beam failure recovery procedure). In an example, the base station may explicitly indicate/signal the one or more uplink radio resources (or the one or more uplink grants) in response to the two-step random-access procedure being the contention-free random-access procedure. In an example, for the explicit indication/signaling, the base station may provide the wireless device with the one or more uplink radio resources (or the one or more uplink grants) by an RRC signaling, a DCI or MAC-CE.

In an example, the base station may explicitly indicate/signal the at least one UL radio resource (or the at least one UL grant) for the contention-free random-access procedure (e.g., handover, system information request, PDCCH order, beam failure recovery procedure). In an example, the base station may explicitly indicate/signal the at least one UL radio resource (or the at least one UL grant) in response to the two-step random-access procedure being the contention-free random-access procedure. In an example, for the explicit indication/signaling, the base station may provide the wireless device with the at least one UL radio resource (or the at least one UL grant) by an RRC signaling, a DCI or MAC-CE.

In an example, when the higher layer (e.g., RRC, MAC) of the wireless device requests, from the lower layer (e.g., MAC, PHY) of the wireless device, the reset of the MAC entity, the wireless device may clear the one or more uplink radio resources (or clear the one or more uplink grants) at time T1 in FIG. 27 in response to the base station explicitly indicating/signalling the one or more uplink radio resources (or the one or more uplink grants) for the two-step random-access procedure (e.g., the contention-free random-access procedure initiated by e.g., handover, system information request, PDCCH order, beam failure recovery procedure).

In an example, when the higher layer (e.g., RRC, MAC) of the wireless device requests, from the lower layer (e.g., MAC, PHY) of the wireless device, the reset of the MAC entity, the wireless device may clear the at least one UL radio resource (or the at least one UL grant) at time T1 in FIG. 27 in response to the base station explicitly indicating/signalling the at least one UL radio resource (or the at least one UL grant) for the two-step random-access procedure (e.g., the contention-free random-access procedure initiated by e.g., handover, system information request, PDCCH order, beam failure recovery procedure).

Figure 28:
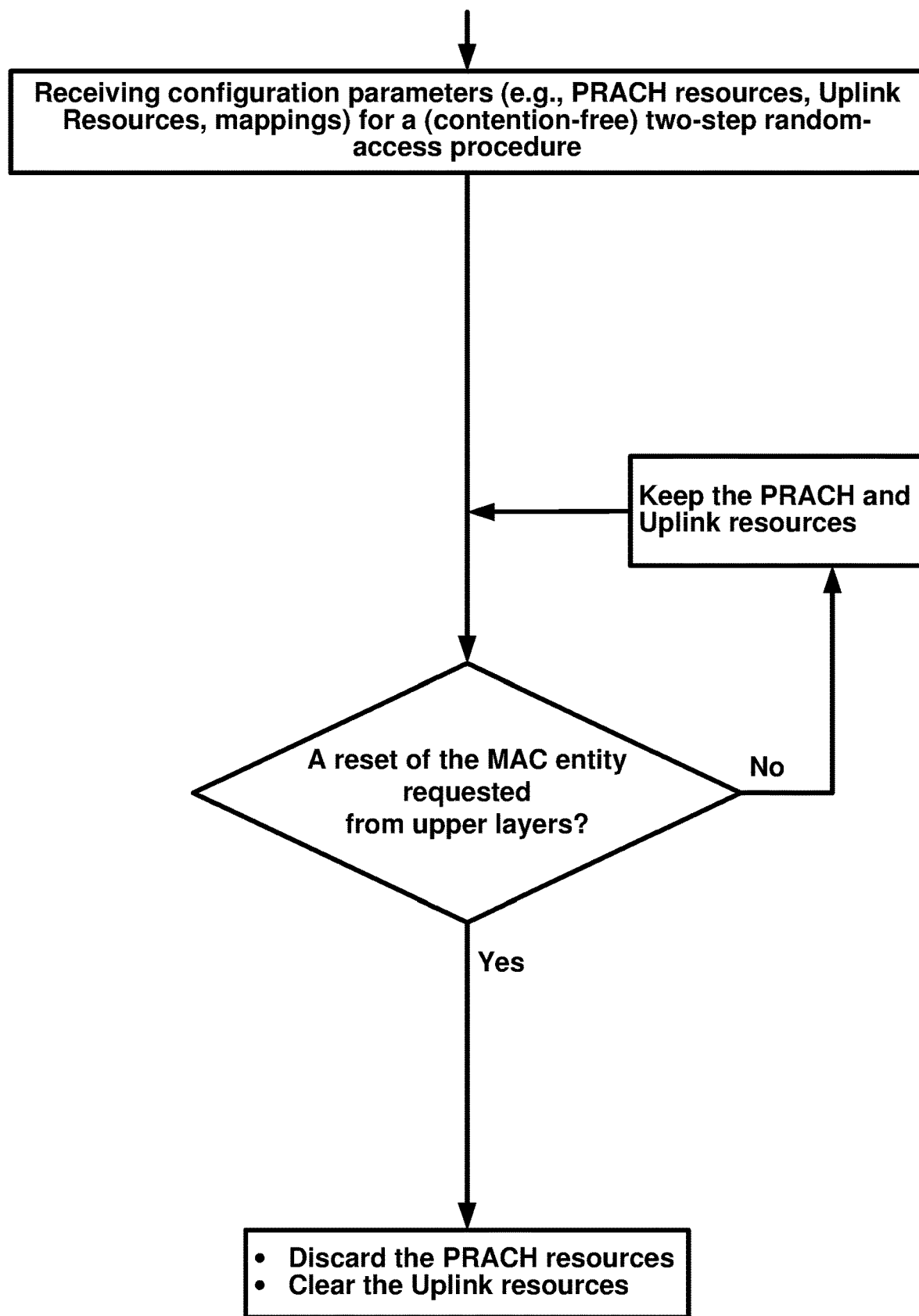
FIG. 28 is an example flowchart of a random-access procedure as per an aspect of an embodiment of the present disclosure.

FIG. 28 shows an example flowchart of a random-access procedure as per an aspect of an embodiment of the present disclosure.

Figure 29:
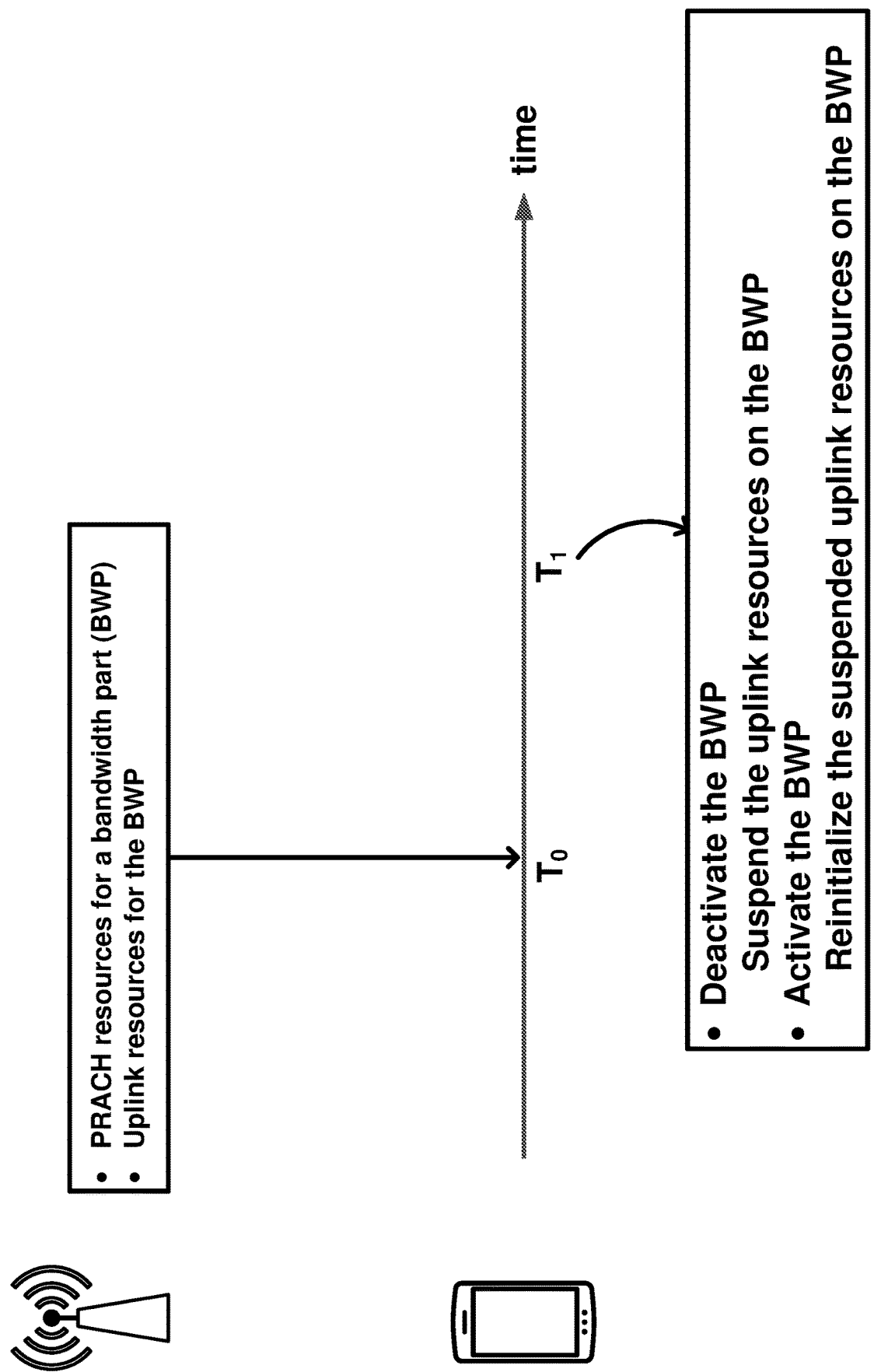
FIG. 29 is an example of a random-access procedure as per an aspect of an embodiment of the present disclosure.

FIG. 29 shows an example of a random-access procedure as per an aspect of an embodiment of the present disclosure.

In an example, a wireless device may receive, from a base station, one or more configuration parameters for a two-step random-access (RA) procedure of a BWP (e.g., UL BWP) of a cell (e.g., PCell, SCell) at time T0 in FIG. 29. In an example, the one or more configuration parameters may indicate one or more PRACH resources (e.g., PRACH resources in FIG. 29). In an example, the one or more configuration parameters may indicate one or more uplink radio resources (or one or more uplink grants) for the BWP of the cell. The one or more uplink radio resources are Uplink resources in FIG. 29.

In an example, the one or more configuration parameters may indicate one or more associations/mappings between the one or more uplink radio resources (or the one or more uplink grants) and the one or more PRACH resources (e.g., the associations/mappings discussed in FIG. 24 and FIG. 25).

In an example, the two-step random-access procedure may be a contention-free random-access procedure. In an example, the base station may explicitly (e.g., RRC signaling, BeamFailureRecoveryConfig, SI-SchedulingInfo, MAC CE, DCI) indicate/signal the one or more PRACH resources for the contention-free random-access procedure (e.g., handover, system information request, PDCCH order, beam failure recovery procedure). In an example, the base station may explicitly indicate/signal the one or more PRACH resources in response to the two-step random-access procedure being the contention-free random-access procedure.

In an example, the BWP may be an active BWP of the cell (e.g., the first downlink BWP as the active downlink BWP of the cell, the second uplink BWP as the active uplink BWP of the cell). In an example, the wireless device may switch from the BWP to a second BWP of the cell. In an example, the switching may be initiated in response to receiving a DCI indicating the second BWP, or receiving an RRC signaling indicating the second BWP, or an expiry of a BWP inactivity timer of the cell, or initiating a random-access procedure. In an example, the switching from the BWP to the second BWP may comprise activating the second BWP of the cell. In an example, the switching from the BWP to the second BWP may comprise deactivating the BWP of the cell. In an example, the switching from the BWP to the second BWP may comprise setting the second BWP as a second active BWP of the cell.

In an example, when the wireless device deactivates the BWP, the wireless device may keep/suspend the one or more PRACH resources on the BWP at time T1 in FIG. 29. In an example, in response to the keeping/suspending, the wireless device may use the one or more PRACH resources (e.g., configured for a beam failure recovery procedure) when the BWP is activated again.

In an example, when the wireless device deactivates the BWP, the wireless device may not discard the one or more PRACH resources on the BWP at time T1 in FIG. 29. In an example, in response to the not discarding, the wireless device may use the one or more PRACH resources (e.g., configured for a beam failure recovery procedure) when the BWP is activated again.

In an example, in response to the deactivating the BWP, the wireless device may suspend the one or more uplink radio resources (or the one or more uplink grants) on the BWP at time T1 in FIG. 29.

In an example, when the wireless device deactivates the BWP and does not discard the one or more PRACH resources on the BWP, in response to the (existing) one or more associations/mappings between the one or more uplink radio resources (or the one or more uplink grants) and the one or more PRACH resources, the wireless device may suspend the one or more uplink radio resources (or the one or more uplink grants) on the BWP at time T1 in FIG. 29.

In an example, in response to the deactivating the BWP, the wireless device may suspend the one or more uplink radio resources (or the one or more uplink grants) on the BWP at time T1 in FIG. 29. In an example, the wireless device may use the one or more PRACH resources for a procedure of the cell (e.g., a beam failure recovery procedure of the cell). In an example, based on the (existing) one or more associations/mappings between the one or more uplink radio resources (or the one or more uplink grants) and the one or more PRACH resources, the wireless device may use the one or more uplink radio resources (or the one or more uplink grants) for the procedure.

In an example, if the wireless device does not suspend the one or more uplink radio resources, the wireless device may not use the one or more uplink radio resources (or the one or more uplink grants) associated/mapped with/to the one or more PRACH resources when the BWP is activated again. In an example, when the wireless device does not suspend the one or more uplink radio resources, the base station may transmit a configuration message, to the wireless device, to reconfigure the one or more uplink radio resources (or the one or more uplink grants) increasing the overhead and signaling messages/exchange.

In an example, the second BWP may be the second active BWP of the cell. In an example, the wireless device may switch from the second BWP to the BWP. In an example, the switching may be initiated in response to receiving a second DCI indicating the BWP, or receiving a second RRC signaling indicating the BWP, or an expiry of a BWP inactivity timer of the cell or initiating a second random-access procedure. In an example, the switching from the second BWP to the BWP may comprise activating the BWP of the cell. In an example, the switching from the second BWP to the BWP may comprise deactivating the second BWP of the cell. In an example, the switching from the second BWP to the BWP may comprise setting the BWP as the active BWP of the cell.

In an example, in response to the activating the BWP, the wireless device may initialize or reinitialize the (suspended) one or more uplink radio resources (or the one or more uplink grants) on the BWP at time T1 in FIG. 29.

In an example, the suspending the one or more uplink radio resources (or the one or more uplink grants) on the BWP may comprise that the wireless device keeps a configuration of the one or more uplink radio resources (or the one or more uplink grants) on the BWP. In an example, the suspending the one or more uplink radio resources (or the one or more uplink grants) on the BWP may comprise that the wireless device is not allowed to use the one or more uplink radio resources (or the one or more uplink grants) on the BWP when the BWP is deactivated. In an example, the wireless device may resume using the one or more uplink radio resources (or the one or more uplink grants) on the BWP in response to the BWP being activated (e.g., being the active BWP of the cell).

In an example, a wireless device may trigger a scheduling request (SR) for requesting UL-SCH resource when the wireless device has a new uplink transmission. In an example, a base station may transmit, to the wireless device, at least one message comprising parameters indicating zero, one or more SR configurations. An SR configuration may comprise a set of PUCCH resources for an SR transmission on one or more BWPs and/or on one or more cells. An SR configuration may correspond to one or more logical channels. A logical channel may be mapped to zero or one SR configuration configured by the at least one message. An SR configuration of a logical channel (LCH) that triggers a buffer status report (BSR) may be considered as a corresponding SR configuration for a triggered SR.

In an example, for an SR configuration, the at least one message may further comprise one or more parameters indicating at least one of: a SR prohibit timer; a maximum number of SR transmission (e.g., sr-TransMax); a parameter indicating a periodicity and offset of an SR transmission; and/or PUCCH resources. In an example, the SR prohibit timer may be a duration during which the wireless device may be not allowed to transmit the SR. In an example, the maximum number of SR transmission may be a transmission number for which the wireless device may be allowed to transmit the SR at most.

In an example, a wireless device may maintain a SR transmission counter (e.g., SR_COUNTER) associated with an SR configuration.

In an example, if an SR of an SR configuration is triggered, and there are no other SRs pending corresponding to the (same) SR configuration, a wireless device may set the SR_COUNTER of the SR configuration to a first value (e.g., 0).

In an example, if there is at least one valid PUCCH resource for the (pending) SR, a wireless device may determine an SR transmission occasion on the at least one valid PUCCH resource of the PUCCH resources. In an example, if the at least one valid PUCCH resource for the SR transmission occasion does not overlap with a measurement gap; and if the at least one valid PUCCH resource for the SR transmission occasion does not overlap with an uplink shared channel (UL-SCH) resource; if the SR_COUNTER is less than the maximum number of SR transmission, the wireless device may increment the SR_COUNTER (e.g., by one), instruct the physical layer of the wireless device to signal the SR on the at least one valid PUCCH resource for the SR. The physical layer of the wireless device may transmit a PUCCH on the at least one valid PUCCH resource for the SR. The wireless device may monitor a PDCCH for detecting a DCI for uplink grant in response to transmitting the PUCCH.

In an example, if a wireless device receives one or more uplink grants which may accommodate all pending data available for transmission, the wireless device may cancel the pending SR.

In an example, if the wireless device may not receive one or more uplink grants which may accommodate all pending data available for the new uplink transmission, the wireless device may repeat one or more actions comprising: determining at least one valid PUCCH resource; checking whether the SR prohibit timer is running; whether the SR_COUNTER is equal or greater than the maximum number of SR transmission; incrementing the SR_COUNTER, transmitting the SR and starting the SR prohibit timer; monitoring a PDCCH for one or more uplink grants.

In an example, the SR_COUNTER may indicate a number being equal to or greater than the maximum number of SR transmission.

In response to the SR_COUNTER indicating the number being equal to or greater than the maximum number of SR transmission, the wireless device may clear one or more configured uplink grants (e.g., configured grant Type 1, configured grant Type 2).

In response to the SR_COUNTER indicating the number being equal to or greater than the maximum number of SR transmission, the wireless device may clear the one or more uplink grants. In an example, the base station may configure the one or more uplink grants for the two-step random-access procedure.

In an example, the one or more uplink radio resources (or the one or more uplink grants) may be specific/dedicated to the wireless device. In an example, the one or more uplink radio resources (or the one or more uplink grants) being specific/dedicated to the wireless device may comprise that the one or more uplink radio resources (or the one or more uplink grants) are not shared by another wireless device (different than the wireless device). In an example, the wireless device may use the one or more uplink resources for a two-step random-access procedure.

In an example, in response to the SR_COUNTER indicating the number being equal to or greater than the maximum number of SR transmission, the wireless device may not clear the one or more uplink grants.

In an example, in response to the SR_COUNTER indicating the number being equal to or greater than the maximum number of SR transmission, the wireless device may initiate a second random access procedure on a second cell (e.g., SpCell), and/or cancel the pending SR.

In an example, if the wireless device clears the one or more uplink grants in response to the SR_COUNTER indicating the number being equal to or greater than the maximum number of SR transmission, the wireless device may not use the one or more uplink radio resources (or the one or more uplink grants) for the second random-access procedure. In an example, the wireless device may not initiate a two-step random-access procedure in response to the clearing the one or more uplink radio resources (or the one or more uplink grants). In an example, the second random-access procedure may not be a two-step random-access procedure. This may result in a latency to acquire an uplink grant. This may introduce a delay. In an example, the second random-access procedure may be a four-step random-access procedure, which may have a longer duration than a two-step random-access procedure.

In an example, a wireless device may receive, e.g., from a base station, configuration parameters of one or more cells. The configuration parameters may indicate periodic uplink PUSCH resources for a bundle of a configured uplink grant for a cell. The bundle of the configured uplink grant may be for an ultra-reliable and low latency communication (uRLLC) service, a V2X service, an IoT service, and/or the like. For example, when the wireless device has a transport block (TB) for an uRLLC service, the wireless device may transmit the TB via an uplink resource (of an uplink grant) of the periodic uplink resources of the bundle of the configured uplink grant. In an example, based on the configured uplink grant being for the uRLLC service, the configured uplink grant may be mapped to a logical channel with a high logical channel priority. Based on the configured uplink grant being mapped to the logical channel with the high logical channel priority, a transmission of the TB for an uRLLC service via the uplink resource may have a higher priority. For example, the wireless device may transmit the TB with the higher priority when the uplink resource to transmit the TB overlaps with another uplink resource of another uplink transmission with a lower priority. Configured grants provide periodic resources to the wireless device when the wireless device is in connected mode and its uplink signals are time aligned. In an example, configured grants may not be suitable when the wireless device is not time aligned and/or when traffic pattern is not suitable for transmission via configured grant resources.

In an example, the wireless device may receive, e.g., from a base station, configuration parameters indicate PUSCH resources for transmission of msgA payloads for two-step random-access procedures. For example, when the wireless device initiates a two-step random-access procedure, the wireless device may select/determine a PUSCH resource, among the PUSCH resources, to transmit msgA payload of the two-step random-access procedure. PUSCH resources for transmission of msgA payloads may be used for transmission of one or more packets of an ultra-reliable and low latency communication (uRLLC) service, a V2X service, an IoT service, and/or the like. msgA payloads are transmitted with a preamble and can be transmitted even when the UE is not time aligned. In an example, PUSCH resources for transmission of msgA payloads may not be suitable when the wireless device is time aligned and/or when traffic pattern is not suitable for transmission via msgA payload.

In an example embodiment, a base station may provide an enhanced configuration for a UE, in which the periodic uplink resources of the configured uplink grant and the PUSCH resources of the two-step random-access procedure are configured on the same cell. This enhanced configuration provides additional resources to the wireless device and the base station to transmit short and/or periodic packets depending on traffic type, radio link quality, and/or time alignment. In an example embodiment, configuration parameters may indicate periodic uplink PUSCH resources for the bundle of a configured uplink grant and PUSCH resources for transmission of msgA payloads for two-step random-access procedures on the same cell. This configuration may increase signaling overhead; however, it enhances uplink transmission opportunities and/or reduces transmission delay.

In an example, the base station may configure the periodic uplink resources of the configured uplink grant and the PUSCH resources of the two-step random-access procedure such that they do not overlap in time. This may limit flexibility in configuring both a bundle of configured uplink grant and the PUSCH resources of the two-step random-access procedure for the same cell in order to simplify UE processes for uplink transmissions. However, configuring non-overlapping resources may increase the waiting time (or transmission delay) of the wireless device to transmit for the configured uplink grant and/or the two-step random-access procedure. Configuring non-overlapping resources may also reduce uplink spectral efficiency (e.g. more resources are dedicated to configured grant and msgA payload).

In an example embodiment, a base station may provide an enhanced configuration for a UE, in which overlapping radio resources are configured for the periodic uplink resources of the configured uplink grant and the PUSCH resources of the two-step random-access procedure on the same cell. This enhanced configuration may reduce transmission delay and increase spectral efficiency, since the base station has more flexibility on how to configure these resources.

In an example, the base station may configure overlapping resources for a bundle of configured uplink grant and the PUSCH resources of the two-step random-access procedure for the same cell. In an example, the wireless device may have a TB to transmit for an uRLLC service via a first PUSCH resource of the periodic uplink resources of the configured uplink grant. During the same time period, the wireless device may initiate a two-step random-access procedure. The wireless device may select a PUSCH resource, among the PUSCH resources, for transmission of a msgA payload of the two-step random-access procedure. The PUSCH resource may overlap in time (e.g., at least one symbol) with the first PUSCH resource of the configured uplink grant. Transmission of two signals via overlapping radio resources of a cell may require additional transmit power amplifier and transceiver management capability (e.g. including multiple parallel transceiver modules) and may increase uplink interference. In an example, transmitting the TB for the configured uplink grant in parallel with transmission or without transmission of msgA payload may result uplink timing misalignment, increased interference to other wireless devices and/or cells. This may degrade the performance of other wireless devices. There is a need to implement an enhanced procedure when an uplink resource of the configured uplink grant overlaps in time with a PUSCH resource of a msgA payload transmission of the two-step random-access procedure. Example embodiments provides an enhanced mechanism for uplink transmission when transmission of msgA payload via the PUSCH resource and transmission of the TB via the uplink grant of the configured uplink grant overlap in time.

In an example embodiment, the wireless device may determine that a PUSCH duration of a configured uplink grant overlaps with a transmission of a MsgA payload via the first PUSCH resource of the same cell. Based on the determining, the wireless device may ignore the configured uplink grant by not transmitting via a PUSCH resource of the configured uplink grant. The wireless device may prioritize the transmission of the msgA payload when an uplink resource an uplink grant of a bundle of the configured uplink grant overlaps in time with a PUSCH resource of the msgA payload transmission of the two-step random-access procedure. This enhanced mechanism may result in dropping transmission of a TB via an uplink grant of the configured uplink grant; however, it increases uplink transmission efficiency as described in the specification.

In an example, transmission of msgA payload may enable the wireless device to obtain uplink timing adjustment from the base station while transmitting an uplink packet. In an example implementation, the wireless device may obtain, via the two-step random-access procedure, a TA value enabling the wireless device to be uplink synchronized with the base station. Based on being uplink synchronized, the wireless device may transmit, via the next non-overlapping PUSCH resource of the configured uplink grant, the TB for the configured uplink grant with an accurate timing advance without incurring interference to other cells and/or wireless devices. This may improve the performance of cellular systems (decreased uplink interference, increased successful reception of uplink transmissions, decreased uplink retransmissions, decreased power consumption due to decreased retransmissions, etc).

Figure 30:
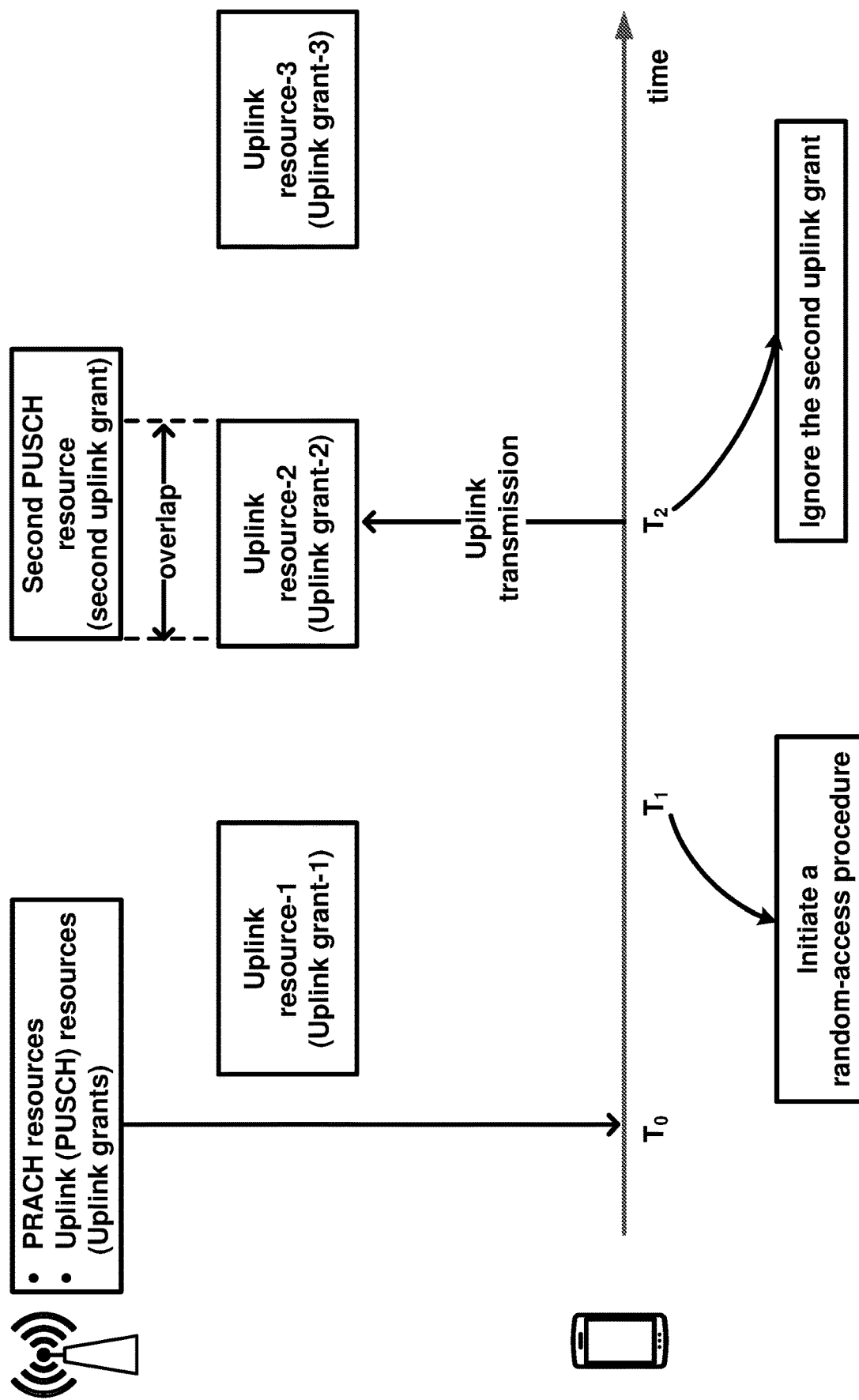
FIG. 30 is an example of a random-access procedure as per an aspect of an embodiment of the present disclosure.
Figure 31:
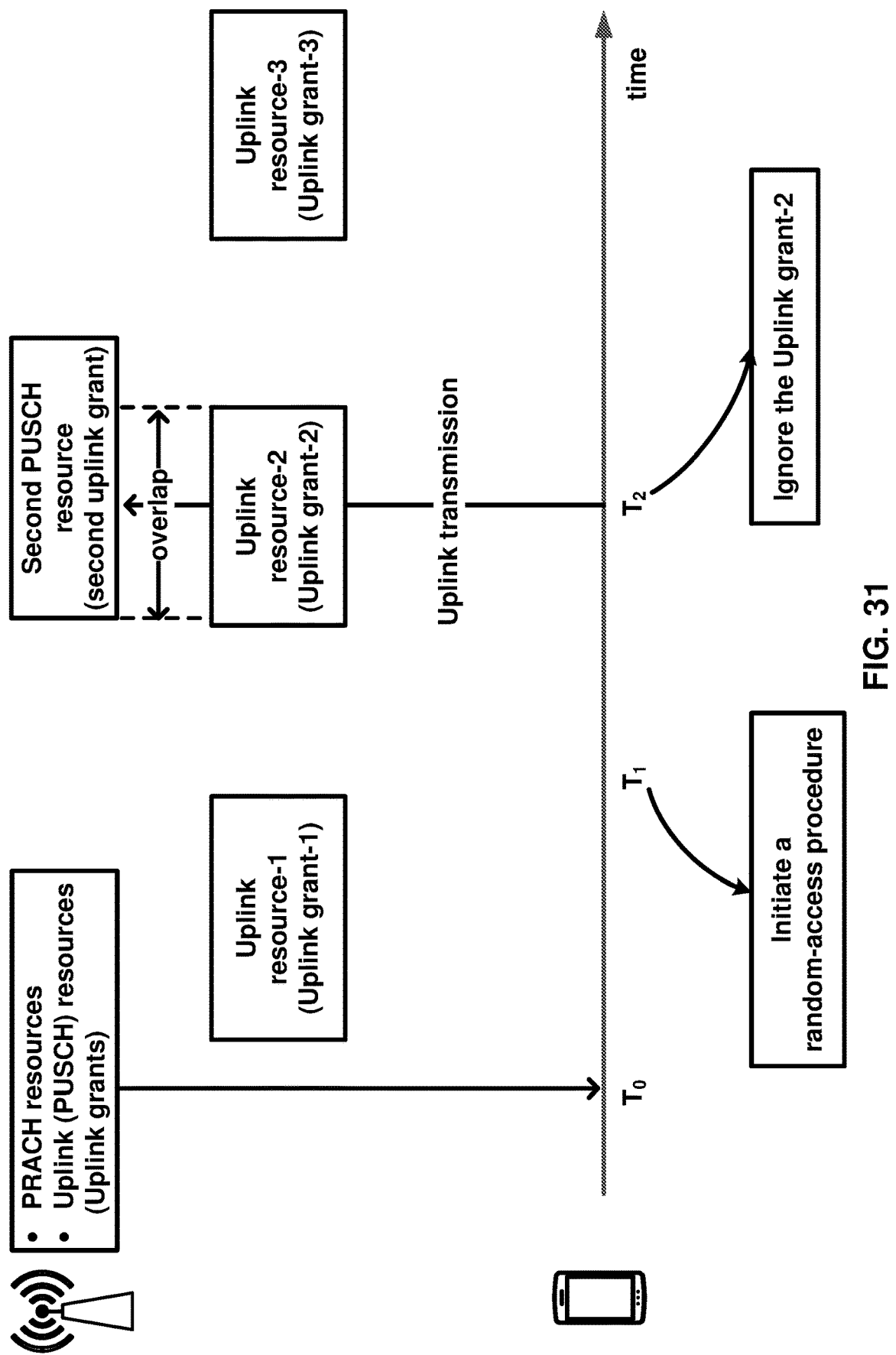
FIG. 31 is an example of a random-access procedure as per an aspect of an embodiment of the present disclosure.
Figure 32:
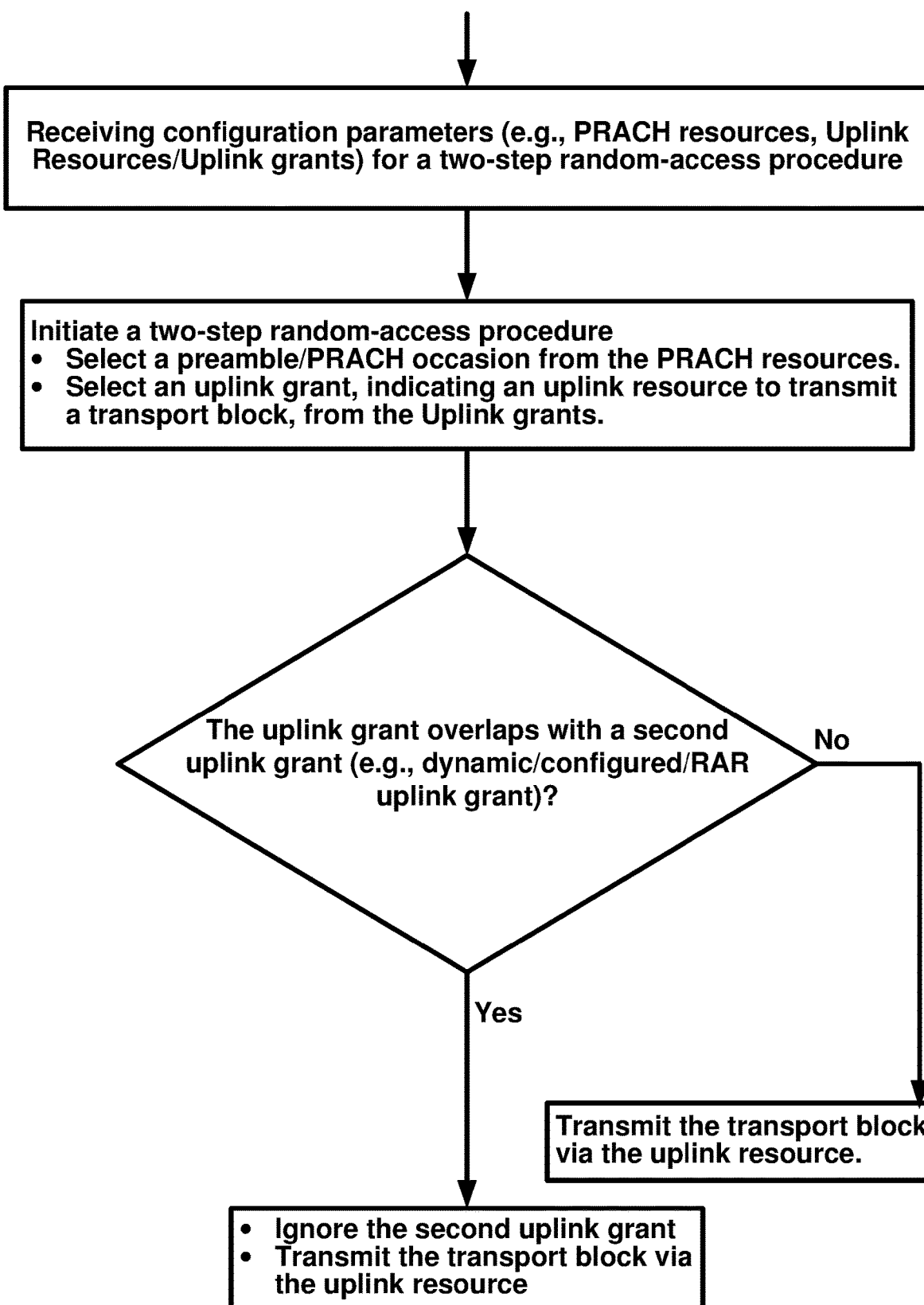
FIG. 32 is an example flowchart of a random-access procedure as per an aspect of an embodiment of the present disclosure.
Figure 33:
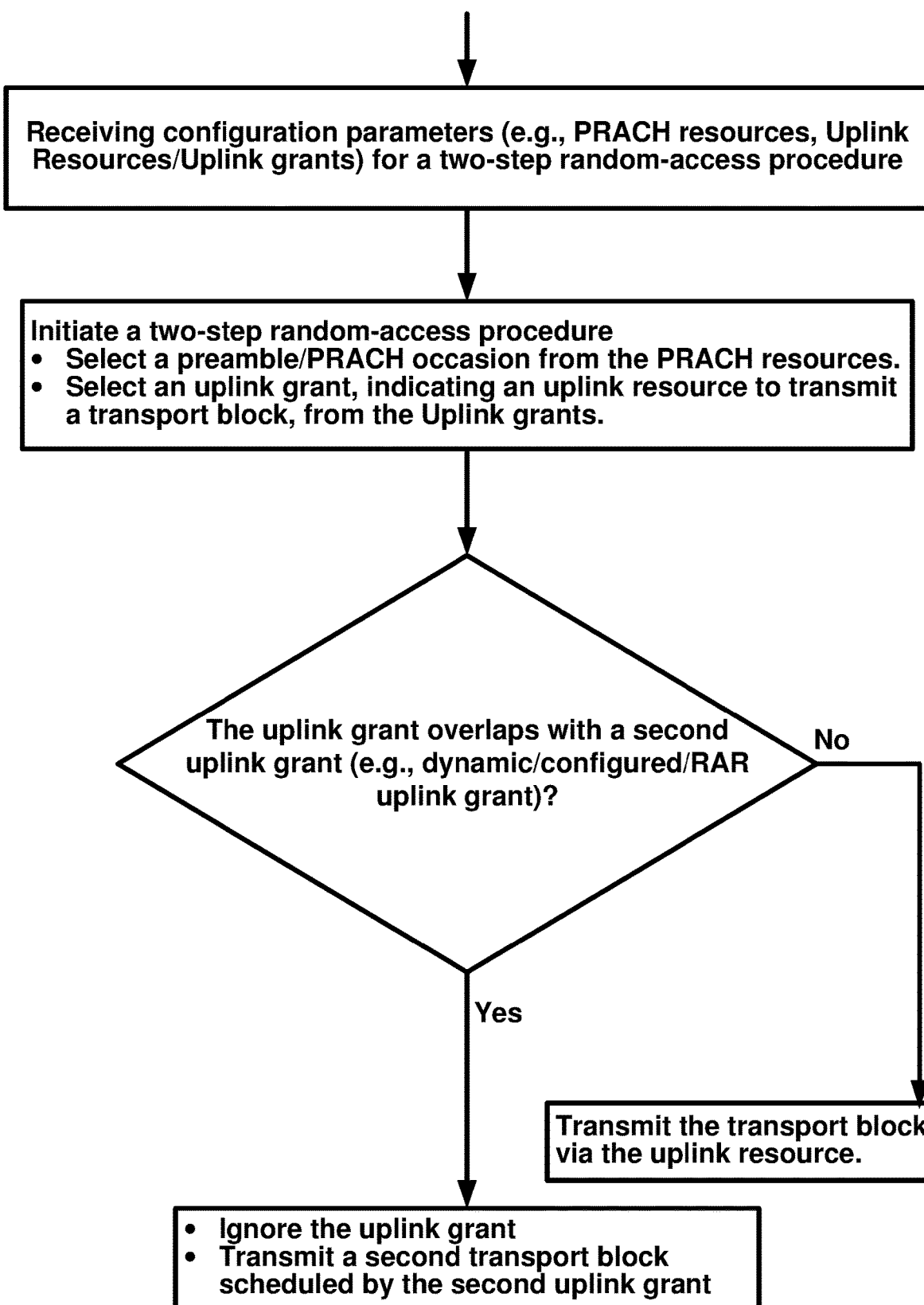
FIG. 33 is an example flowchart of a random-access procedure as per an aspect of an embodiment of the present disclosure.

FIG. 30 and FIG. 31 show examples of a random-access procedure as per an aspect of an embodiment of the present disclosure. FIG. 32 and FIG. 33 show example flowcharts of a random-access procedure disclosed in FIG. 30 and FIG. 31, respectively.

In an example, the steps at time T0 and T1 in FIG. 30 and in FIG. 31 are the same as the steps at time T0 and T1 in FIG. 24. The discussions for the steps at time T0 and T1 in FIG. 24 apply to the steps at time T0 and T1 in FIG. 30 and in FIG. 31.

In an example, a wireless device may receive, from a base station, one or more configuration parameters for a two-step random-access (RA) procedure of a cell (e.g., PCell, SCell) at time T0 in FIG. 30 and in FIG. 31. In an example, the one or more configuration parameters may indicate one or more PRACH resources (e.g., PRACH resources in FIG. 30 and in FIG. 31).

In an example, the one or more configuration parameters may indicate one or more uplink radio resources (Uplink (PUSCH) resources in FIG. 30 and in FIG. 31). For example, in FIG. 30 and in FIG. 31, the one or more uplink radio resources are Uplink resource-1, Uplink resource-2, and Uplink resource-3. In an example, an uplink radio resource of the one or more uplink radio resources may indicate at least one frequency resource/occasion.

In an example, the one or more configuration parameters may indicate one or more uplink grants (Uplink grants in FIG. 30 and in FIG. 31). For example, in FIG. 30 and in FIG. 31, the one or more uplink grants are Uplink grant-1, Uplink grant-2, and Uplink grant-3. The one or more uplink grants may indicate the one or more uplink radio resources. In an example, the one or more uplink grants indicating the one or more uplink radio resources may comprise that an uplink grant of the one or more uplink grants may indicate at least one time resource/occasion of the one or more uplink radio resources. In an example, the one or more uplink grants indicating the one or more uplink radio resources may comprise that an uplink grant of the one or more uplink grants may indicate at least one frequency resource/occasion of the one or more uplink radio resources. In an example, in FIG. 30 and in FIG. 31, Uplink grant-n may indicate Uplink resource-n, n=1, 2, 3.

In an example, the one or more configuration parameters may indicate one or more associations/mappings between the one or more uplink radio resources (or the one or more uplink grants) and the one or more PRACH resources (e.g., the associations/mappings discussed in FIG. 24 and FIG. 25).

In an example, the wireless device may initiate a two-step random-access procedure (e.g., contention-free random-access procedure, contention-based random-access procedure) for the cell at time T1 in FIG. 30 and in FIG. 31.

In an example, the wireless device may perform a first random-access resource selection in response to the initiating the two-step random-access procedure. In an example, the wireless device may select a random-access channel (PRACH) resource of the one or more PRACH resources for the first random-access selection. In an example, the PRACH resource may comprise at least one preamble. In an example, the PRACH resource may comprise at least one PRACH occasion (e.g., time resource/occasion, frequency resource/occasion, code).

In an example, when the wireless device performs the first random-access resource selection for the two-step random-access procedure, based on the one or more associations/mappings (e.g., in FIG. 25), the wireless device may determine/select at least one UL radio resource of the one or more uplink radio resources (or determine/select at least one UL grant of the one or more uplink grants) for an uplink transmission of a transport block (e.g., Msg3, PUSCH). In an example, the PRACH resource may be (e.g., one-to-one, one-to-multi, multi-to-one) associated/mapped with the at least one UL radio resource (or the at least one UL grant). In an example, the at least one UL grant may indicate the at least one UL radio resource. In an example, the at least one UL radio resource may comprise at least one time resource/occasion and/or at least one frequency resource/occasion. In an example, the PRACH resource being associated/mapped with the at least one UL radio resource (or the at least one UL grant) may comprise the at least one preamble of the PRACH resource being associated/mapped with the at least one UL radio resource (or the at least one UL grant). In an example, the PRACH resource being associated/mapped with the at least one UL radio resource (or the at least one UL grant) may comprise the at least one PRACH occasion of the PRACH resource being associated/mapped with the at least one UL radio resource (or the at least one UL grant).

In an example, when the wireless device determines/selects, for the two-step random-access procedure, the at least one UL grant (e.g., Uplink grant-2 in FIG. 30 and FIG. 31) indicating the at least one UL radio resource (e.g., Uplink resource-2 in FIG. 30 and FIG. 31), the wireless device may determine that the at least one UL radio resource of the at least one UL grant overlaps with a second UL radio resource (e.g., second PUSCH resource in FIG. 30 and FIG. 31) of a second UL grant (e.g., second uplink grant in FIG. 30 and in FIG. 31). In an example, the overlapping may be in time (e.g., at least one symbol, at least one slot, at least one subframe). In an example, the at least one UL radio resource may be a first PUSCH resource.

In an example, the second UL radio resource may not overlap in time with the at least one PRACH occasion of the PRACH resource. In an example, the second UL radio resource may not overlap with the at least one PRACH occasion of the PRACH resource in at least one symbol (e.g., OFDM symbol). In an example, the second UL radio resource may not overlap with the at least one PRACH occasion of the PRACH resource in at least one slot. In an example, the second UL radio resource may not overlap with the at least one PRACH occasion of the PRACH resource in at least one subframe.

In an example, when the wireless device determines/selects the at least one UL grant (e.g., Uplink grant-2 in FIG. 30 and FIG. 31) indicating the at least one UL radio resource (e.g., Uplink resource-2 in FIG. 30 and FIG. 31), the wireless device may determine that a first duration of the at least one UL radio resource overlaps with a second duration of a second UL radio resource (e.g., second PUSCH resource in FIG. 30 and in FIG. 31) of a second UL grant (e.g., second uplink grant in FIG. 30 and in FIG. 31). In an example, the overlapping (e.g., overlap in FIG. 30 and in FIG. 31) may be in time (e.g., at least one symbol, at least one slot, at least one subframe). In an example, the at least one UL radio resource may be a first PUSCH resource.

In an example, the wireless device may receive the second UL grant on at least one PDCCH for the cell. In an example, the second UL grant may be a dynamic UL grant.

In an example, the wireless device may receive the second UL grant in a random-access response for the cell.

In an example, the second UL grant may be a configured uplink grant (e.g., configured grant Type 1, configured grant Type 2) for the cell. In an example, the second UL grant may be a part of a bundle of a configured uplink grant (e.g., configured grant Type 1, configured grant Type 2) for the cell.

In an example, the second UL grant may schedule a second uplink transmission of a second transport block on the second UL radio resource.

In an example, in response to the determining the at least one UL radio resource of the at least one UL grant overlapping with the second UL radio resource of the second UL grant, the wireless device may ignore the second UL grant (e.g., Second uplink grant in FIG. 30) at time T2 in FIG. 30.

In an example, in response to the determining the first duration of the at least one UL radio resource overlapping with the second duration of the second UL radio resource of the second UL grant, the wireless device may ignore the second UL grant (e.g., Second uplink grant in FIG. 30) at time T2 in FIG. 30.

In an example, the ignoring the second UL grant may comprise not transmitting the second transport block via the second UL radio resource indicated by the second UL grant. In an example, the ignoring the second UL grant may comprise dropping the second transmission of the second transport block. In an example, the ignoring the second UL grant may comprise transmitting, via the at least one UL radio resource (e.g., Uplink resource-2 in FIG. 30) indicated by the at least one UL grant, the transport block for the two-step random-access procedure.

In an example, in response to the determining the at least one UL radio resource of the at least one UL grant overlapping with the second UL radio resource of the second UL grant, the wireless device may ignore the at least one UL grant (e.g., Uplink grant-2 in FIG. 31) at time T2 in FIG. 31.

In an example, in response to the determining the first duration of the at least one UL radio resource overlapping with the second duration of the second UL radio resource of the second UL grant, the wireless device may ignore the at least one UL grant (e.g., Uplink grant-2 in FIG. 31) at time T2 in FIG. 31.

In an example, the ignoring the at least one UL grant may comprise transmitting, via the second UL radio resource (e.g., second PUSCH resource in FIG. 31) indicated by the second UL grant, the second transport block for the second uplink transmission. In an example, the ignoring the at least one UL grant may comprise not transmitting, via the at least one UL radio resource (e.g., Uplink resource-2 in FIG. 31) indicated by the at least one UL grant, the transport block for the two-step random-access procedure. In an example, the ignoring the at least one UL grant may comprise dropping the uplink transmission of the transport block.

In an example, the second UL grant may accommodate the second transport block for the second uplink transmission and the transport block for the uplink transmission of the two-step random-access procedure. In an example, when the wireless device ignores the at least one UL grant, the wireless device may transmit, via the second UL radio resource indicated by the second UL grant, the second transport block and the transport block in response to the second UL grant accommodating the second transport block and the transport block.

In an example, in response to the determining the at least one UL radio resource (e.g., Uplink resource-2 in FIG. 30) of the at least one UL grant (e.g., Uplink grant-2 in FIG. 30) overlapping with the second UL radio resource (e.g., second PUSCH resource in FIG. 30) of the second UL grant (e.g., second uplink grant in FIG. 30), the wireless device may override the second UL grant with the at least one UL grant at time T2 in FIG. 30.

In an example, in response to the determining the first duration of the at least one UL radio resource (e.g., Uplink resource-2 in FIG. 30) overlapping with the second duration of the second UL radio resource (e.g., second PUSCH resource in FIG. 30) of the second UL grant, the wireless device may override the second UL grant with the at least one UL grant at time T2 in FIG. 30.

In an example, the overriding the second UL grant with the at least one UL grant may comprise not transmitting, via the second UL radio resource (e.g., second PUSCH resource in FIG. 30) indicated by the second UL grant, the second transport block for the second uplink transmission. In an example, the overriding the second UL grant with the at least one UL grant may comprise dropping the second transmission of the second transport block. In an example, the overriding the second UL grant with the at least one UL grant may comprise transmitting, via the at least one UL radio resource (e.g., Uplink resource-2 in FIG. 30) indicated by the at least one UL grant, the transport block for the two-step random-access procedure.

In an example, in response to the determining the at least one UL radio resource (e.g., Uplink resource-2 in FIG. 31) of the at least one UL grant (e.g., Uplink grant-2 in FIG. 31) overlapping with the second UL radio resource (e.g., second PUSCH resource in FIG. 31) of the second UL grant (e.g., second uplink grant in FIG. 31), the wireless device may override the at least one UL grant with the second UL grant at time T2 in FIG. 31.

In an example, in response to the determining the first duration of the at least one UL radio resource (e.g., Uplink resource-2 in FIG. 31) overlapping with the second duration of the second UL radio resource (e.g., second PUSCH resource in FIG. 31) of the second UL grant (e.g., second uplink grant in FIG. 31), the wireless device may override the at least one UL grant with the second UL grant at time T2 in FIG. 31.

In an example, the overriding the at least one UL grant with the second UL grant may comprise transmitting, via the second UL radio resource indicated by the second UL grant, the second transport block for the second uplink transmission. In an example, the overriding the at least one UL grant with the second UL grant may comprise not transmitting, via the at least one UL radio resource indicated by the at least one UL grant, the transport block for the two-step random-access procedure. In an example, the overriding the at least one UL grant with the second UL grant may comprise dropping the uplink transmission of the transport block.

In an example, the second UL grant may accommodate the second transport block for the second uplink transmission and the transport block for the uplink transmission of the two-step random-access procedure. In an example, when the wireless device overrides the at least one UL grant with the second UL grant, the wireless device may transmit, via the second UL radio resource indicated by the second UL grant, the second transport block and the transport block in response to the second UL grant accommodating the second transport block and the transport block.

In an example, the wireless device may receive the second UL grant in a DCI. The DCI may be with CRC scrambled with a RNTI (e.g., RA-RNTI, C-RNTI or CS-RNTI) of the wireless device. In an example, when the at least one UL radio resource of the at least one UL grant overlaps with the second UL radio resource of the second UL grant, the wireless device may be required to transmit the at least one UL radio resource indicated by the at least one UL grant and the second UL radio resource indicated by the second UL grant concurrently on the cell (e.g., SpCell).

In an example, when the wireless device may not transmit the at least one UL radio resource indicated by the at least one UL grant and the second UL radio resource indicated by the second UL grant concurrently on the cell, the wireless device may continue with the second UL grant for the RNTI of the wireless device at time T2 in FIG. 31.

In an example, the continuing with the second UL grant for the RNTI may comprise transmitting, via the second UL radio resource indicated by the second UL grant, the second transport block for the second uplink transmission. In an example, the continuing with the second UL grant for the RNTI may comprise not transmitting, via the at least one UL radio resource indicated by the at least one UL grant, the transport block for the two-step random-access procedure. In an example, the continuing with the second UL grant for the RNTI may comprise dropping the uplink transmission of the transport block.

In an example, the second UL grant may accommodate the second transport block for the second uplink transmission and the transport block for the uplink transmission of the two-step random-access procedure. In an example, when the wireless device continues with the second UL grant for the RNTI, the wireless device may transmit, via the second UL radio resource indicated by the second UL grant, the second transport block and the transport block in response to the second UL grant accommodating the second transport block and the transport block.

In an example, when the wireless device may not transmit the at least one UL radio resource indicated by the at least one UL grant and the second UL radio resource indicated by the second UL grant concurrently on the cell, the wireless device may continue with the at least one UL grant at time T2 in FIG. 30.

In an example, the continuing with the at least one UL grant may comprise not transmitting, via the second UL radio resource indicated by the second UL grant, the second transport block for the second uplink transmission. In an example, the continuing with the at least one UL grant may comprise dropping the second uplink transmission of the second transport block. In an example, the continuing with the at least one UL grant may comprise transmitting, via the at least one UL radio resource indicated by the at least one UL grant, the transport block for the two-step random-access procedure.

In an example, when the at least one UL radio resource of the at least one UL grant overlaps with the second UL radio resource of the second UL grant, the wireless device may ignore the second UL grant. In an example, the wireless device may be uplink unsynchronized. In an example, the wireless device may initiate the two-step random-access procedure to be uplink synchronized. In an example, the wireless device may obtain a timing advance value (required for uplink synchronization) in the two-step random-access procedure. In an example, the obtaining the timing advance value may have a higher priority than the second uplink transmission for the second transport block via the second UL radio resource. In an example, the second uplink transmission for the second transport block may be for a data transmission. In response to the transmitting the second transport block when the wireless device is uplink unsynchronized, the decoding performance may deteriorate. In an example, transmitting the second transport block when the wireless device is uplink unsynchronized may result in inter-symbol interference or inter-user interference. In an example, ignoring the second UL grant and transmitting the transport block via the at least one UL radio resource for the two-step random-access procedure to obtain the timing-advance value may improve the performance.

In an example, when the at least one UL radio resource of the at least one UL grant overlaps with the second UL radio resource of the second UL grant, the wireless device may ignore the at least one UL grant. In an example, the wireless device may initiate the two-step random-access procedure to be uplink synchronized. In an example, the wireless device may obtain a timing advance value in the two-step random-access procedure. In an example, the wireless device may operate in a small-cell. In response to the operating in the small-cell, the obtaining the timing advance value may have a less priority than the second uplink transmission for the second transport block via the second UL radio resource. In an example, the second uplink transmission for the second transport block may be for a data transmission. In an example, the second uplink transmission may be for an URLLC operation. In an example, ignoring the at least one UL grant and transmitting the second transport block via the second UL radio resource may improve reduce the delay/latency of data transmission.

Figure 34:
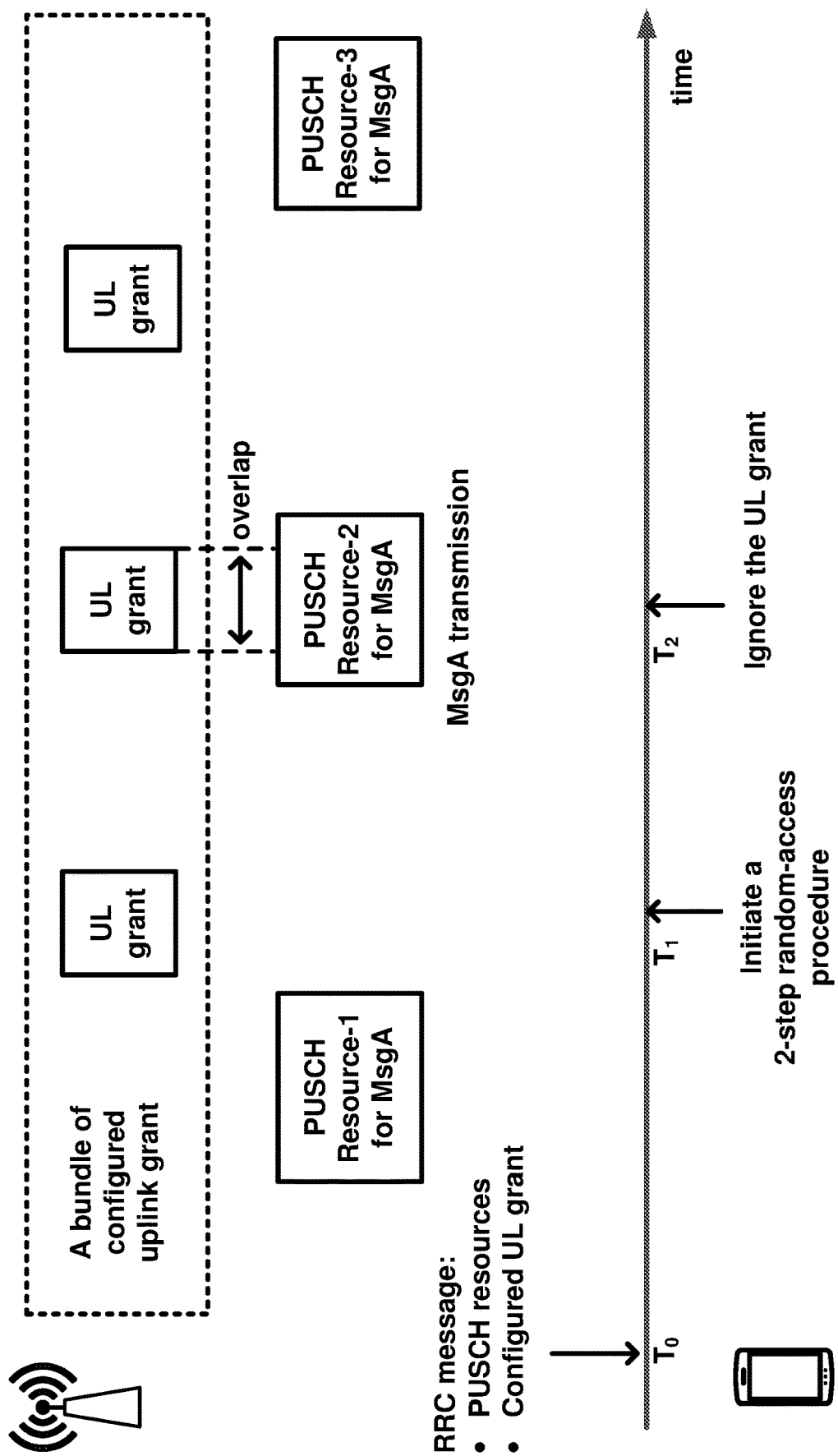
FIG. 34 is an example of a random-access procedure as per an aspect of an embodiment of the present disclosure.

FIG. 34 is an example of a random-access procedure as per an aspect of an example embodiment of the present disclosure. According to an example embodiment, at time T0, a wireless device may receive one or more radio resource control (RRC) messages. The one or more RRC messages may comprise one or more configuration parameters of a cell. The one or more configuration parameters may indicate physical uplink shared channel (PUSCH) resources for transmissions of message A (MsgA) payloads of two-step random-access procedures of the cell (e.g., PUSCH resources in FIG. 34, PUSCH resource-1 for MsgA, PUSCH resource-2 for MsgA, PUSCH resource-3 for MsgA in FIG. 34). The wireless device may initiate a two-step random-access procedure for the cell at time T1. A first PUSCH resource of the PUSCH resources may be selected based on initiating the two-step random-access procedure for the cell. A determination may be made that a PUSCH duration of a configured uplink grant (e.g., UL grant in FIG. 34) overlaps with a transmission of a MsgA payload via the first PUSCH resource (e.g., at time T2). Based on the determination, the configured uplink grant may be ignored by not transmitting via a second PUSCH resource of the configured uplink grant (e.g., at time T2). The one or more configuration parameters may indicate a bundle of configured uplink grant (e.g., Configured uplink grant at time T0 or UL grants in FIG. 34).

Figure 35:
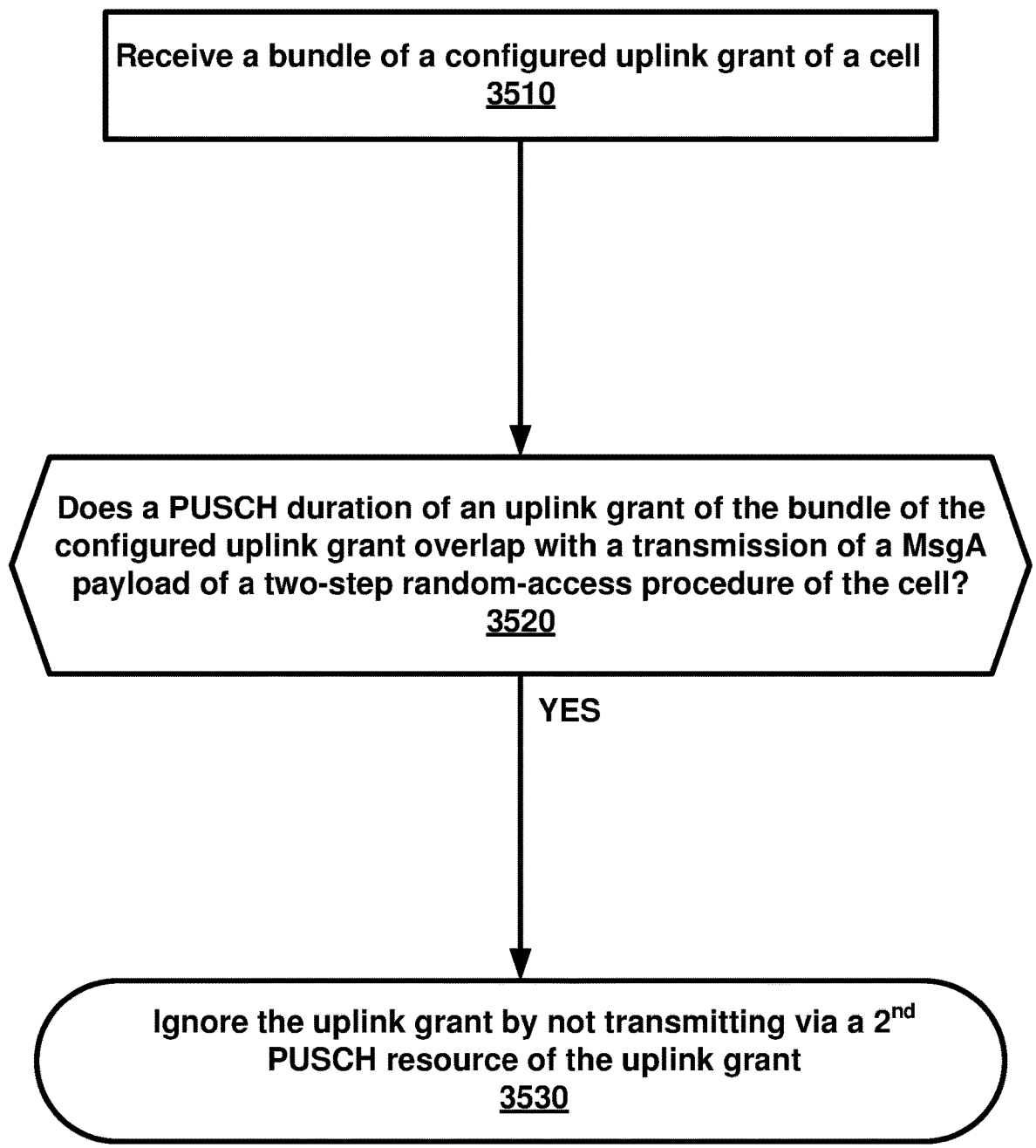
FIG. 35 is an example flowchart of a random-access procedure as per an aspect of an embodiment of the present disclosure.

FIG. 35 is a flow diagram as per an aspect of an example embodiment of the present disclosure. At 3510, a wireless device may receive a bundle of a configured uplink grant of a cell. At 3520, a determination may be made that a physical uplink shared channel (PUSCH) duration of an uplink grant of the bundle of the configured uplink grant overlaps with a transmission of a message A (MsgA) payload of a two-step random-access procedure of the cell. At 3530, based on the determination, the uplink grant may be ignored by not transmitting via a second PUSCH resource of the uplink grant.

According to an example embodiment, a wireless device may receive one or more radio resource control (RRC) messages. The one or more RRC messages may comprise one or more configuration parameters of a cell. The one or more configuration parameters may indicate physical uplink shared channel (PUSCH) resources for transmissions of message A (MsgA) payloads of two-step random-access procedures of the cell. A first PUSCH resource of the PUSCH resources may be selected based on initiating a two-step random-access procedure for the cell. A determination may be made that a PUSCH duration of a configured uplink grant overlaps with a transmission of a MsgA payload via the first PUSCH resource. Based on the determination, the configured uplink grant may be ignored by not transmitting via a second PUSCH resource of the configured uplink grant.

According to an example embodiment, a determination may be made that a third PUSCH resource of a second configured uplink grant does not overlap with a second transmission of a second MsgA payload of a second two-step random-access procedure of the cell. Based on the determination, the wireless device may transmit via the third PUSCH resource of the second configured uplink grant.

According to an example embodiment, the configured uplink grant may be a Type 1 configured uplink grant. According to an example embodiment, the configured uplink grant may be a Type 2 configured uplink grant.

According to an example embodiment, the configured uplink grant may be a part of a bundle of a configured uplink grant. According to an example embodiment, the one or more configuration parameters may indicate the bundle of the configured uplink grant. According to an example embodiment, the configured uplink grant may be an uplink grant of the bundle of the configured uplink grant.

According to an example embodiment, the PUSCH duration overlapping with the transmission of the MsgA payload via the first PUSCH resource may comprise that the PUSCH duration overlaps with a first duration of the transmission of the MsgA payload via the first PUSCH resource.

According to an example embodiment, the cell may be an unlicensed cell.

According to an example embodiment, the one or more configuration parameters may indicate, for the two-step random-access procedure, one or more physical random-access channel (PRACH) resources. According to an example embodiment, the one or more configuration parameters may indicate, for the two-step random-access procedure, one or more mappings between the one or more PRACH resources and the PUSCH resources. According to an example embodiment, the one or more mappings may be one-to-one. According to an example embodiment, the one or more mappings may be many-to-one. According to an example embodiment, the one or more mappings may be one-to-many. According to an example embodiment, a PRACH resource of the one or more PRACH resources may be selected for the two-step random-access procedure. According to an example embodiment, the PRACH resource may comprise a preamble. According to an example embodiment, the PRACH resource may comprise a PRACH occasion. According to an example embodiment, the selecting the first PUSCH resource may be based on the one or more mappings. According to an example embodiment, the first PUSCH resource may be selected based on the PRACH resource being mapped to the first PUSCH resource. According to an example embodiment, the PRACH resource being mapped to the first PUSCH resource may comprise that the PRACH occasion of the PRACH resource is mapped to the first PUSCH resource. According to an example embodiment, the PRACH resource being mapped to the first PUSCH resource may comprise that the preamble of the PRACH resource is mapped to the first PUSCH resource. According to an example embodiment, the PUSCH duration may not overlap with the PRACH occasion.

According to an example embodiment, the MsgA payload may be transmitted via the first PUSCH resource based on the ignoring the configured uplink grant.

According to an example embodiment, the two-step random-access procedure may be a contention-free random-access procedure. According to an example embodiment, the two-step random-access procedure may be a contention-based random-access procedure.

According to an example embodiment, the PUSCH duration overlapping with the transmission of the MsgA payload may comprise that the PUSCH duration overlaps with the transmission of the MsgA payload in at least one symbol or in at least one slot or in at least one subframe.

According to an example embodiment, a wireless device may receive one or more radio resource control (RRC) messages. The one or more RRC messages may comprise one or more configuration parameters of a cell. The one or more configuration parameters may indicate physical uplink shared channel (PUSCH) resources for transmissions of message A (MsgA) payloads of two-step random-access procedures of the cell. A first PUSCH resource of the PUSCH resources may be selected based on initiating a two-step random-access procedure for the cell. A determination may be made that a PUSCH duration of an uplink grant of a bundle of a configured uplink grant overlaps with a transmission of a MsgA payload via the first PUSCH resource. Based on the determination, the uplink grant may be ignored by not transmitting via a second PUSCH resource of the uplink grant.

According to an example embodiment, a wireless device may select a first physical uplink shared channel (PUSCH) resource for transmission of a message A (MsgA) payload of a two-step random-access procedure of a cell. A determination may be made that a PUSCH duration of an uplink grant of a bundle of a configured uplink grant overlaps with the transmission of the MsgA payload via the first PUSCH resource. Based on the determination, the uplink grant may be ignored by not transmitting via a second PUSCH resource of the uplink grant.

According to an example embodiment, a wireless device may determine that a physical uplink shared channel (PUSCH) duration of an uplink grant of a bundle of a configured uplink grant overlaps with a transmission of a message A (MsgA) payload of a two-step random-access procedure of a cell. Based on the determining, the uplink grant may be ignored by not transmitting via a second PUSCH resource of the uplink grant.

According to an example embodiment, a wireless device may receive a bundle of a configured uplink grant of a cell. A determination may be made that a physical uplink shared channel (PUSCH) duration of an uplink grant of the bundle of the configured uplink grant overlaps with a transmission of a message A (MsgA) payload of a two-step random-access procedure of the cell. Based on the determination, the uplink grant may be ignored by not transmitting via a second PUSCH resource of the uplink grant.

According to an example embodiment, a determination may be made that a third PUSCH resource of a second uplink grant of the bundle of the configured uplink grant does not overlap with a second transmission of a second MsgA payload of a second two-step random-access procedure of the cell. Based on the determination, the wireless device may transmit via the third PUSCH resource.

Figure 36:
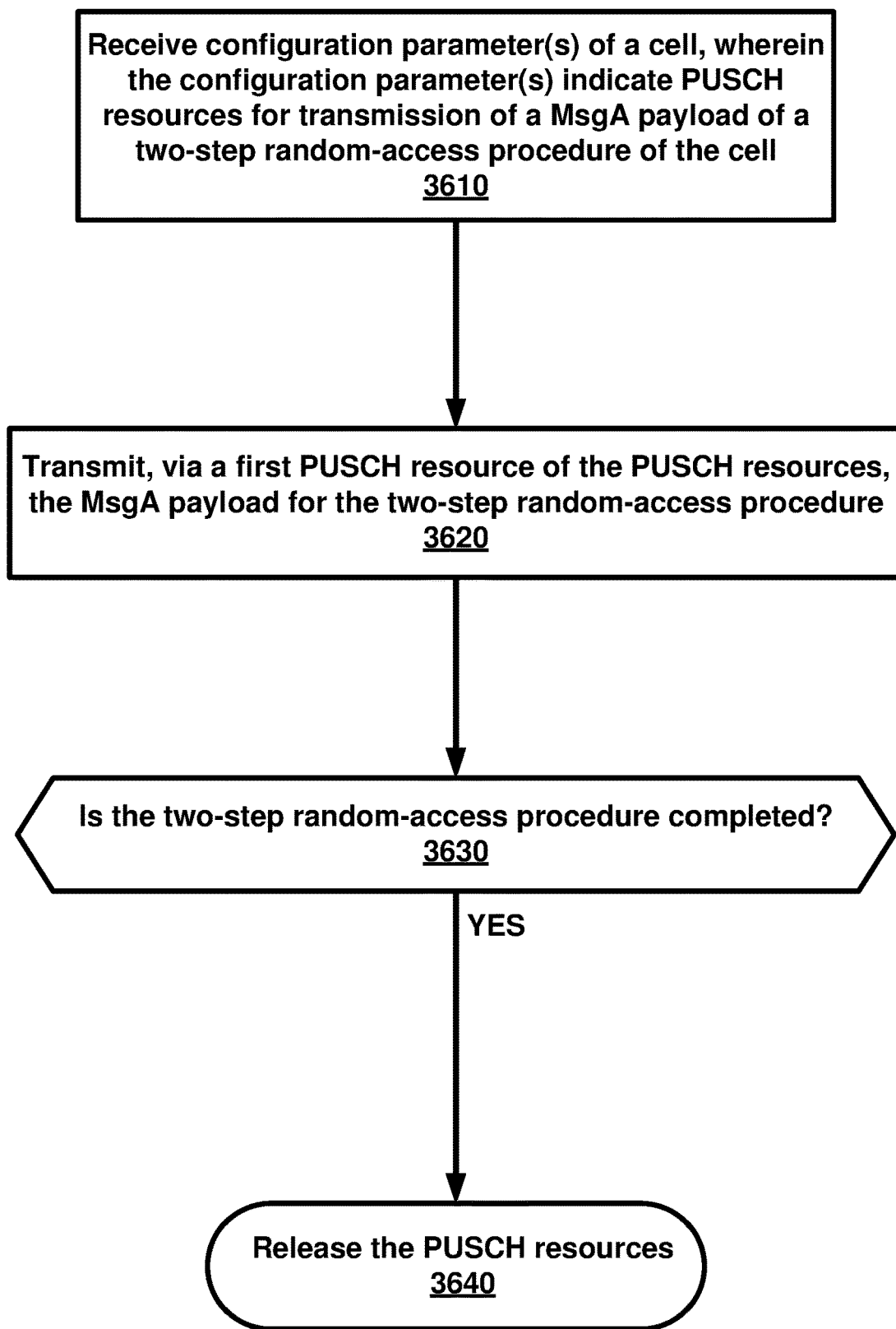
FIG. 36 is an example flowchart of a random-access procedure as per an aspect of an embodiment of the present disclosure.

FIG. 36 is a flow diagram as per an aspect of an example embodiment of the present disclosure. At 3610, a wireless device may receive one or more messages. The one or more messages may comprise one or more configuration parameters of a cell. The one or more configuration parameters may indicate physical uplink shared channel (PUSCH) resources for transmission of a message A (MsgA) payload of a two-step random-access procedure of the cell. At 3620, the MsgA payload may be transmitted, via a first PUSCH resource of the PUSCH resources, for the two-step random-access procedure. At 3630, a determination may be made that the two-step random-access procedure is completed. At 3640, based on the determination, the PUSCH resources may be released.

According to an example embodiment, a wireless device may receive one or more messages. The one or more messages may comprise one or more configuration parameters of a cell. The one or more configuration parameters may indicate physical uplink shared channel (PUSCH) resources for transmission of a message A (MsgA) payload of a two-step random-access procedure of the cell. The MsgA payload may be transmitted, via a first PUSCH resource of the PUSCH resources, for the two-step random-access procedure. A determination may be made that the two-step random-access procedure is completed. At 3640, based on the determination, the PUSCH resources may be released.

According to an example embodiment, the completing the two-step random-access procedure may comprise receiving a first physical downlink control channel (PDCCH), for a first random-access response, identified by a cell Radio Network Temporary Identifier (C-RNTI). According to an example embodiment, the completing the two-step random-access procedure may comprise receiving a second PDCCH, for a second random-access response, identified by a Radio Network Temporary Identifier (RNTI). According to an example embodiment, the completing the two-step random-access procedure may comprise a preamble transmission counter reaching a preamble maximum transmission. According to an example embodiment, the RNTI may be message B RNTI (MSGB-RNTI).

According to an example embodiment, the one or more configuration parameters may indicate one or more physical random-access channel (PRACH) resources. According to an example embodiment, the one or more PRACH resources may be discarded based on the determination that the two-step random-access procedure is completed. According to an example embodiment, the releasing the PUSCH resources may be further based on the discarding the one or more PRACH resources.

According to an example embodiment, a PRACH resource of the one or more PRACH resources may be selected for the two-step random-access procedure. The PRACH resource may comprise a preamble. The PRACH resource may comprise a PRACH occasion. According to an example embodiment, the preamble may be transmitted via the PRACH occasion for the two-step random-access procedure. According to an example embodiment, the receiving the second PDCCH for the second random-access response may comprise receiving the second random-access response scheduled by the second PDCCH. According to an example embodiment, the receiving the second random-access response may comprise receiving the second random-access response corresponding to the preamble. According to an example embodiment, the second random-access response corresponding to the preamble may comprise that a random-access preamble identity in the second random-access response identifies the preamble.

According to an example embodiment, the one or more configuration parameters may indicate one or more mappings between the one or more PRACH resources and the PUSCH resources. According to an example embodiment, the one or more mappings may be one-to-one. According to an example embodiment, the one or more mappings may be many-to-one. According to an example embodiment, the one or more mappings may be one-to-many. According to an example embodiment, the first PUSCH resource may be selected based on the one or more mappings. The PRACH resource may be mapped to the first PUSCH resource. According to an example embodiment, the PRACH resource being mapped to the first PUSCH resource may comprise that the PRACH occasion of the PRACH resource is mapped to the first PUSCH resource. According to an example embodiment, the PRACH resource being mapped to the first PUSCH resource may comprise that the preamble of the PRACH resource is mapped to the first PUSCH resource.

According to an example embodiment, the completing the two-step random-access procedure may comprise receiving a first PDCCH, for a first random-access response, identified by a C-RNTI. According to an example embodiment, the completing the two-step random-access procedure may comprise a preamble transmission counter reaching a preamble maximum transmission. According to an example embodiment, the receiving the first PDCCH for the first random-access response may comprise receiving the first random-access response scheduled by the first PDCCH. According to an example embodiment, the first random-access response may comprise a timing advance command indicating a timing advance value. According to an example embodiment, the first PDCCH may comprise an uplink grant.

According to an example embodiment, the cell may be an unlicensed cell.

According to an example embodiment, the two-step random-access procedure may be a contention-free two-step random-access procedure. According to an example embodiment, the contention-free two-step random-access procedure may not be initiated for a beam failure recovery procedure of the cell.

According to an example embodiment, the releasing the PUSCH resources may comprise not transmitting, via a PUSCH resource of the PUSCH resources, a MsgA payload. According to an example embodiment, the releasing the PUSCH resources may comprise releasing a configuration of the PUSCH resources. According to an example embodiment, the releasing the PUSCH resources may comprise releasing the one or more configurations parameters indicating the PUSCH resources. According to an example embodiment, one or more second messages comprising one or more second configuration parameters may be received after the releasing the configuration. The one or more second configuration parameters may indicate second PUSCH resources for transmission of a second MsgA payload of a second two-step random-access procedure of the cell. According to an example embodiment, the second MsgA payload may be transmitted, via a second PUSCH resource of the second PUSCH resources, for the second two-step random-access procedure.

According to an example embodiment, the releasing the PUSCH resources may comprise stopping transmitting, via a PUSCH resource of the PUSCH resources, a MsgA payload.

According to an example embodiment, the one or more configuration parameters may indicate the preamble maximum transmission.

According to an example embodiment, a wireless device may receive one or more messages. The one or more messages may comprise one or more configuration parameters of a cell. The one or more configuration parameters may indicate physical uplink shared channel (PUSCH) resources for transmission of a message A (MsgA) payload of a two-step random-access procedure of the cell. The MsgA payload may be transmitted, via a first PUSCH resource of the PUSCH resources, for the two-step random-access procedure. The PUSCH resources may be released based on receiving a first physical downlink control channel (PDCCH), for a first random-access response, identified by a cell Radio Network Temporary Identifier (C-RNTI). The PUSCH resources may be released based on receiving a second PDCCH, for a second random-access response, identified by a message B Radio Network Temporary Identifier (MSGB-RNTI). The PUSCH resources may be released based on a preamble transmission counter reaching a preamble maximum transmission.

According to an example embodiment, a wireless device may receive one or more messages. The one or more messages may comprise one or more configuration parameters of a cell. The one or more configuration parameters may indicate physical uplink shared channel (PUSCH) resources for transmission of a message A (MsgA) payload of a two-step random-access procedure of the cell. The MsgA payload may be transmitted, via a first PUSCH resource of the PUSCH resources, for the two-step random-access procedure. The PUSCH resources may be released based on receiving a first physical downlink control channel (PDCCH), for a first random-access response, identified by a cell Radio Network Temporary Identifier (C-RNTI). The PUSCH resources may be released based on a preamble transmission counter reaching a preamble maximum transmission.

According to an example embodiment, a wireless device may receive one or more messages. The one or more messages may comprise one or more configuration parameters of a cell. The one or more configuration parameters may indicate physical uplink shared channel (PUSCH) resources for transmission of a message A (MsgA) payload of a two-step random-access procedure of the cell. A determination may be made that a radio resource control (RRC) layer of the wireless device requests resetting a medium access control (MAC) layer of the wireless device. Based on the determination, the MAC layer may be reset. The PUSCH resources may be released based on the MAC layer being reset.

According to an example embodiment, a wireless device may receive one or more messages. The one or more messages may comprise one or more configuration parameters of a cell. The one or more configuration parameters may indicate physical uplink shared channel (PUSCH) resources for transmission of a message A (MsgA) payload of a two-step random-access procedure of the cell. A medium access control (MAC) layer of the wireless device may be reset. The MAC layer may be reset based on a request by a radio resource control (RRC) layer of the wireless device. The PUSCH resources may be released based on the MAC layer being reset.

According to an example embodiment, a wireless device may receive one or more messages. The one or more messages may comprise one or more configuration parameters of a cell. The one or more configuration parameters may indicate, for transmission of message A (MsgA) payloads of two-step random-access procedures of the cell, physical uplink shared channel (PUSCH) resources on a first uplink bandwidth part (BWP) of the cell. The first uplink BWP of the cell may be activated. A MsgA payload may be transmitted, via a first PUSCH resource of the PUSCH resources, for a two-step random-access procedure of the cell. The first uplink BWP may be deactivated. The first uplink BWP may be deactivated based on switching from the first uplink BWP to a second uplink BWP of the cell. The PUSCH resources may be suspended based on the deactivating.

According to an example embodiment, the suspending the PUSCH resources may comprise keeping a configuration of the PUSCH resources.

According to an example embodiment, the two-step random-access procedure may be initiated for a beam failure recovery procedure of the cell.

According to an example embodiment, the first uplink BWP may be activated based on switching from the second uplink BWP to the first uplink BWP. According to an example embodiment, the suspended PUSCH resources may be initialized based on the activating the first uplink BWP. According to an example embodiment, the initializing the suspended PUSCH resources may comprise resume using the PUSCH resources for a two-step random-access procedure of the cell.

According to an example embodiment, based on the deactivating the first uplink BWP, the wireless device may stop transmitting, via a PUSCH resource of the PUSCH resources, a MsgA payload for a two-step random-access procedure of the cell.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U. S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U. S. C. 112. Claims that do not expressly include the phrase "means for" or "step for" are not to be interpreted under 35 U. S. C. 112.

What is claimed is:

1. A method comprising:
receiving, by a wireless device, one or more messages comprising one or more configuration parameters of a cell, wherein the one or more configuration parameters comprise physical uplink shared channel (PUSCH) resource configurations indicating PUSCH resources for transmission of a message A (MsgA) payload of a contention-free two-step random-access procedure of the cell;
transmitting, via a first PUSCH resource of the PUSCH resources, the MsgA payload for the contention-free two-step random-access procedure; and
clearing, by the wireless device, the PUSCH resources for the MsgA payload in response to completing the contention-free two-step random-access procedure.

2. The method of claim 1, wherein the completing the contention-free two-step random-access procedure comprises at least one of the following:
receiving a first physical downlink control channel (PDCCH), for a first random-access response, identified by a cell Radio Network Temporary Identifier (C-RNTI);
receiving a second PDCCH, for a second random-access response, identified by a Radio Network Temporary Identifier (RNTI); or
reaching a maximum number of preamble transmissions on a preamble transmission counter.

3. The method of claim 1, wherein the completing the contention-free two-step random-access procedure comprises receiving a PDCCH, for a random-access response, identified by a Radio Network Temporary Identifier (RNTI), and wherein the RNTI is a message B RNTI (MSGB-RNTI).

4. The method of claim 1, wherein the clearing the PUSCH resources comprises clearing a configuration of the PUSCH resources.

5. The method of claim 4, further comprising:
receiving, after the clearing the configuration, one or more second messages comprising one or more second configuration parameters indicating second PUSCH resources for transmission of a second MsgA payload of a second two-step random-access procedure of the cell; and
transmitting, via a second PUSCH resource of the second PUSCH resources, the second MsgA payload for the second two-step random-access procedure.

6. The method of claim 1, wherein the clearing the PUSCH resources comprises stopping transmitting, via a PUSCH resource of the PUSCH resources, the MsgA payload.

7. The method of claim 1, wherein the PUSCH resources comprise PUSCH occasions, and wherein the transmitting via the first PUSCH resource of the PUSCH resources comprises:
transmitting via a PUSCH occasion of the PUSCH occasions.

8. The method of claim 1, wherein the one or more configuration parameters further indicate one or more physical random-access channel (PRACH) resources.

9. The method of claim 8, further comprising discarding the one or more PRACH resources based on the completing the contention-free two-step random-access procedure.

10. The method of claim 9, wherein the clearing the PUSCH resources is further based on the discarding the one or more PRACH resources.

11. The method of claim 8, further comprising selecting, for the contention-free two-step random-access procedure, a PRACH resource of the one or more PRACH resources, wherein the PRACH resource comprises:
a preamble; and
a PRACH occasion.

12. The method of claim 11, further comprising transmitting the preamble via the PRACH occasion for the contention-free two-step random-access procedure.

13. The method of claim 11, wherein the one or more configuration parameters further indicate one or more mappings between the one or more PRACH resources and the PUSCH resources.

14. The method of claim 13, further comprising selecting the first PUSCH resource based on the one or more mappings, wherein the PRACH resource is mapped to the first PUSCH resource.

15. The method of claim 14, wherein the PRACH resource is mapped to the first PUSCH resource comprises that the PRACH occasion of the PRACH resource is mapped to the first PUSCH resource.

16. The method of claim 14, wherein the PRACH resource is mapped to the first PUSCH resource comprises that the preamble of the PRACH resource is mapped to the first PUSCH resource.

17. The method of claim 1, wherein the completing the contention-free two-step random-access procedure comprises receiving a first PDCCH, identified by a C-RNTI, for a first random-access response, and wherein the receiving the first PDCCH for the first random-access response comprises receiving the first random-access response scheduled by the first PDCCH.

18. The method of claim 17, wherein the first PDCCH comprises an uplink grant.

19. The method of claim 1, wherein the cell is an unlicensed cell.

* * * * *